US00RE45606E

(19) United States
(12) Reissued Patent
Neyman et al.

(10) Patent Number: US RE45,606 E
(45) Date of Reissued Patent: Jul. 7, 2015

(54) CALL AND DATA CORRESPONDENCE IN A CALL-IN CENTER EMPLOYING VIRTUAL RESTRUCTURING FOR COMPUTER TELEPHONY INTEGRATED FUNCTIONALITY

(71) Applicants: Igor Neyman, Palo Alto, CA (US); Myhailo Barskyy, San Francisco, CA (US); Alec Miloslavsky, San Carlos, CA (US); Oleg Bondarenko, San Francisco, CA (US); Valeriy Issayev, Foster City, CA (US); Andrei Petrov, Redwood City, CA (US); Pavel Karpenko, Concord, CA (US)

(72) Inventors: Igor Neyman, Palo Alto, CA (US); Myhailo Barskyy, San Francisco, CA (US); Alec Miloslavsky, San Carlos, CA (US); Oleg Bondarenko, San Francisco, CA (US); Valeriy Issayev, Foster City, CA (US); Andrei Petrov, Redwood City, CA (US); Pavel Karpenko, Concord, CA (US)

(73) Assignee: GENESYS TELECOMMUNICATIONS LABORATORIES, INC., Daly, City, CA (US)

(21) Appl. No.: 13/789,640

(22) Filed: Mar. 7, 2013

Related U.S. Patent Documents

Reissue of:

(64) Patent No.: 7,903,807
Issued: Mar. 8, 2011
Appl. No.: 10/843,802
Filed: May 11, 2004

U.S. Applications:

(60) Continuation of application No. 10/234,691, filed on Sep. 3, 2002, now Pat. No. 6,735,298, which is a con (Continued)

(51) Int. Cl.
*H04M 3/00* (2006.01)
*H04M 3/51* (2006.01)

(52) U.S. Cl.
CPC ..... *H04M 3/51* (2013.01); *H04M 3/5191* (2013.01)

(58) Field of Classification Search
USPC ..... 370/351–356; 379/265.01, 265.02, 379/265.09, 265.11, 266.01, 266.09; 709/201–203, 206, 216–219, 227–229
See application file for complete search history.

(56) References Cited

U.S. PATENT DOCUMENTS 3,914,559 A 10/1975 Knollman
4,048,452 A 9/1977 Oehring et al.

(Continued)

FOREIGN PATENT DOCUMENTS

AT 270486 7/2004
AT 281039 11/2004

(Continued)

OTHER PUBLICATIONS

Mattison, Rob, "Data Warehousing and Data Mining for Telecommunications," Artech House, Boston, 1997, 7 pages.

(Continued)

*Primary Examiner* — Hemant Patel
(74) *Attorney, Agent, or Firm* — Christie, Parker & Hale, LLP

(57) ABSTRACT

A call center having agent stations comprising telephones connected to computer stations by a Telephone Application Programming Interface (TAPI)-compliant bridge has data pertaining to callers stored in a database on a local area network (LAN) to which the computer stations are also connected. Origination data for incoming calls, both conventional calls to the telephones and computer-simulated calls to the computer platforms, is used as a key to extract data pertaining to calls from the database for display on video display units (VDUs) of the computer workstations where the calls are terminated. In some cases, data is only extracted and displayed for calls from previously listed origination points.

6 Claims, 8 Drawing Sheets

Related U.S. Application Data tinuation of application No. 08/949,566, filed on Oct. 14, 1997, now Pat. No. 6,480,600, which is a division of application No. 08/928,861, filed on Sep. 12, 1997, now Pat. No. 7,031,442, said application No. 10/843,802 is a continuation-in-part of application No. 08/928,861, filed on Sep. 12, 1997, now Pat. No. 7,031,442, which is a continuation-in-part of application No. 08/869,815, filed on Jun. 4, 1997, now Pat. No. 6,148,074, which is a continuation-in-part of application No. 08/802,667, filed on Feb. 19, 1997, now Pat. No. 6,201,863, which is a continuation-in-part of application No. 08/797,420, filed on Feb. 10, 1997, now Pat. No. 6,185,291, said application No. 08/928,861 is a continuation-in-part of application No. 08/833,340, filed on Apr. 3, 1997, now Pat. No. 6,560,328, and a continuation-in-part of application No. 08/891,675, filed on Jul. 9, 1997, now Pat. No. 6,205,412.

(56) References Cited

U.S. PATENT DOCUMENTS

| | | | |
|---|---|---|---|
| 4,290,141 | A | 9/1981 | Anderson et al. |
| 4,320,256 | A | 3/1982 | Freeman |
| 4,345,315 | A | 8/1982 | Cadotte et al. |
| 4,355,207 | A | 10/1982 | Curtin |
| 4,355,372 | A | 10/1982 | Johnson et al. |
| 4,400,587 | A | 8/1983 | Taylor et al. |
| 4,439,636 | A | 3/1984 | Newkirk et al. |
| 4,451,700 | A | 5/1984 | Kempner et al. |
| 4,489,438 | A | 12/1984 | Hughes |
| 4,512,011 | A | 4/1985 | Turner |
| 4,517,410 | A | 5/1985 | Williams et al. |
| 4,521,643 | A | 6/1985 | Dupuis et al. |
| 4,523,055 | A | 6/1985 | Hohl et al. |
| 4,528,643 | A | 7/1985 | Freeny, Jr. |
| 4,539,435 | A | 9/1985 | Eckmann |
| 4,555,903 | A | 12/1985 | Heaton |
| 4,558,180 | A | 12/1985 | Scordo |
| 4,559,415 | A | 12/1985 | Bernard et al. |
| 4,566,030 | A | 1/1986 | Nickerson et al. |
| 4,567,323 | A | 1/1986 | Lottes et al. |
| 4,577,062 | A | 3/1986 | Hilleary et al. |
| 4,577,067 | A | 3/1986 | Levy et al. |
| 4,578,700 | A | 3/1986 | Roberts et al. |
| 4,580,012 | A | 4/1986 | Matthews et al. |
| 4,584,602 | A | 4/1986 | Nakagawa |
| 4,587,379 | A | 5/1986 | Masuda |
| 4,598,367 | A | 7/1986 | DeFrancesco et al. |
| 4,603,232 | A | 7/1986 | Kurland et al. |
| 4,611,094 | A | 9/1986 | Asmuth et al. |
| 4,625,276 | A | 11/1986 | Benton et al. |
| 4,630,200 | A | 12/1986 | Ohmae et al. |
| 4,630,201 | A | 12/1986 | White |
| 4,634,809 | A | 1/1987 | Paulsson et al. |
| 4,649,563 | A | 3/1987 | Riskin |
| 4,654,482 | A | 3/1987 | DeAngelis |
| 4,667,287 | A | 5/1987 | Allen et al. |
| 4,674,044 | A | 6/1987 | Kalmus et al. |
| 4,679,189 | A | 7/1987 | Olson et al. |
| 4,696,029 | A | 9/1987 | Cohen |
| 4,697,282 | A | 9/1987 | Winter et al. |
| 4,737,983 | A | 4/1988 | Frauenthal et al. |
| 4,756,020 | A | 7/1988 | Fodale |
| 4,757,267 | A | 7/1988 | Riskin |
| 4,763,191 | A | 8/1988 | Gordon et al. |
| 4,763,317 | A | 8/1988 | Lehman et al. |
| 4,763,353 | A | 8/1988 | Canale et al. |
| 4,771,425 | A | 9/1988 | Baran et al. |
| 4,785,408 | A | 11/1988 | Britton et al. |
| 4,788,715 | A | 11/1988 | Lee |
| 4,811,382 | A | 3/1989 | Sleevi |
| 4,812,843 | A | 3/1989 | Champion, III et al. |
| 4,829,563 | A | 5/1989 | Crockett et al. |
| 4,831,518 | A | 5/1989 | Yu et al. |
| 4,852,001 | A | 7/1989 | Tsushima et al. |
| 4,866,756 | A | 9/1989 | Crane et al. |
| 4,881,261 | A | 11/1989 | Oliphant et al. |
| 4,893,328 | A | 1/1990 | Peacock |
| 4,896,345 | A | 1/1990 | Thorne |
| 4,897,866 | A | 1/1990 | Majmudar et al. |
| 4,908,850 | A | 3/1990 | Masson et al. |
| 4,924,488 | A | 5/1990 | Kosich |
| 4,943,995 | A | 7/1990 | Daudelin et al. |
| 4,953,204 | A | 8/1990 | Cuschleg, Jr. et al. |
| 4,972,461 | A | 11/1990 | Brown et al. |
| 4,994,985 | A | 2/1991 | Cree et al. |
| 5,001,710 | A | 3/1991 | Gawrys et al. |
| 5,008,930 | A | 4/1991 | Gawrys et al. |
| 5,017,917 | A | 5/1991 | Fisher et al. |
| 5,020,095 | A | 5/1991 | Morganstein et al. |
| 5,036,535 | A | 7/1991 | Gechter et al. |
| 5,058,152 | A | 10/1991 | Solomon et al. |
| 5,062,103 | A | 10/1991 | Davidson et al. |
| 5,073,890 | A | 12/1991 | Danielsen |
| 5,095,504 | A | 3/1992 | Nishikawa et al. |
| 5,117,225 | A | 5/1992 | Wang |
| 5,136,633 | A | 8/1992 | Tejada et al. |
| 5,155,761 | A | 10/1992 | Hammond |
| 5,164,983 | A | 11/1992 | Brown et al. |
| 5,168,515 | A | 12/1992 | Gechter et al. |
| 5,175,800 | A | 12/1992 | Galis et al. |
| 5,179,589 | A | 1/1993 | Syu |
| 5,181,236 | A | 1/1993 | LaVallee et al. |
| 5,181,239 | A | 1/1993 | Jolissaint |
| 5,185,782 | A | 2/1993 | Srinivasan |
| 5,202,828 | A | 4/1993 | Vertelney et al. |
| 5,206,903 | A | 4/1993 | Kohler et al. |
| 5,208,745 | A | 5/1993 | Quentin et al. |
| 5,212,727 | A | 5/1993 | Ramkumar |
| 5,214,688 | A | 5/1993 | Szlam et al. |
| 5,231,670 | A | 7/1993 | Goldhor et al. |
| 5,247,569 | A | 9/1993 | Cave |
| 5,249,223 | A | 9/1993 | Vanacore |
| 5,253,288 | A | 10/1993 | Frey et al. |
| 5,256,863 | A | 10/1993 | Ferguson et al. |
| 5,261,096 | A | 11/1993 | Howarth |
| 5,271,058 | A | 12/1993 | Andrews et al. |
| 5,274,635 | A | 12/1993 | Rahman et al. |
| 5,274,700 | A | 12/1993 | Gechter et al. |
| 5,274,782 | A | 12/1993 | Chalasani et al. |
| 5,278,898 | A | 1/1994 | Cambray et al. |
| 5,278,977 | A | 1/1994 | Spencer et al. |
| 5,280,625 | A | 1/1994 | Howarter et al. |
| 5,283,638 | A | 2/1994 | Engberg et al. |
| 5,283,856 | A | 2/1994 | Gross et al. |
| 5,285,494 | A | 2/1994 | Sprecher et al. |
| 5,288,147 | A | 2/1994 | Schaefer et al. |
| 5,291,550 | A | 3/1994 | Levy et al. |
| 5,291,551 | A | 3/1994 | Conn et al. |
| 5,291,552 | A | 3/1994 | Kerrigan et al. |
| 5,299,259 | A | 3/1994 | Otto |
| 5,299,260 | A | 3/1994 | Shaio |
| 5,301,320 | A | 4/1994 | McAtee et al. |
| 5,309,505 | A | 5/1994 | Szlam et al. |
| 5,311,574 | A | 5/1994 | Livanos |
| 5,311,583 | A | 5/1994 | Friedes et al. |
| 5,315,709 | A | 5/1994 | Alston, Jr. et al. |
| 5,327,486 | A | 7/1994 | Wolff et al. |
| 5,329,583 | A | 7/1994 | Jurgensen et al. |
| 5,333,266 | A | 7/1994 | Boaz et al. |
| 5,335,268 | A | 8/1994 | Kelly, Jr. et al. |
| 5,335,269 | A | 8/1994 | Steinlicht |
| 5,343,477 | A | 8/1994 | Yamada |
| 5,343,518 | A | 8/1994 | Kneipp |
| 5,355,474 | A | 10/1994 | Thuraisngham et al. |
| 5,359,649 | A | 10/1994 | Rosu et al. |
| 5,363,507 | A | 11/1994 | Nakayama et al. |
| 5,367,329 | A | 11/1994 | Nakagaki et al. |
| 5,369,695 | A | 11/1994 | Chakravarti et al. |
| 5,384,766 | A | 1/1995 | Yamato et al. |

(56) References Cited

U.S. PATENT DOCUMENTS

| | | | |
|---|---|---|---|
| 5,384,771 | A | 1/1995 | Isidoro et al. |
| 5,384,829 | A | 1/1995 | Heileman, Jr. et al. |
| 5,384,841 | A | 1/1995 | Adams et al. |
| 5,392,277 | A | 2/1995 | Bernstein |
| 5,392,328 | A | 2/1995 | Schmidt et al. |
| 5,392,345 | A | 2/1995 | Otto |
| 5,392,400 | A | 2/1995 | Berkowitz et al. |
| 5,402,474 | A | 3/1995 | Miller et al. |
| 5,414,762 | A | 5/1995 | Flisik et al. |
| 5,422,813 | A | 6/1995 | Schuchman et al. |
| 5,425,091 | A | 6/1995 | Josephs |
| 5,425,093 | A | 6/1995 | Trefzger |
| 5,426,594 | A | 6/1995 | Wright et al. |
| 5,428,608 | A | 6/1995 | Freeman et al. |
| 5,436,965 | A | 7/1995 | Grossman et al. |
| 5,436,967 | A | 7/1995 | Hanson |
| 5,440,719 | A | 8/1995 | Hanes et al. |
| 5,444,767 | A | 8/1995 | Goetcheus et al. |
| 5,444,774 | A | 8/1995 | Friedes |
| 5,444,823 | A | 8/1995 | Nguyen |
| 5,450,482 | A | 9/1995 | Chen et al. |
| 5,450,483 | A | 9/1995 | Williams |
| 5,452,350 | A | 9/1995 | Reynolds et al. |
| 5,455,903 | A | 10/1995 | Jolissaint et al. |
| 5,459,780 | A | 10/1995 | Sand |
| 5,463,685 | A | 10/1995 | Gaechter et al. |
| 5,465,286 | A | 11/1995 | Clare et al. |
| 5,467,391 | A | 11/1995 | Donaghue, Jr. et al. |
| 5,469,504 | A | 11/1995 | Blaha |
| 5,473,680 | A | 12/1995 | Porter |
| 5,475,813 | A | 12/1995 | Cieslak et al. |
| 5,479,487 | A | 12/1995 | Hammond |
| 5,481,616 | A | 1/1996 | Freadman |
| 5,488,648 | A | 1/1996 | Womble |
| 5,491,783 | A | 2/1996 | Douglas et al. |
| 5,493,564 | A | 2/1996 | Mullan |
| 5,495,522 | A | 2/1996 | Allen et al. |
| 5,495,523 | A | 2/1996 | Stent et al. |
| 5,496,392 | A | 3/1996 | Sims et al. |
| 5,497,317 | A | 3/1996 | Hawkins et al. |
| 5,497,371 | A | 3/1996 | Ellis et al. |
| 5,497,373 | A | 3/1996 | Hulen et al. |
| 5,500,891 | A | 3/1996 | Harrington et al. |
| 5,506,898 | A | 4/1996 | Costantini et al. |
| 5,509,062 | A | 4/1996 | Carlsen |
| 5,510,829 | A | 4/1996 | Sugiyama et al. |
| 5,511,117 | A | 4/1996 | Zazzera |
| 5,517,620 | A | 5/1996 | Hashimoto et al. |
| 5,519,773 | A | 5/1996 | Dumas et al. |
| 5,524,047 | A | 6/1996 | Brown et al. |
| 5,524,147 | A | 6/1996 | Bean |
| 5,526,353 | A | 6/1996 | Henley et al. |
| 5,528,678 | A | 6/1996 | Kaplan |
| 5,530,740 | A | 6/1996 | Irribarren et al. |
| 5,530,744 | A | 6/1996 | Charalambous et al. |
| 5,533,103 | A | 7/1996 | Peavey et al. |
| 5,533,107 | A | 7/1996 | Irwin et al. |
| 5,533,108 | A | 7/1996 | Harris et al. |
| 5,533,110 | A | 7/1996 | Pinard et al. |
| 5,533,115 | A | 7/1996 | Hollenbach et al. |
| 5,535,211 | A | 7/1996 | Yano |
| 5,535,256 | A | 7/1996 | Maloney et al. |
| 5,535,323 | A | 7/1996 | Miller et al. |
| 5,537,470 | A | 7/1996 | Lee |
| 5,537,630 | A | 7/1996 | Berry et al. |
| 5,539,811 | A | 7/1996 | Nakamura et al. |
| 5,544,220 | A | 8/1996 | Trefzger |
| 5,546,452 | A | 8/1996 | Andrews et al. |
| 5,550,816 | A | 8/1996 | Hardwick et al. |
| 5,553,133 | A | 9/1996 | Perkins |
| 5,555,299 | A | 9/1996 | Maloney et al. |
| 5,555,426 | A | 9/1996 | Johnson et al. |
| 5,557,667 | A | 9/1996 | Bruno et al. |
| 5,559,868 | A | 9/1996 | Blonder |
| 5,559,877 | A | 9/1996 | Ash et al. |
| 5,559,878 | A | 9/1996 | Keys et al. |
| 5,561,711 | A | 10/1996 | Muller |
| 5,561,841 | A | 10/1996 | Markus |
| 5,563,805 | A | 10/1996 | Arbuckle et al. |
| 5,563,937 | A | 10/1996 | Bruno et al. |
| 5,566,294 | A | 10/1996 | Kojima et al. |
| 5,570,419 | A | 10/1996 | Cave et al. |
| 5,570,420 | A | 10/1996 | Bress et al. |
| 5,572,579 | A | 11/1996 | Orriss et al. |
| 5,572,643 | A | 11/1996 | Judson |
| 5,577,100 | A | 11/1996 | McGregor et al. |
| 5,577,105 | A | 11/1996 | Baum et al. |
| 5,583,862 | A | 12/1996 | Callon |
| 5,583,922 | A | 12/1996 | Davis et al. |
| 5,590,188 | A | 12/1996 | Crockett |
| 5,592,542 | A | 1/1997 | Honda et al. |
| 5,592,543 | A | 1/1997 | Smith et al. |
| 5,594,791 | A | 1/1997 | Szlam et al. |
| 5,598,532 | A | 1/1997 | Liron |
| 5,604,737 | A | 2/1997 | Iwami et al. |
| 5,606,602 | A | 2/1997 | Johnson et al. |
| 5,608,778 | A | 3/1997 | Partridge, III |
| 5,608,786 | A | 3/1997 | Gordon |
| 5,610,910 | A | 3/1997 | Focsaneanu et al. |
| 5,617,570 | A | 4/1997 | Russell et al. |
| 5,619,183 | A | 4/1997 | Ziegra et al. |
| 5,619,557 | A | 4/1997 | Van Berkum |
| 5,619,648 | A | 4/1997 | Canale et al. |
| 5,621,789 | A | 4/1997 | McCalmont et al. |
| 5,621,790 | A | 4/1997 | Grossman et al. |
| 5,623,600 | A | 4/1997 | Ji et al. |
| 5,624,265 | A | 4/1997 | Redford et al. |
| 5,625,404 | A | 4/1997 | Grady et al. |
| 5,625,676 | A | 4/1997 | Greco et al. |
| 5,625,682 | A | 4/1997 | Gray et al. |
| 5,627,764 | A | 5/1997 | Schutzman et al. |
| 5,627,884 | A | 5/1997 | Williams et al. |
| 5,630,127 | A | 5/1997 | Moore et al. |
| 5,632,011 | A | 5/1997 | Landfield et al. |
| 5,633,920 | A | 5/1997 | Kikinis et al. |
| 5,633,924 | A | 5/1997 | Kaish et al. |
| 5,635,918 | A | 6/1997 | Tett |
| 5,640,445 | A | 6/1997 | David |
| 5,642,411 | A | 6/1997 | Theis |
| 5,642,477 | A | 6/1997 | de Carmo et al. |
| 5,642,511 | A | 6/1997 | Chow et al. |
| 5,644,720 | A | 7/1997 | Boll et al. |
| 5,646,981 | A | 7/1997 | Klein |
| 5,649,105 | A | 7/1997 | Aldred et al. |
| 5,652,789 | A | 7/1997 | Miner et al. |
| 5,652,791 | A | 7/1997 | Sunderman et al. |
| 5,654,961 | A | 8/1997 | Araujo et al. |
| 5,655,015 | A | 8/1997 | Walsh et al. |
| 5,657,383 | A | 8/1997 | Gerber et al. |
| 5,659,542 | A | 8/1997 | Bell et al. |
| 5,659,604 | A | 8/1997 | Beckmann |
| 5,659,746 | A | 8/1997 | Bankert et al. |
| 5,673,304 | A | 9/1997 | Connor et al. |
| 5,673,311 | A | 9/1997 | Andruska et al. |
| 5,673,322 | A | 9/1997 | Pepe et al. |
| 5,675,637 | A | 10/1997 | Szlam et al. |
| 5,684,870 | A | 11/1997 | Maloney et al. |
| 5,689,229 | A | 11/1997 | Chaco et al. |
| 5,692,033 | A | 11/1997 | Farris |
| 5,696,809 | A | 12/1997 | Voit |
| 5,696,811 | A | 12/1997 | Maloney et al. |
| 5,701,400 | A | 12/1997 | Amado |
| 5,703,943 | A | 12/1997 | Otto |
| 5,706,453 | A | 1/1998 | Cheng et al. |
| 5,708,702 | A | 1/1998 | De Paul et al. |
| 5,712,901 | A | 1/1998 | Meermans |
| 5,715,306 | A | 2/1998 | Sunderman et al. |
| 5,715,307 | A | 2/1998 | Zazzera |
| 5,715,432 | A | 2/1998 | Xu et al. |
| 5,717,747 | A | 2/1998 | Boyle, III et al. |
| 5,721,770 | A | 2/1998 | Kohler |
| 5,724,412 | A | 3/1998 | Srinivasan |
| 5,724,418 | A | 3/1998 | Brady |
| 5,726,984 | A | 3/1998 | Kubler et al. |

(56) References Cited

U.S. PATENT DOCUMENTS 5,727,159 A 3/1998 Kikinis
5,729,594 A 3/1998 Klingman
5,732,078 A 3/1998 Arango
5,734,981 A 3/1998 Kennedy, III et al.
5,737,495 A 4/1998 Adams et al.
5,737,595 A 4/1998 Cohen et al.
5,737,726 A 4/1998 Cameron et al.
5,737,727 A 4/1998 Lehmann et al.
5,740,238 A 4/1998 Flockhart et al.
5,740,240 A 4/1998 Jolissaint
5,742,668 A 4/1998 Pepe et al.
5,742,670 A 4/1998 Bennett
5,742,675 A 4/1998 Kilander et al.
5,742,905 A 4/1998 Pepe et al.
5,745,687 A 4/1998 Randell
5,745,878 A 4/1998 Hashimoto et al.
5,748,884 A 5/1998 Royce et al.
5,748,907 A 5/1998 Crane
5,751,706 A 5/1998 Land et al.
5,751,707 A 5/1998 Voit et al.
5,751,795 A 5/1998 Hassler et al.
5,752,059 A 5/1998 Holleran et al.
5,752,244 A 5/1998 Rose et al.
5,752,246 A 5/1998 Rogers et al.
5,754,111 A 5/1998 Garcia
5,754,636 A 5/1998 Bayless et al.
5,754,639 A 5/1998 Flockhart et al.
5,754,655 A 5/1998 Hughes et al.
5,757,904 A 5/1998 Anderson
5,760,823 A 6/1998 Brunson et al.
5,761,289 A 6/1998 Keshav
5,764,736 A 6/1998 Shachar et al.
5,764,898 A 6/1998 Tsuji et al.
5,765,033 A 6/1998 Miloslavsky
5,768,360 A 6/1998 Reynolds et al.
5,768,527 A 6/1998 Zhu et al.
5,774,583 A 6/1998 Sasaki et al.
5,778,060 A 7/1998 Otto
5,778,178 A 7/1998 Arunachalam
5,778,377 A 7/1998 Marlin et al.
5,784,438 A 7/1998 Martinez
5,784,451 A 7/1998 Smith, Jr.
5,784,452 A 7/1998 Carney
5,787,160 A 7/1998 Chaney et al.
5,787,163 A 7/1998 Taylor et al.
5,790,635 A 8/1998 Dezonno
5,790,650 A 8/1998 Dunn et al.
5,790,789 A 8/1998 Suarez
5,790,798 A 8/1998 Beckett, II et al.
5,793,857 A 8/1998 Barnes et al.
5,793,861 A 8/1998 Haigh
5,794,039 A 8/1998 Guck
5,796,398 A 8/1998 Zimmer
5,796,729 A 8/1998 Greaney et al.
5,796,791 A 8/1998 Polcyn
5,796,813 A 8/1998 Sonnenberg
5,799,067 A 8/1998 Kikinis et al.
5,799,297 A 8/1998 Goodridge et al.
5,802,163 A 9/1998 Miloslavsky
5,802,253 A 9/1998 Gross et al.
5,802,283 A 9/1998 Grady et al.
5,802,314 A 9/1998 Tullis et al.
5,802,316 A 9/1998 Ito et al.
5,802,493 A 9/1998 Sheflott et al.
5,802,526 A 9/1998 Fawcett et al.
5,805,587 A 9/1998 Norris et al.
5,806,061 A 9/1998 Chaudhuri et al.
5,809,128 A 9/1998 McMullin
5,809,282 A 9/1998 Cooper et al.
5,809,512 A 9/1998 Kato
5,812,795 A 9/1998 Horovitz et al.
5,813,014 A 9/1998 Gustman
5,815,566 A 9/1998 Ramot et al.
5,818,935 A 10/1998 Maa
5,822,306 A 10/1998 Catchpole
5,822,400 A 10/1998 Smith
5,822,404 A 10/1998 Cave
5,822,526 A 10/1998 Waskiewicz
5,825,775 A 10/1998 Chin et al.
5,825,862 A 10/1998 Voit et al.
5,825,869 A 10/1998 Brooks et al.
5,825,870 A 10/1998 Miloslavsky
5,826,040 A 10/1998 Fargher et al.
5,826,269 A 10/1998 Hussey
5,828,747 A 10/1998 Fisher et al.
5,828,839 A 10/1998 Moncreiff
5,831,611 A 11/1998 Kennedy et al.
5,832,196 A 11/1998 Croslin et al.
5,835,090 A 11/1998 Clark et al.
5,835,583 A 11/1998 Hetz et al.
5,838,682 A 11/1998 Dekelbaum et al.
5,838,768 A 11/1998 Sumar et al.
5,838,774 A 11/1998 Weisser, Jr.
5,841,854 A 11/1998 Schumacher et al.
5,842,131 A 11/1998 Yamane
5,844,980 A 12/1998 Patel et al.
5,844,982 A 12/1998 Knitl
5,847,484 A 12/1998 Kuyama et al.
5,848,131 A 12/1998 Shaffer et al.
5,848,143 A * 12/1998 Andrews et al. ..... 379/265.09
5,850,433 A 12/1998 Rondeau
5,852,814 A 12/1998 Allen
5,857,184 A 1/1999 Lynch
5,862,134 A 1/1999 Deng
5,862,211 A 1/1999 Roush
5,862,223 A 1/1999 Walker et al.
5,864,616 A 1/1999 Hartmeier
5,864,848 A 1/1999 Horvitz et al.
5,867,484 A 2/1999 Shaunfield
5,867,494 A 2/1999 Krishnaswamy et al.
5,867,495 A 2/1999 Elliott et al.
5,867,559 A 2/1999 Jorgensen et al.
5,867,562 A 2/1999 Scherer
5,867,822 A 2/1999 Sankar
5,870,464 A 2/1999 Brewster et al.
5,870,549 A 2/1999 Bobo, II
5,872,841 A 2/1999 King et al.
5,872,926 A 2/1999 Levac et al.
5,873,032 A 2/1999 Cox et al.
5,873,040 A 2/1999 Dunn et al.
5,873,076 A 2/1999 Barr et al.
5,878,126 A 3/1999 Velamuri et al.
5,878,130 A 3/1999 Andrews et al.
5,878,230 A 3/1999 Weber et al.
5,881,146 A 3/1999 Hamilton
5,883,891 A 3/1999 Williams et al.
5,884,032 A 3/1999 Bateman et al.
5,884,262 A 3/1999 Wise et al.
5,887,173 A 3/1999 Ogawa et al.
5,889,474 A 3/1999 LaDue
5,889,774 A 3/1999 Mirashrafi et al.
5,889,799 A 3/1999 Grossman et al.
5,889,863 A 3/1999 Weber
5,892,764 A 4/1999 Riemann et al.
5,892,822 A 4/1999 Gottlieb et al.
5,893,912 A 4/1999 Freund et al.
5,894,512 A 4/1999 Zenner
5,896,444 A 4/1999 Perlman et al.
5,897,635 A 4/1999 Torres et al.
5,901,138 A 5/1999 Bader et al.
5,901,203 A 5/1999 Morganstein et al.
5,901,209 A 5/1999 Tannenbaum et al.
5,903,631 A 5/1999 Smith et al.
5,903,877 A 5/1999 Berkowitz et al.
5,905,495 A 5/1999 Tanaka et al.
5,905,792 A 5/1999 Miloslavsky
5,905,793 A 5/1999 Flockhart et al.
5,905,863 A 5/1999 Knowles et al.
5,907,547 A 5/1999 Foladare et al.
5,911,134 A 6/1999 Castonguay et al.
5,911,776 A 6/1999 Guck
5,914,941 A 6/1999 Janky
5,915,001 A 6/1999 Uppaluru
5,915,008 A 6/1999 Dulman

(56) References Cited

U.S. PATENT DOCUMENTS 5,915,011 A 6/1999 Miloslavsky
5,915,012 A 6/1999 Miloslavsky
5,916,302 A 6/1999 Dunn et al.
5,917,817 A 6/1999 Dunn et al.
5,917,898 A 6/1999 Bassa et al.
5,918,213 A 6/1999 Bernard et al.
5,920,621 A 7/1999 Gottlieb
5,920,719 A 7/1999 Sutton et al.
5,920,865 A 7/1999 Ariga
5,923,745 A 7/1999 Hurd
5,923,879 A 7/1999 Sasmazel et al.
5,926,535 A 7/1999 Reynolds
5,926,538 A 7/1999 Deryugin et al.
5,926,539 A 7/1999 Shtivelman
5,933,492 A 8/1999 Turovski
5,937,051 A 8/1999 Hurd et al.
5,937,057 A 8/1999 Bell et al.
5,937,162 A 8/1999 Funk et al.
5,937,388 A 8/1999 Davis et al.
5,938,725 A 8/1999 Hara
5,940,075 A 8/1999 Mutschler, III et al.
5,940,478 A 8/1999 Vaudreuil et al.
5,940,479 A 8/1999 Guy et al.
5,940,488 A 8/1999 DeGrazia et al.
5,940,495 A 8/1999 Bondarenko et al.
5,940,496 A 8/1999 Gisby et al.
5,940,497 A 8/1999 Miloslavsky
5,940,598 A 8/1999 Strauss et al.
5,940,823 A 8/1999 Schreiber et al.
5,943,416 A 8/1999 Gisby
5,946,375 A 8/1999 Pattison et al.
5,946,386 A * 8/1999 Rogers et al. ..... 379/265.09
5,946,387 A 8/1999 Miloslavsky
5,948,054 A 9/1999 Nielsen
5,949,988 A 9/1999 Feisullin et al.
5,953,332 A 9/1999 Miloslavsky
5,953,405 A 9/1999 Miloslavsky
5,953,406 A 9/1999 LaRue et al.
5,956,482 A 9/1999 Agraharam et al.
5,956,729 A 9/1999 Goetz et al.
5,958,014 A 9/1999 Cave
5,958,016 A 9/1999 Chang et al.
5,958,064 A 9/1999 Judd et al.
5,959,982 A 9/1999 Federkins et al.
5,960,073 A 9/1999 Kikinis et al.
5,960,411 A 9/1999 Hartman et al.
5,963,632 A 10/1999 Miloslavsky
5,963,635 A 10/1999 Szlam et al.
5,966,427 A 10/1999 Shaffer et al.
5,966,695 A 10/1999 Melchione et al.
5,970,065 A 10/1999 Miloslavsky
5,970,134 A 10/1999 Highland et al.
5,974,135 A 10/1999 Breneman et al.
5,974,414 A 10/1999 Stanczak et al.
5,974,448 A 10/1999 Yamauchi et al.
RE36,416 E 11/1999 Szlam et al.
5,978,465 A 11/1999 Corduroy et al.
5,978,467 A 11/1999 Walker et al.
5,978,672 A 11/1999 Hartmaier et al.
5,978,836 A 11/1999 Ouchi
5,982,774 A 11/1999 Foladare et al.
5,982,870 A 11/1999 Pershan et al.
5,982,873 A 11/1999 Flockhart et al.
5,983,218 A 11/1999 Syeda-Mahmood
5,987,102 A 11/1999 Elliott et al.
5,987,117 A 11/1999 McNeil et al.
5,987,118 A 11/1999 Dickerman et al.
5,987,423 A 11/1999 Arnold et al.
5,987,446 A 11/1999 Corey et al.
5,991,365 A 11/1999 Pizano et al.
5,991,390 A 11/1999 Booton
5,991,391 A 11/1999 Miloslavsky
5,991,392 A 11/1999 Miloslavsky
5,991,393 A 11/1999 Kamen
5,991,394 A 11/1999 Dezonno et al.
5,991,395 A 11/1999 Miloslavsky
5,995,606 A 11/1999 Civanlar et al.
5,995,614 A 11/1999 Miloslavsky
5,995,615 A 11/1999 Miloslavsky
5,996,000 A 11/1999 Shuster
5,999,525 A 12/1999 Krishnaswamy et al.
5,999,609 A 12/1999 Nishimura
5,999,965 A * 12/1999 Kelly ..... 709/202
6,002,396 A 12/1999 Davies
6,002,760 A 12/1999 Gisby
6,003,034 A 12/1999 Tuli
6,005,845 A 12/1999 Svennesson et al.
6,005,920 A 12/1999 Fuller et al.
6,005,931 A 12/1999 Neyman et al.
6,009,163 A 12/1999 Nabkel et al.
6,011,792 A 1/2000 Miloslavsky
6,011,844 A 1/2000 Uppaluru et al.
6,011,974 A 1/2000 Cedervall et al.
6,012,152 A 1/2000 Douik et al.
6,014,137 A 1/2000 Burns
6,014,138 A 1/2000 Cain et al.
6,014,379 A 1/2000 White et al.
6,014,437 A 1/2000 Acker et al.
6,014,647 A 1/2000 Nizzari et al.
6,018,578 A 1/2000 Bondarenko et al.
6,018,579 A 1/2000 Petrunka
6,018,761 A 1/2000 Uomini
6,021,262 A 2/2000 Cote et al.
6,021,411 A 2/2000 Brophy et al.
6,021,428 A 2/2000 Miloslavsky
6,023,684 A 2/2000 Pearson
6,023,723 A 2/2000 McCormick et al.
6,026,087 A 2/2000 Mirashrafi et al.
6,026,375 A 2/2000 Hall et al.
6,028,917 A 2/2000 Creamer et al.
6,029,195 A 2/2000 Herz
6,038,293 A 3/2000 McNerney et al.
6,038,537 A 3/2000 Matsuoka
6,041,116 A 3/2000 Meyers
6,044,144 A 3/2000 Becker et al.
6,044,146 A 3/2000 Gisby et al.
6,044,368 A 3/2000 Powers
6,046,762 A 4/2000 Sonesh et al.
6,047,060 A 4/2000 Fedorov et al.
6,049,272 A 4/2000 Lee et al.
6,049,547 A 4/2000 Fisher et al.
6,049,779 A 4/2000 Berkson
6,052,514 A 4/2000 Gill et al.
6,055,307 A 4/2000 Behnke et al.
6,055,308 A 4/2000 Miloslavsky et al.
6,055,513 A 4/2000 Katz et al.
6,058,163 A 5/2000 Pattison et al.
6,058,389 A 5/2000 Chandra et al.
6,058,435 A 5/2000 Sassin et al.
6,061,054 A 5/2000 Jolly
6,064,667 A 5/2000 Gisby et al.
6,064,722 A 5/2000 Clise et al.
6,064,723 A 5/2000 Cohn et al.
6,064,730 A 5/2000 Ginsberg
6,064,973 A 5/2000 Smith et al.
6,067,357 A 5/2000 Kishinsky et al.
6,069,890 A 5/2000 White et al.
6,070,142 A 5/2000 McDonough et al.
6,070,144 A 5/2000 Ginsberg et al.
6,072,864 A 6/2000 Shtivelman et al.
6,073,013 A 6/2000 Agre et al.
6,073,105 A 6/2000 Sutcliffe et al.
6,073,109 A 6/2000 Flores et al.
6,073,124 A 6/2000 Krishnan et al.
6,075,783 A 6/2000 Voit
6,075,843 A 6/2000 Cave
6,076,101 A 6/2000 Kamakura et al.
6,076,105 A 6/2000 Wolff et al.
6,078,581 A 6/2000 Shtivelman et al.
6,078,583 A 6/2000 Takahara et al.
6,081,291 A 6/2000 Ludwig, Jr.
6,081,591 A 6/2000 Skoog
6,081,592 A 6/2000 Battle
6,085,097 A 7/2000 Savery et al.

(56) References Cited

U.S. PATENT DOCUMENTS

| | | | |
|---|---|---|---|
| 6,085,201 | A | 7/2000 | Tso |
| 6,088,340 | A | 7/2000 | Buchholz et al. |
| 6,088,696 | A | 7/2000 | Moon et al. |
| 6,088,717 | A | 7/2000 | Reed et al. |
| 6,094,479 | A | 7/2000 | Lindeberg et al. |
| 6,094,673 | A | 7/2000 | Dilip et al. |
| 6,097,804 | A | 8/2000 | Gilbert et al. |
| 6,097,938 | A | 8/2000 | Paxson |
| 6,098,065 | A | 8/2000 | Skillen et al. |
| 6,104,711 | A | 8/2000 | Voit |
| 6,104,800 | A | 8/2000 | Benson |
| 6,104,801 | A | 8/2000 | Miloslavsky |
| 6,104,802 | A | 8/2000 | Perlmutter |
| 6,108,688 | A | 8/2000 | Nielsen |
| 6,108,711 | A | 8/2000 | Beck et al. |
| 6,112,085 | A | 8/2000 | Garner et al. |
| 6,115,596 | A | 9/2000 | Raith et al. |
| 6,115,742 | A | 9/2000 | Franklin et al. |
| 6,118,865 | A | 9/2000 | Gisby |
| 6,119,155 | A | 9/2000 | Rossmann et al. |
| 6,119,167 | A | 9/2000 | Boyle et al. |
| 6,122,360 | A | 9/2000 | Neyman et al. |
| 6,122,364 | A | 9/2000 | Petrunka et al. |
| 6,122,365 | A | 9/2000 | Yegoshin |
| 6,122,632 | A | 9/2000 | Botts et al. |
| 6,125,113 | A | 9/2000 | Farris et al. |
| 6,125,126 | A | 9/2000 | Hallenst |
| 6,128,379 | A | 10/2000 | Smyk |
| 6,128,482 | A | 10/2000 | Nixon et al. |
| 6,128,603 | A | 10/2000 | Dent et al. |
| 6,128,646 | A | 10/2000 | Miloslavsky |
| 6,130,933 | A | 10/2000 | Miloslavsky |
| 6,134,217 | A | 10/2000 | Stiliadis et al. |
| 6,134,235 | A | 10/2000 | Goldman et al. |
| 6,134,315 | A | 10/2000 | Galvin |
| 6,134,318 | A | 10/2000 | O'Neil |
| 6,134,530 | A | 10/2000 | Bunting et al. |
| 6,137,870 | A | 10/2000 | Scherer |
| 6,138,139 | A | 10/2000 | Beck et al. |
| 6,141,345 | A | 10/2000 | Goeddel et al. |
| 6,148,074 | A | 11/2000 | Miloslavsky et al. |
| 6,157,653 | A | 12/2000 | Kline et al. |
| 6,157,655 | A | 12/2000 | Shtivelman |
| 6,157,924 | A | 12/2000 | Austin |
| 6,166,735 | A | 12/2000 | Dom et al. |
| 6,167,255 | A | 12/2000 | Kennedy, III et al. |
| 6,167,395 | A | 12/2000 | Beck et al. |
| 6,167,404 | A | 12/2000 | Morcos et al. |
| 6,170,011 | B1 | 1/2001 | MacLeod et al. |
| 6,173,052 | B1 | 1/2001 | Brady |
| 6,173,316 | B1 | 1/2001 | De Boor et al. |
| 6,175,562 | B1 | 1/2001 | Cave |
| 6,175,563 | B1 | 1/2001 | Miloslavsky |
| 6,175,564 | B1 | 1/2001 | Miloslavsky et al. |
| 6,175,620 | B1 | 1/2001 | Rouge et al. |
| 6,175,842 | B1 | 1/2001 | Kirk et al. |
| 6,178,239 | B1 | 1/2001 | Kishinsky et al. |
| 6,181,336 | B1 | 1/2001 | Chiu et al. |
| 6,181,736 | B1 | 1/2001 | McLaughlin et al. |
| 6,181,788 | B1 | 1/2001 | Miloslavsky |
| 6,182,059 | B1 | 1/2001 | Angotti et al. |
| 6,182,249 | B1 | 1/2001 | Wookey et al. |
| 6,185,287 | B1 | 2/2001 | Miloslavsky |
| 6,185,291 | B1 | 2/2001 | Miloslavsky |
| 6,185,292 | B1 | 2/2001 | Miloslavsky |
| 6,185,427 | B1 | 2/2001 | Krasner et al. |
| 6,185,535 | B1 | 2/2001 | Hedin et al. |
| 6,188,688 | B1 | 2/2001 | Buskirk, Jr. |
| 6,192,250 | B1 | 2/2001 | Buskens et al. |
| 6,195,357 | B1 | 2/2001 | Polcyn |
| 6,198,738 | B1 | 3/2001 | Chang et al. |
| 6,198,739 | B1 | 3/2001 | Neyman et al. |
| 6,201,804 | B1 | 3/2001 | Kikinis |
| 6,201,863 | B1 | 3/2001 | Miloslavsky |
| 6,205,135 | B1 | 3/2001 | Chinni et al. |
| 6,205,412 | B1 | 3/2001 | Barskyy |
| 6,212,178 | B1 | 4/2001 | Beck et al. |
| 6,215,783 | B1 | 4/2001 | Neyman |
| 6,219,045 | B1 | 4/2001 | Leahy et al. |
| 6,219,413 | B1 | 4/2001 | Burg |
| 6,222,919 | B1 | 4/2001 | Hollatz et al. |
| 6,226,285 | B1 | 5/2001 | Kozdon et al. |
| 6,229,524 | B1 | 5/2001 | Chernock et al. |
| 6,229,888 | B1 | 5/2001 | Miloslavsky |
| 6,230,197 | B1 | 5/2001 | Beck et al. |
| 6,233,234 | B1 | 5/2001 | Curry et al. |
| 6,233,616 | B1 | 5/2001 | Reid |
| 6,236,857 | B1 | 5/2001 | Calabrese et al. |
| 6,240,285 | B1 | 5/2001 | Blum et al. |
| 6,243,092 | B1 | 6/2001 | Okita et al. |
| 6,243,373 | B1 | 6/2001 | Turock |
| 6,243,375 | B1 | 6/2001 | Speicher |
| 6,243,379 | B1 | 6/2001 | Veerina et al. |
| 6,243,713 | B1 | 6/2001 | Nelson et al. |
| 6,249,807 | B1 | 6/2001 | Shaw et al. |
| 6,253,129 | B1 | 6/2001 | Jenkins et al. |
| 6,256,489 | B1 | 7/2001 | Lichter et al. |
| 6,256,503 | B1 | 7/2001 | Stephens |
| 6,259,692 | B1 | 7/2001 | Shtivelman et al. |
| 6,259,774 | B1 | 7/2001 | Miloslavsky |
| 6,259,786 | B1 | 7/2001 | Gisby |
| 6,263,049 | B1 | 7/2001 | Kuhn |
| 6,263,065 | B1 | 7/2001 | Durinovic-Johri et al. |
| 6,263,066 | B1 | 7/2001 | Shtivelman et al. |
| 6,263,359 | B1 | 7/2001 | Fong et al. |
| 6,275,693 | B1 | 8/2001 | Lin et al. |
| 6,278,996 | B1 | 8/2001 | Richardson et al. |
| 6,282,429 | B1 | 8/2001 | Baiyor et al. |
| 6,282,565 | B1 | 8/2001 | Shaw et al. |
| 6,285,316 | B1 | 9/2001 | Nir et al. |
| 6,285,364 | B1 | 9/2001 | Giordano, III et al. |
| 6,286,033 | B1 | 9/2001 | Kishinsky et al. |
| 6,286,084 | B1 | 9/2001 | Wexler et al. |
| 6,286,129 | B1 | 9/2001 | Agarwal et al. |
| 6,289,094 | B1 | 9/2001 | Miloslavsky |
| 6,292,181 | B1 | 9/2001 | Banerjee et al. |
| 6,292,553 | B1 * | 9/2001 | Fellingham et al. ..... 379/221.02 |
| 6,295,353 | B1 | 9/2001 | Flockhart et al. |
| 6,295,530 | B1 | 9/2001 | Ritchie et al. |
| 6,298,041 | B1 | 10/2001 | Packer |
| 6,301,480 | B1 | 10/2001 | Kennedy, III et al. |
| 6,304,898 | B1 | 10/2001 | Shiigi |
| 6,314,089 | B1 | 11/2001 | Szlam et al. |
| 6,314,430 | B1 | 11/2001 | Chang |
| 6,320,857 | B1 | 11/2001 | Tonnby et al. |
| 6,320,951 | B1 | 11/2001 | Shtivelman et al. |
| 6,324,276 | B1 | 11/2001 | Uppaluru et al. |
| 6,330,323 | B1 | 12/2001 | Gottlieb et al. |
| 6,330,426 | B2 | 12/2001 | Brown et al. |
| 6,332,022 | B1 | 12/2001 | Martinez |
| 6,332,154 | B2 | 12/2001 | Beck et al. |
| 6,332,163 | B1 | 12/2001 | Bowman-Amuah |
| 6,333,980 | B1 | 12/2001 | Hollatz et al. |
| 6,335,927 | B1 | 1/2002 | Elliott et al. |
| 6,337,904 | B1 | 1/2002 | Gisby |
| 6,339,593 | B1 | 1/2002 | Kikinis |
| 6,343,281 | B1 | 1/2002 | Kato |
| 6,345,290 | B2 | 2/2002 | Okada et al. |
| 6,345,300 | B1 | 2/2002 | Bakshi et al. |
| 6,345,305 | B1 | 2/2002 | Beck et al. |
| 6,346,952 | B1 | 2/2002 | Shtivelman |
| 6,347,085 | B2 | 2/2002 | Kelly |
| 6,353,608 | B1 | 3/2002 | Cullers et al. |
| 6,353,667 | B1 | 3/2002 | Foster et al. |
| 6,359,981 | B1 | 3/2002 | Neyman et al. |
| 6,362,838 | B1 | 3/2002 | Szlam et al. |
| 6,363,411 | B1 | 3/2002 | Dugan et al. |
| 6,366,575 | B1 | 4/2002 | Barkan et al. |
| 6,366,586 | B1 | 4/2002 | Christie |
| 6,366,651 | B1 | 4/2002 | Griffith et al. |
| 6,366,658 | B1 | 4/2002 | Bjornberg et al. |
| 6,366,925 | B1 | 4/2002 | Meltzer et al. |
| 6,370,238 | B1 | 4/2002 | Sansone et al. |
| 6,370,508 | B2 | 4/2002 | Beck et al. |

(56) References Cited

U.S. PATENT DOCUMENTS 6,370,567 B1 4/2002 Ouchi
6,373,836 B1 4/2002 Deryugin et al.
6,373,937 B1 4/2002 Yegoshin
6,377,568 B1 4/2002 Kelly
6,377,583 B1 4/2002 Lyles et al.
6,377,944 B1 4/2002 Busey et al.
6,377,975 B1 4/2002 Florman
6,381,640 B1 4/2002 Beck et al.
6,385,191 B1 * 5/2002 Coffman et al. ..... 370/352
6,385,202 B1 5/2002 Katseff et al.
6,385,646 B1 5/2002 Brown et al.
6,389,007 B1 5/2002 Shenkman et al.
6,389,133 B1 5/2002 Kamen
6,393,018 B2 5/2002 Miloslavsky
6,393,122 B1 5/2002 Belzile
6,393,481 B1 5/2002 Deo et al.
6,396,834 B1 5/2002 Bonomi et al.
6,396,919 B1 5/2002 Shimada et al.
6,400,725 B1 6/2002 Ross
6,401,094 B1 6/2002 Stemp et al.
6,405,033 B1 6/2002 Kennedy, III et al.
6,407,996 B1 6/2002 Witchalls
6,407,999 B1 6/2002 Olkkonen et al.
6,408,064 B1 6/2002 Fedorov et al.
6,411,806 B1 6/2002 Garner et al.
6,418,146 B1 7/2002 Miloslavsky
6,418,199 B1 7/2002 Perrone
6,424,709 B1 7/2002 Doyle et al.
6,427,002 B2 7/2002 Campbell et al.
6,430,174 B1 8/2002 Jennings et al.
6,430,282 B1 8/2002 Bannister et al.
6,434,231 B2 8/2002 Neyman et al.
6,434,530 B1 8/2002 Sloane et al.
6,434,549 B1 8/2002 Linetsky et al.
6,442,242 B1 8/2002 McAllister et al.
6,442,247 B1 8/2002 Garcia
6,445,788 B1 9/2002 Torba
6,449,260 B1 9/2002 Sassin et al.
6,449,270 B1 9/2002 Miloslavsky
6,449,358 B1 9/2002 Anisimov et al.
6,449,646 B1 9/2002 Sikora et al.
6,452,609 B1 9/2002 Katinsky et al.
6,453,038 B1 9/2002 McFarlane et al.
6,453,341 B1 9/2002 Miloslavsky
6,456,615 B1 9/2002 Kikinis
6,456,619 B1 9/2002 Sassin et al.
6,459,697 B1 10/2002 Neyman
6,463,148 B1 10/2002 Brady
6,470,010 B1 10/2002 Szviatovszki et al.
6,470,080 B2 10/2002 Perlmutter
6,473,787 B2 10/2002 Miloslavsky
6,480,600 B1 11/2002 Neyman et al.
6,487,663 B1 11/2002 Jaisimha et al.
6,490,350 B2 12/2002 McDuff et al.
6,493,447 B1 12/2002 Goss et al.
6,496,567 B1 12/2002 Bjornberg et al.
6,496,702 B1 12/2002 Lockhart
6,496,981 B1 12/2002 Wistendahl et al.
6,498,897 B1 12/2002 Nelson et al.
6,499,088 B1 12/2002 Wexler et al.
6,512,825 B1 1/2003 Lindholm et al.
6,515,996 B1 2/2003 Tonnby et al.
6,519,617 B1 2/2003 Wanderski et al.
6,532,493 B1 3/2003 Aviani, Jr. et al.
6,535,492 B2 3/2003 Shtivelman
6,536,043 B1 3/2003 Guedalia
6,539,419 B2 3/2003 Beck et al.
6,546,405 B2 4/2003 Gupta et al.
6,549,539 B1 4/2003 Neyman
6,553,114 B1 4/2003 Fisher et al.
6,554,183 B1 4/2003 Sticha et al.
6,560,328 B1 5/2003 Bondarenko et al.
6,560,329 B1 5/2003 Draginich et al.
6,563,788 B1 5/2003 Torba et al.
6,581,105 B2 6/2003 Miloslavsky et al.
6,594,269 B1 7/2003 Polcyn
6,597,685 B2 7/2003 Miloslavsky et al.
6,600,733 B2 7/2003 Deng
6,600,822 B2 7/2003 Kamen
6,603,762 B1 8/2003 Kikinis
6,611,498 B1 8/2003 Baker et al.
6,611,590 B1 8/2003 Lu et al.
6,614,780 B2 9/2003 Hakim et al.
6,625,139 B2 9/2003 Miloslavsky et al.
6,628,666 B1 9/2003 Pickering et al.
6,631,399 B1 10/2003 Stanczak et al.
6,633,910 B1 10/2003 Rajan et al.
6,650,747 B1 11/2003 Bala et al.
6,651,085 B1 11/2003 Woods
6,668,286 B2 * 12/2003 Noble et al. ..... 710/6
6,678,718 B1 * 1/2004 Khouri et al. ..... 709/204
6,681,010 B1 1/2004 Anderson et al.
6,687,241 B1 2/2004 Goss
6,693,893 B1 * 2/2004 Ehlinger ..... 370/352
6,704,409 B1 3/2004 Dilip et al.
6,704,410 B1 3/2004 McFarlane et al.
6,704,411 B1 3/2004 Nishidate
6,707,903 B2 3/2004 Burok et al.
6,711,249 B2 3/2004 Weissman et al.
6,711,611 B2 3/2004 Hanhan
6,714,643 B1 3/2004 Gargeya et al.
6,718,032 B1 4/2004 Vrenjak et al.
6,718,366 B2 4/2004 Beck et al.
6,721,306 B1 4/2004 Farris et al.
6,731,626 B1 5/2004 Neyman
6,735,298 B2 5/2004 Neyman et al.
6,744,877 B1 6/2004 Edwards
6,744,878 B1 6/2004 Komissarchik et al.
6,748,211 B1 6/2004 Isaac et al.
6,751,210 B1 6/2004 Shaffer et al.
6,753,784 B1 6/2004 Sznaider et al.
6,754,181 B1 6/2004 Elliott et al.
6,760,322 B1 7/2004 Fukuda et al.
6,760,324 B1 7/2004 Scott et al.
6,760,428 B2 7/2004 Foster
6,760,727 B1 7/2004 Schroeder et al.
6,763,104 B1 7/2004 Judkins et al.
6,763,369 B1 7/2004 Ytuarte et al.
6,771,765 B1 8/2004 Crowther et al.
6,778,527 B1 * 8/2004 Amin ..... 370/352
6,785,375 B1 8/2004 Beddus et al.
6,785,710 B2 8/2004 Kikinis
6,785,740 B1 8/2004 Yoneda et al.
6,788,779 B2 9/2004 Ostapchuck
6,798,771 B1 9/2004 Low et al.
6,801,520 B2 10/2004 Philonenko
6,801,928 B2 10/2004 Nuestro
6,804,346 B1 10/2004 Mewhinney
6,816,871 B2 11/2004 Lee
6,816,878 B1 11/2004 Zimmers et al.
6,845,154 B1 1/2005 Cave et al.
6,847,715 B1 1/2005 Swartz
6,847,825 B1 1/2005 Duvall et al.
6,850,602 B1 2/2005 Chou
6,859,529 B2 2/2005 Duncan et al.
6,865,267 B2 3/2005 Dezonno
6,868,391 B1 3/2005 Hultgren
6,874,119 B2 3/2005 MacLeod et al.
6,876,632 B1 4/2005 Takeda
6,879,586 B2 4/2005 Turovsky et al.
6,882,996 B2 4/2005 Preisig et al.
6,898,190 B2 5/2005 Shtivelman et al.
6,903,685 B1 6/2005 Arndt et al.
6,907,455 B1 6/2005 Wolfe et al.
6,910,072 B2 6/2005 MacLeod et al.
6,912,272 B2 6/2005 Kirk et al.
6,922,411 B1 7/2005 Taylor
6,922,689 B2 7/2005 Shtivelman
6,934,379 B2 8/2005 Falcon et al.
6,934,381 B1 * 8/2005 Klein et al. ..... 379/265.09
6,944,272 B1 9/2005 Thomas
6,958,994 B2 10/2005 Zhakov et al.
6,965,914 B2 11/2005 Dowling
6,970,844 B1 11/2005 Bierenbaum

(56) References Cited

U.S. PATENT DOCUMENTS

| | | | |
|---|---|---|---|
| 6,977,740 | B1 | 12/2005 | Mandalia |
| 6,981,020 | B2 | 12/2005 | Miloslavsky et al. |
| 6,985,478 | B2 | 1/2006 | Pogossiants et al. |
| 6,985,943 | B2 | 1/2006 | Deryugin et al. |
| 6,987,977 | B2 | 1/2006 | Lockhart |
| 6,996,603 | B1 | 2/2006 | Srinivasan |
| 7,020,264 | B1 | 3/2006 | Neyman et al. |
| 7,031,442 | B1 | 4/2006 | Neyman et al. |
| 7,039,176 | B2 | 5/2006 | Borodow et al. |
| 7,039,857 | B2 | 5/2006 | Beck et al. |
| 7,076,048 | B2 | 7/2006 | Lee et al. |
| 7,079,641 | B2 | 7/2006 | Ostapchuck |
| 7,080,092 | B2 | 7/2006 | Upton |
| 7,088,814 | B1 | 8/2006 | Shaffer et al. |
| 7,092,509 | B1 | 8/2006 | Mears et al. |
| 7,106,850 | B2 | 9/2006 | Campbell et al. |
| 7,110,523 | B2 | 9/2006 | Gagle et al. |
| 7,110,525 | B1 | 9/2006 | Heller et al. |
| 7,117,244 | B2 | 10/2006 | Florman et al. |
| 7,120,700 | B2 | 10/2006 | MacLeod et al. |
| 7,127,400 | B2 | 10/2006 | Koch |
| 7,133,830 | B1 | 11/2006 | Hoban et al. |
| 7,136,475 | B1 | 11/2006 | Rogers et al. |
| 7,155,496 | B2 | 12/2006 | Froyd et al. |
| 7,155,512 | B2 | 12/2006 | Lean et al. |
| 7,159,224 | B2 | 1/2007 | Sharma et al. |
| 7,167,924 | B1 | 1/2007 | Symonds et al. |
| 7,184,747 | B2 | 2/2007 | Bogat |
| 7,216,350 | B2 | 5/2007 | Martin et al. |
| 7,221,377 | B1 | 5/2007 | Okita et al. |
| 7,222,301 | B2 | 5/2007 | Makagon et al. |
| 7,231,032 | B2 | 6/2007 | Nevman et al. |
| 7,236,486 | B2 | 6/2007 | Baker et al. |
| 7,236,584 | B2 | 6/2007 | Torba |
| 7,242,760 | B2 | 7/2007 | Shires |
| 7,246,009 | B2 | 7/2007 | Hamblen et al. |
| 7,254,219 | B1 | 8/2007 | Hansen et al. |
| 7,254,641 | B2 | 8/2007 | Broughton et al. |
| 7,263,372 | B2 | 8/2007 | Lockhart |
| 7,263,671 | B2 | 8/2007 | Hull et al. |
| 7,269,263 | B2 | 9/2007 | Dedieu et al. |
| 7,272,627 | B2 | 9/2007 | Petrovykh |
| 7,277,536 | B2 | 10/2007 | Ostapchuk |
| 7,277,916 | B2 | 10/2007 | Nuestro |
| 7,283,519 | B2 | 10/2007 | Girard |
| 7,336,649 | B1 | 2/2008 | Huang |
| 7,363,228 | B2 | 4/2008 | Wyss et al. |
| 7,372,956 | B1 | 5/2008 | Kikinis et al. |
| 7,373,405 | B2 | 5/2008 | Deryugin et al. |
| 7,373,410 | B2 | 5/2008 | Monza et al. |
| 7,376,227 | B2 | 5/2008 | Anisimov et al. |
| 7,376,431 | B2 | 5/2008 | Niedermeyer |
| 7,401,112 | B1 | 7/2008 | Matz et al. |
| 7,415,009 | B2 | 8/2008 | Neyman |
| 7,418,094 | B2 | 8/2008 | Golitsin et al. |
| 7,428,303 | B2 | 9/2008 | Campbell et al. |
| 7,434,204 | B1 | 10/2008 | Everingham et al. |
| 7,460,496 | B2 | 12/2008 | Miloslavsky et al. |
| 7,496,640 | B2 | 2/2009 | Hanhan |
| 7,535,479 | B2 | 5/2009 | Okita et al. |
| 7,558,383 | B2 | 7/2009 | Shtivelman et al. |
| 7,561,887 | B2 | 7/2009 | Lockhart |
| 7,565,428 | B2 | 7/2009 | Deryugin et al. |
| 7,609,829 | B2 | 10/2009 | Wang et al. |
| 7,610,347 | B2 | 10/2009 | Petrovykh |
| 7,619,996 | B2 | 11/2009 | Miloslavsky et al. |
| 7,669,182 | B2 | 2/2010 | Garcia |
| 7,672,998 | B1 | 3/2010 | Haskins et al. |
| 7,706,520 | B1 | 4/2010 | Waterson et al. |
| 7,715,332 | B2 | 5/2010 | Miloslavsky et al. |
| 7,716,292 | B2 | 5/2010 | Kikinis |
| 7,739,325 | B1 | 6/2010 | Okita et al. |
| 7,764,231 | B1 | 7/2010 | Karr et al. |
| 7,769,161 | B1 | 8/2010 | Hession et al. |
| 7,779,067 | B2 | 8/2010 | Beck et al. |
| 7,792,773 | B2 | 9/2010 | McCord et al. |
| 7,808,977 | B2 | 10/2010 | Kikinis |
| 7,823,167 | B2 | 10/2010 | Makagon et al. |
| 7,853,717 | B2 | 12/2010 | Petrovykh |
| 7,856,095 | B2 | 12/2010 | Brown |
| 7,903,807 | B2 | 3/2011 | Neyman et al. |
| 7,907,598 | B2 | 3/2011 | Anisimov et al. |
| 7,929,978 | B2 | 4/2011 | Lockhart |
| 8,009,821 | B1 | 8/2011 | Apparao et al. |
| 8,018,921 | B2 | 9/2011 | Pogossiants et al. |
| 8,031,698 | B2 | 10/2011 | Neyman |
| 8,059,812 | B1 | 11/2011 | Bundy |
| 8,068,598 | B1 | 11/2011 | Russi et al. |
| 8,126,133 | B1 | 2/2012 | Everingham et al. |
| 8,130,749 | B2 | 3/2012 | Kikinis |
| 8,180,662 | B2 | 5/2012 | Minert et al. |
| 8,180,666 | B2 | 5/2012 | Minert et al. |
| 8,199,891 | B2 | 6/2012 | Brown et al. |
| 8,209,207 | B2 | 6/2012 | Minert et al. |
| 8,209,209 | B2 | 6/2012 | Minert et al. |
| 8,223,948 | B2 | 7/2012 | Minert et al. |
| 8,226,477 | B1 | 7/2012 | Machado et al. |
| 8,254,558 | B2 | 8/2012 | Minert et al. |
| 8,275,111 | B2 | 9/2012 | Golitsin et al. |
| 8,345,856 | B1 | 1/2013 | Anisimov et al. |
| 8,351,595 | B2 | 1/2013 | Peterson et al. |
| 8,358,769 | B2 | 1/2013 | Neyman et al. |
| 8,395,994 | B2 | 3/2013 | Stevenson et al. |
| 8,396,205 | B1 | 3/2013 | Lowry et al. |
| 8,411,844 | B1 | 4/2013 | Anisimov et al. |
| 2001/0000458 | A1 | 4/2001 | Shtivelman et al. |
| 2001/0001150 | A1 | 5/2001 | Miloslavsky |
| 2001/0011366 | A1 | 8/2001 | Beck et al. |
| 2001/0013041 | A1 | 8/2001 | MacLeod et al. |
| 2001/0014604 | A1 | 8/2001 | Kingdon et al. |
| 2001/0023430 | A1 | 9/2001 | Srinivasan |
| 2001/0023448 | A1 | 9/2001 | Hanhan |
| 2001/0024497 | A1 | 9/2001 | Campbell et al. |
| 2001/0025309 | A1 | 9/2001 | MacLeod et al. |
| 2001/0028649 | A1 | 10/2001 | Pogossiants et al. |
| 2001/0029519 | A1 | 10/2001 | Hallinan et al. |
| 2001/0037316 | A1 | 11/2001 | Shiloh |
| 2001/0038624 | A1* | 11/2001 | Greenberg et al. ..... 370/352 |
| 2001/0040887 | A1 | 11/2001 | Shtivelman et al. |
| 2001/0042095 | A1 | 11/2001 | Kim et al. |
| 2001/0043586 | A1 | 11/2001 | Miloslavsky |
| 2001/0043589 | A1 | 11/2001 | Kikinis |
| 2001/0044676 | A1 | 11/2001 | MacLeod et al. |
| 2001/0044828 | A1 | 11/2001 | Kikinis |
| 2001/0054064 | A1 | 12/2001 | Kannan |
| 2002/0001300 | A1 | 1/2002 | Miloslavsky et al. |
| 2002/0012428 | A1 | 1/2002 | Neyman et al. |
| 2002/0013150 | A1 | 1/2002 | McKenna et al. |
| 2002/0019844 | A1 | 2/2002 | Kurowski et al. |
| 2002/0019846 | A1 | 2/2002 | Miloslavsky et al. |
| 2002/0025819 | A1 | 2/2002 | Cetusic et al. |
| 2002/0035647 | A1* | 3/2002 | Brown et al. ..... 709/312 |
| 2002/0037076 | A1 | 3/2002 | Perlmutter |
| 2002/0041674 | A1 | 4/2002 | Kamen |
| 2002/0054579 | A1 | 5/2002 | Miloslavsky |
| 2002/0055853 | A1 | 5/2002 | MacLeod et al. |
| 2002/0056000 | A1 | 5/2002 | Coussement |
| 2002/0057671 | A1 | 5/2002 | Kikinis |
| 2002/0059164 | A1 | 5/2002 | Shtivelman |
| 2002/0059374 | A1 | 5/2002 | Nuestro |
| 2002/0060988 | A1 | 5/2002 | Shtivelman |
| 2002/0062385 | A1 | 5/2002 | Dowling |
| 2002/0064149 | A1 | 5/2002 | Elliott et al. |
| 2002/0076031 | A1 | 6/2002 | Falcon et al. |
| 2002/0078150 | A1 | 6/2002 | Thompson et al. |
| 2002/0087648 | A1 | 7/2002 | Petrovykh |
| 2002/0091726 | A1 | 7/2002 | MacLeod et al. |
| 2002/0095462 | A1 | 7/2002 | Beck et al. |
| 2002/0097708 | A1 | 7/2002 | Deng |
| 2002/0099738 | A1 | 7/2002 | Grant |
| 2002/0101866 | A1 | 8/2002 | Miloslavsky et al. |
| 2002/0101880 | A1 | 8/2002 | Kim |
| 2002/0103998 | A1 | 8/2002 | DeBruine |
| 2002/0105957 | A1 | 8/2002 | Bondarenko et al. |

(56) References Cited

U.S. PATENT DOCUMENTS

| | | | |
|---|---|---|---|
| 2002/0114278 | A1 | 8/2002 | Coussement |
| 2002/0114441 | A1 | 8/2002 | Coussement |
| 2002/0120719 | A1 | 8/2002 | Lee et al. |
| 2002/0123899 | A1 | 9/2002 | Hall et al. |
| 2002/0126828 | A1 | 9/2002 | Kamen |
| 2002/0131399 | A1 | 9/2002 | Philonenko |
| 2002/0136167 | A1 | 9/2002 | Steele et al. |
| 2002/0150311 | A1 | 10/2002 | Lynn |
| 2002/0169834 | A1 | 11/2002 | Miloslavsky et al. |
| 2003/0002479 | A1 | 1/2003 | Vortman et al. |
| 2003/0002652 | A1 | 1/2003 | Neyman et al. |
| 2003/0002654 | A1 | 1/2003 | Torba |
| 2003/0007621 | A1 | 1/2003 | Graves et al. |
| 2003/0009530 | A1 | 1/2003 | Philonenko et al. |
| 2003/0018702 | A1 | 1/2003 | Broughton et al. |
| 2003/0018729 | A1 | 1/2003 | Miloslavsky |
| 2003/0021259 | A1 | 1/2003 | Miloslavsky et al. |
| 2003/0021406 | A1 | 1/2003 | Ostapchuck |
| 2003/0026414 | A1 | 2/2003 | Baker et al. |
| 2003/0037113 | A1 | 2/2003 | Petrovykh |
| 2003/0043832 | A1 | 3/2003 | Anisimov et al. |
| 2003/0051037 | A1 | 3/2003 | Sundaram et al. |
| 2003/0055884 | A1 | 3/2003 | Yuen et al. |
| 2003/0058884 | A1 | 3/2003 | Kallner et al. |
| 2003/0084128 | A1 | 5/2003 | Anderson et al. |
| 2003/0084349 | A1 | 5/2003 | Friedrichs et al. |
| 2003/0088421 | A1 | 5/2003 | Maes et al. |
| 2003/0097457 | A1 | 5/2003 | Saran et al. |
| 2003/0099343 | A1 | 5/2003 | Dezonno |
| 2003/0115353 | A1 | 6/2003 | Deryugin et al. |
| 2003/0125048 | A1 | 7/2003 | Lockhart |
| 2003/0135592 | A1 | 7/2003 | Vetter et al. |
| 2003/0161448 | A1 | 8/2003 | Parolkar et al. |
| 2003/0179729 | A1 | 9/2003 | MacLeod et al. |
| 2003/0212558 | A1 | 11/2003 | Matula |
| 2003/0216923 | A1 | 11/2003 | Gilmore et al. |
| 2003/0220875 | A1 | 11/2003 | Lam et al. |
| 2003/0229529 | A1 | 12/2003 | Mui et al. |
| 2004/0017797 | A1 | 1/2004 | Chen et al. |
| 2004/0019638 | A1 | 1/2004 | Makagon et al. |
| 2004/0030557 | A1 | 2/2004 | Culy et al. |
| 2004/0047302 | A1 | 3/2004 | Dezonno et al. |
| 2004/0064348 | A1 | 4/2004 | Humenansky et al. |
| 2004/0081183 | A1 | 4/2004 | Monza et al. |
| 2004/0083195 | A1 | 4/2004 | McCord et al. |
| 2004/0083281 | A1 | 4/2004 | Makagon et al. |
| 2004/0083479 | A1 | 4/2004 | Bondarenko et al. |
| 2004/0083482 | A1 | 4/2004 | Makagon et al. |
| 2004/0102977 | A1 | 5/2004 | Metzler et al. |
| 2004/0107025 | A1 | 6/2004 | Ransom et al. |
| 2004/0111269 | A1 | 6/2004 | Koch |
| 2004/0120502 | A1 | 6/2004 | Strathmeyer et al. |
| 2004/0169675 | A1 | 9/2004 | Beck et al. |
| 2004/0179516 | A1 | 9/2004 | Neyman |
| 2004/0181574 | A1 | 9/2004 | Hanhan |
| 2004/0199580 | A1 | 10/2004 | Zhakov et al. |
| 2004/0208134 | A1 | 10/2004 | Neyman et al. |
| 2004/0208309 | A1 | 10/2004 | Miloslavsky |
| 2004/0213400 | A1 | 10/2004 | Golitsin et al. |
| 2004/0264678 | A1 | 12/2004 | Ostapchuck |
| 2004/0267892 | A1 | 12/2004 | Kikinis |
| 2005/0013417 | A1 | 1/2005 | Zimmers et al. |
| 2005/0033851 | A1 | 2/2005 | Kikinis |
| 2005/0041678 | A1 | 2/2005 | Nuestro |
| 2005/0128961 | A1 | 6/2005 | Miloslavsky et al. |
| 2005/0147090 | A1 | 7/2005 | MacLeod et al. |
| 2005/0154792 | A1 | 7/2005 | Deryugin et al. |
| 2005/0207559 | A1 | 9/2005 | Shtivelman et al. |
| 2006/0029206 | A1 | 2/2006 | Anisimov et al. |
| 2006/0034262 | A1 | 2/2006 | Pogossiants et al. |
| 2006/0079250 | A1 | 4/2006 | Lockhart |
| 2006/0080107 | A1 | 4/2006 | Hill et al. |
| 2006/0095568 | A1 | 5/2006 | Makagon et al. |
| 2006/0109976 | A1 | 5/2006 | Sundaram et al. |
| 2006/0133594 | A1 | 6/2006 | Neyman et al. |
| 2006/0153173 | A1 | 7/2006 | Beck et al. |
| 2006/0209797 | A1 | 9/2006 | Anisimov et al. |
| 2006/0210047 | A1 | 9/2006 | Neyman et al. |
| 2006/0245421 | A1 | 11/2006 | Ostapchuk |
| 2007/0002744 | A1 | 1/2007 | Mewhinney et al. |
| 2007/0041525 | A1 | 2/2007 | Tingley et al. |
| 2007/0041567 | A1 | 2/2007 | Anisimov et al. |
| 2007/0071224 | A1 | 3/2007 | Shtivelman et al. |
| 2007/0143301 | A1 | 6/2007 | Tran |
| 2007/0195940 | A1 | 8/2007 | Miloslavsky et al. |
| 2007/0213073 | A1 | 9/2007 | Lockhart |
| 2007/0274495 | A1 | 11/2007 | Youd et al. |
| 2008/0002822 | A1 | 1/2008 | Petrovykh |
| 2008/0013531 | A1 | 1/2008 | Elliott et al. |
| 2008/0043728 | A1 | 2/2008 | Miloslavsky et al. |
| 2008/0043955 | A1 | 2/2008 | Shtivelman et al. |
| 2008/0043975 | A1 | 2/2008 | Miloslavsky et al. |
| 2008/0043977 | A1 | 2/2008 | Neyman et al. |
| 2008/0046504 | A1 | 2/2008 | Deryugin et al. |
| 2008/0046531 | A1 | 2/2008 | Shtivelman et al. |
| 2008/0049731 | A1 | 2/2008 | Kikinis |
| 2008/0049737 | A1 | 2/2008 | Neyman |
| 2008/0049928 | A1 | 2/2008 | Miloslavsky et al. |
| 2008/0049929 | A1 | 2/2008 | Miloslavsky et al. |
| 2008/0062971 | A1 | 3/2008 | Kikinis |
| 2008/0130844 | A1 | 6/2008 | Hubbard et al. |
| 2008/0205378 | A1 | 8/2008 | Wyss et al. |
| 2008/0222240 | A1 | 9/2008 | Deryugin et al. |
| 2008/0285739 | A1 | 11/2008 | Golitsin et al. |
| 2009/0089136 | A1 | 4/2009 | Minert et al. |
| 2009/0089451 | A1 | 4/2009 | Petrovykh |
| 2009/0227267 | A1 | 9/2009 | Lockhart |
| 2009/0240346 | A1 | 9/2009 | Cadigan, Jr. et al. |
| 2010/0157979 | A1 | 6/2010 | Anisimov et al. |
| 2010/0198930 | A1 | 8/2010 | Kikinis |
| 2011/0099602 | A1 | 4/2011 | Apparao et al. |
| 2011/0178946 | A1 | 7/2011 | Minert et al. |
| 2011/0179304 | A1 | 7/2011 | Peterson |
| 2011/0179398 | A1 | 7/2011 | Peterson |
| 2011/0182418 | A1 | 7/2011 | Anisimov et al. |
| 2012/0047266 | A1 | 2/2012 | Minert |
| 2012/0066016 | A1 | 3/2012 | Minert et al. |
| 2012/0195415 | A1 | 8/2012 | Wyss et al. |
| 2013/0016115 | A1 | 1/2013 | Minert et al. |
| 2013/0129067 | A1 | 5/2013 | Neyman et al. |
| 2013/0230160 | A1 | 9/2013 | Neyman et al. |

FOREIGN PATENT DOCUMENTS

| | | |
|---|---|---|
| AT | 316736 | 2/2006 |
| AT | 317621 | 2/2006 |
| AT | 318048 | 3/2006 |
| AT | 337678 | 9/2006 |
| AT | 379921 | 12/2007 |
| AT | 380434 | 12/2007 |
| AT | 384398 | 2/2008 |
| AT | 388578 | 3/2008 |
| AT | 401736 | 8/2008 |
| AT | 413059 | 11/2008 |
| AT | 424090 | 3/2009 |
| AT | 465451 | 5/2010 |
| AT | 474415 | 7/2010 |
| AU | 2604797 | 10/1997 |
| AU | 718233 B2 | 3/1998 |
| AU | 5274398 | 3/1998 |
| AU | 6023598 | 8/1998 |
| AU | 6034698 | 8/1998 |
| AU | 6167398 | 8/1998 |
| AU | 6319498 | 8/1998 |
| AU | 6655298 | 9/1998 |
| AU | 6655398 | 9/1998 |
| AU | 7099298 | 10/1998 |
| AU | 735134 B2 | 3/1999 |
| AU | 736449 B2 | 4/1999 |
| AU | 737483 B2 | 4/1999 |
| AU | 743217 B2 | 4/1999 |
| AU | 745404 B2 | 4/1999 |
| AU | 748636 B2 | 4/1999 |
| AU | 9225198 | 4/1999 |

(56) References Cited

FOREIGN PATENT DOCUMENTS

| | | | |
|---|---|---|---|
| AU | 9228098 | | 4/1999 |
| AU | 9381998 | | 4/1999 |
| AU | 9479298 | | 4/1999 |
| AU | 743880 | B2 | 5/1999 |
| AU | 1118899 | | 5/1999 |
| AU | 740090 | B2 | 6/1999 |
| AU | 743737 | B2 | 6/1999 |
| AU | 744340 | B2 | 6/1999 |
| AU | 1120099 | | 6/1999 |
| AU | 1276799 | | 6/1999 |
| AU | 1286299 | | 6/1999 |
| AU | 741437 | B2 | 8/1999 |
| AU | 758713 | B2 | 8/1999 |
| AU | 2595499 | | 8/1999 |
| AU | 2595599 | | 8/1999 |
| AU | 2667299 | | 8/1999 |
| AU | 2674899 | | 8/1999 |
| AU | 739979 | B2 | 9/1999 |
| AU | 2674799 | | 9/1999 |
| AU | 749023 | B2 | 12/1999 |
| AU | 4427299 | | 12/1999 |
| AU | 4819499 | | 12/1999 |
| AU | 746085 | B2 | 1/2000 |
| AU | 4426799 | | 1/2000 |
| AU | 750215 | B2 | 4/2000 |
| AU | 754238 | B2 | 4/2000 |
| AU | 755234 | B2 | 4/2000 |
| AU | 5807099 | | 4/2000 |
| AU | 5810599 | | 4/2000 |
| AU | 5813699 | | 4/2000 |
| AU | 748456 | B2 | 5/2000 |
| AU | 751143 | B2 | 5/2000 |
| AU | 751232 | B2 | 5/2000 |
| AU | 751269 | B2 | 5/2000 |
| AU | 751301 | B2 | 5/2000 |
| AU | 755138 | B2 | 5/2000 |
| AU | 1233800 | | 5/2000 |
| AU | 1327200 | | 5/2000 |
| AU | 1328200 | | 5/2000 |
| AU | 1328300 | | 5/2000 |
| AU | 1454700 | | 5/2000 |
| AU | 1717700 | | 5/2000 |
| AU | 1718600 | | 5/2000 |
| AU | 2045900 | | 6/2000 |
| AU | 748447 | B2 | 7/2000 |
| AU | 3113800 | | 7/2000 |
| AU | 2964900 | | 9/2000 |
| AU | 3470800 | | 9/2000 |
| AU | 4507700 | | 2/2001 |
| AU | 6798300 | | 4/2001 |
| AU | 1077201 | | 6/2001 |
| AU | 1077301 | | 6/2001 |
| AU | 8006800 | | 6/2001 |
| AU | 4732501 | | 10/2001 |
| AU | 5384201 | | 10/2001 |
| AU | 5724801 | | 11/2001 |
| AU | 756656 | B2 | 1/2003 |
| AU | 2003300117 | | 8/2004 |
| BR | 9913621 | A | 5/2001 |
| BR | 9913622 | A | 5/2001 |
| CA | 2178705 | A1 | 3/1997 |
| CA | 2391428 | A1 | 3/1997 |
| CA | 2259912 | C | 1/1998 |
| CA | 2280002 | A1 | 8/1998 |
| CA | 2289193 | A1 | 12/1998 |
| CA | 2289198 | A1 | 12/1998 |
| CA | 2302397 | A1 | 3/1999 |
| CA | 2302488 | A1 | 3/1999 |
| CA | 2302674 | A1 | 3/1999 |
| CA | 2302680 | A1 | 3/1999 |
| CA | 2302704 | A1 | 3/1999 |
| CA | 2302678 | A1 | 4/1999 |
| CA | 2308590 | A1 | 5/1999 |
| CA | 2309185 | A1 | 5/1999 |
| CA | 2309186 | A1 | 5/1999 |
| CA | 2309183 | A1 | 6/1999 |
| CA | 2320978 | A1 | 8/1999 |
| CA | 2320979 | A1 | 8/1999 |
| CA | 2320989 | A1 | 8/1999 |
| CA | 2330608 | A1 | 12/1999 |
| CA | 2334513 | A1 | 12/1999 |
| CA | 2343286 | A1 | 3/2000 |
| CA | 2343288 | A1 | 3/2000 |
| CA | 2343756 | A1 | 3/2000 |
| CA | 2347721 | A1 | 5/2000 |
| CA | 2348567 | A1 | 5/2000 |
| CA | 2348574 | A1 | 5/2000 |
| CA | 2348575 | C | 5/2000 |
| CA | 2348994 | A1 | 5/2000 |
| CA | 2348999 | A1 | 5/2000 |
| CA | 2350515 | A1 | 5/2000 |
| CA | 2352973 | A1 | 6/2000 |
| CA | 2362172 | A1 | 8/2000 |
| CA | 2313596 | A1 | 2/2001 |
| CN | 1282484 | A | 1/2001 |
| CN | 1282485 | A | 1/2001 |
| CN | 1285990 | A | 2/2001 |
| CN | 1285991 | A | 2/2001 |
| CN | 1293798 | A | 5/2001 |
| CN | 1293858 | A | 5/2001 |
| CN | 1298590 | A | 6/2001 |
| CN | 1309861 | A | 8/2001 |
| CN | 1310822 | A | 8/2001 |
| CN | 1323418 | A | 11/2001 |
| CN | 1323421 | A | 11/2001 |
| CN | 1354942 | A | 6/2002 |
| CN | 1130061 | C | 12/2003 |
| CN | 1132399 | C | 12/2003 |
| CN | 1145314 | C | 4/2004 |
| CN | 1149521 | C | 5/2004 |
| CN | 1152549 | C | 6/2004 |
| CN | 1512724 | A | 7/2004 |
| CN | 1520197 | A | 8/2004 |
| CN | 1197336 | C | 4/2005 |
| CN | 1200548 | C | 5/2005 |
| CN | 1662025 | A | 8/2005 |
| CN | 1232077 | C | 12/2005 |
| CN | 1756280 | A | 4/2006 |
| CN | 100477702 | C | 4/2009 |
| CN | 100547568 | C | 10/2009 |
| CN | 102257789 | A | 11/2011 |
| CN | 101635775 | B | 12/2011 |
| DE | 60011863 | T2 | 12/2004 |
| DE | 69730498 | T2 | 9/2005 |
| DE | 60015236 | T2 | 2/2006 |
| DE | 69832275 | T2 | 8/2006 |
| DE | 69833285 | T2 | 9/2006 |
| DE | 69833394 | T2 | 10/2006 |
| DE | 69833462 | T2 | 10/2006 |
| DE | 69833935 | T2 | 11/2006 |
| DE | 60214191 | T2 | 12/2006 |
| DE | 69834184 | T2 | 3/2007 |
| DE | 69838795 | T2 | 10/2008 |
| DE | 69838814 | T2 | 11/2008 |
| DE | 69839022 | T2 | 1/2009 |
| DE | 69839222 | T2 | 3/2009 |
| EP | 0193961 | A2 | 9/1986 |
| EP | 0236013 | A2 | 9/1987 |
| EP | 0376517 | A2 | 7/1990 |
| EP | 0420779 | A2 | 4/1991 |
| EP | 0424015 | A2 | 4/1991 |
| EP | 0425161 | A2 | 5/1991 |
| EP | 0425163 | A2 | 5/1991 |
| EP | 0515068 | A2 | 11/1992 |
| EP | 0528732 | A1 | 2/1993 |
| EP | 0532972 | A1 | 3/1993 |
| EP | 0539105 | A2 | 4/1993 |
| EP | 0559979 | A2 | 9/1993 |
| EP | 0568770 | A2 | 11/1993 |
| EP | 0610625 | A2 | 8/1994 |
| EP | 0647050 | A2 | 4/1995 |
| EP | 0647051 | A1 | 4/1995 |
| EP | 0660573 | A2 | 6/1995 |
| EP | 0701358 | A1 | 3/1996 |

(56) References Cited

FOREIGN PATENT DOCUMENTS

| | | | |
|---|---|---|---|
| EP | 0705017 | A2 | 4/1996 |
| EP | 0721268 | A2 | 7/1996 |
| EP | 0725526 | A2 | 8/1996 |
| EP | 0734187 | A2 | 9/1996 |
| EP | 0740450 | A2 | 10/1996 |
| EP | 0748102 | A2 | 12/1996 |
| EP | 0753956 | A2 | 1/1997 |
| EP | 0755146 | A2 | 1/1997 |
| EP | 0758175 | A1 | 2/1997 |
| EP | 0771095 | A2 | 5/1997 |
| EP | 0792076 | A2 | 8/1997 |
| EP | 0806858 | A2 | 11/1997 |
| EP | 0817455 | A2 | 1/1998 |
| EP | 0856980 | A2 | 8/1998 |
| EP | 0863651 | A2 | 9/1998 |
| EP | 0866407 | A1 | 9/1998 |
| EP | 0869639 | A2 | 10/1998 |
| EP | 0883306 | A2 | 12/1998 |
| EP | 0908047 | A1 | 4/1999 |
| EP | 0958560 | A1 | 11/1999 |
| EP | 0962087 | A1 | 12/1999 |
| EP | 1006706 | A2 | 6/2000 |
| EP | 1013062 | A1 | 6/2000 |
| EP | 1013066 | A1 | 6/2000 |
| EP | 1016280 | A1 | 7/2000 |
| EP | 1044553 | A1 | 10/2000 |
| EP | 1064630 | A1 | 1/2001 |
| EP | 1066712 | A1 | 1/2001 |
| EP | 1075153 | A2 | 2/2001 |
| EP | 1087597 | A2 | 3/2001 |
| EP | 1088277 | A1 | 4/2001 |
| EP | 1092313 | A1 | 4/2001 |
| EP | 1107555 | A2 | 6/2001 |
| EP | 1114543 | A1 | 7/2001 |
| EP | 1125214 | A1 | 8/2001 |
| EP | 1133677 | A2 | 9/2001 |
| EP | 1133736 | A1 | 9/2001 |
| EP | 1133742 | A1 | 9/2001 |
| EP | 1145153 | A1 | 10/2001 |
| EP | 1145154 | A1 | 10/2001 |
| EP | 1408678 | B1 | 11/2001 |
| EP | 1163564 | A2 | 12/2001 |
| EP | 1193961 | A2 | 4/2002 |
| EP | 1227635 | A2 | 7/2002 |
| EP | 1248447 | A2 | 10/2002 |
| EP | 1290861 | A1 | 3/2003 |
| EP | 1292901 | A1 | 3/2003 |
| EP | 1292939 | A1 | 3/2003 |
| EP | 1328121 | A1 | 7/2003 |
| EP | 0873642 | B1 | 4/2004 |
| EP | 1413954 | A2 | 4/2004 |
| EP | 1107615 | B1 | 6/2004 |
| EP | 1033024 | A4 | 9/2004 |
| EP | 1129545 | A1 | 9/2004 |
| EP | 1061723 | B1 | 10/2004 |
| EP | 1465397 | A1 | 10/2004 |
| EP | 1469663 | A1 | 10/2004 |
| EP | 1484903 | A2 | 12/2004 |
| EP | 1566949 | A1 | 8/2005 |
| EP | 0985308 | B1 | 11/2005 |
| EP | 1359735 | B1 | 1/2006 |
| EP | 1357729 | B1 | 2/2006 |
| EP | 1377001 | B1 | 2/2006 |
| EP | 0954922 | B1 | 3/2006 |
| EP | 0986875 | B1 | 4/2006 |
| EP | 1410614 | B1 | 8/2006 |
| EP | 1774760 | A2 | 4/2007 |
| EP | 1021905 | B1 | 11/2007 |
| EP | 1031232 | B1 | 12/2007 |
| EP | 1865697 | A3 | 12/2007 |
| EP | 1040638 | B1 | 1/2008 |
| EP | 1048162 | B1 | 3/2008 |
| EP | 1157509 | B1 | 7/2008 |
| EP | 1337079 | B1 | 9/2008 |
| EP | 1326415 | B1 | 10/2008 |
| EP | 1013054 | B1 | 2/2009 |
| EP | 1333653 | B1 | 4/2009 |
| EP | 0983676 | B1 | 6/2009 |
| EP | 1125208 | B1 | 4/2010 |
| EP | 1142284 | B1 | 7/2010 |
| EP | 2380323 | A1 | 10/2011 |
| EP | 1057301 | B1 | 8/2013 |
| EP | 1131728 | B1 | 1/2014 |
| EP | 1625460 | B1 | 5/2014 |
| ES | 2231120 | T3 | 5/2005 |
| ES | 2255657 | T3 | 7/2006 |
| ES | 2256666 | T3 | 7/2006 |
| ES | 2257639 | T3 | 8/2006 |
| FR | 2671252 | A1 | 7/1992 |
| GB | 2273225 | A | 6/1994 |
| GB | 2306853 | A | 5/1997 |
| GB | 2315190 | A | 1/1998 |
| GB | 2324627 | A | 10/1998 |
| GB | 2369263 | A | 5/2002 |
| JP | 62-200956 | | 9/1987 |
| JP | 63-149955 | | 6/1988 |
| JP | 64-7460 | | 1/1989 |
| JP | 64-77265 | | 3/1989 |
| JP | 02-298154 | | 12/1990 |
| JP | 03-052443 | | 3/1991 |
| JP | 03-160865 | | 7/1991 |
| JP | 03-177144 | | 8/1991 |
| JP | 04-40723 | | 2/1992 |
| JP | 4-66858 | | 6/1992 |
| JP | 04-265049 | | 9/1992 |
| JP | 4-336742 | | 11/1992 |
| JP | 04-371056 | | 12/1992 |
| JP | 06-044157 | | 2/1994 |
| JP | 06-046150 | | 2/1994 |
| JP | 06-066830 | | 3/1994 |
| JP | 06-069988 | | 3/1994 |
| JP | 06-103058 | | 4/1994 |
| JP | 06-121051 | | 4/1994 |
| JP | 06-261129 | | 9/1994 |
| JP | 06-291877 | | 10/1994 |
| JP | 06-334748 | | 12/1994 |
| JP | 07-046321 | | 2/1995 |
| JP | 07-058851 | | 3/1995 |
| JP | 07-115471 | | 5/1995 |
| JP | 07-170288 | | 7/1995 |
| JP | 07-170546 | | 7/1995 |
| JP | 07-262104 | | 10/1995 |
| JP | 07-319538 | | 12/1995 |
| JP | 07-336447 | | 12/1995 |
| JP | 08-46699 | | 2/1996 |
| JP | 08-056377 | | 2/1996 |
| JP | 08-163252 | | 6/1996 |
| JP | 08-181793 | | 7/1996 |
| JP | 08-214076 | | 8/1996 |
| JP | 08-214346 | | 8/1996 |
| JP | 8-321885 | | 12/1996 |
| JP | 8-329118 | | 12/1996 |
| JP | 09-036963 | | 2/1997 |
| JP | 09-504394 | | 4/1997 |
| JP | 09-149137 | | 6/1997 |
| JP | 09-163031 | | 6/1997 |
| JP | 09-224093 | | 8/1997 |
| JP | 09-265408 | | 10/1997 |
| JP | 10-11374 | | 1/1998 |
| JP | 10-13811 | | 1/1998 |
| JP | 10-093713 | | 4/1998 |
| JP | 10-093716 | | 4/1998 |
| JP | 10-116249 | | 5/1998 |
| JP | 10-143451 | | 5/1998 |
| JP | 10-214113 | | 8/1998 |
| JP | 10-224477 | | 8/1998 |
| JP | 10-509847 | | 9/1998 |
| JP | 10-304073 | | 11/1998 |
| JP | 10-304074 | | 11/1998 |
| JP | 10-327258 | | 12/1998 |
| JP | 10-513632 | | 12/1998 |
| JP | 11-055741 | | 2/1999 |
| JP | 11-506292 | | 6/1999 |
| JP | 11-183189 | | 7/1999 |

(56) References Cited

FOREIGN PATENT DOCUMENTS

| | | | |
|---|---|---|---|
| JP | 11-508430 | | 7/1999 |
| JP | 11-508715 | | 7/1999 |
| JP | 11-317817 | | 11/1999 |
| JP | 11-346266 | | 12/1999 |
| JP | 2000-011005 | | 1/2000 |
| JP | 2000-49847 | | 2/2000 |
| JP | 2000-151819 | | 5/2000 |
| JP | 2000-514985 | | 11/2000 |
| JP | 2000-514986 | | 11/2000 |
| JP | 2000-516432 | | 12/2000 |
| JP | 2000-517142 | | 12/2000 |
| JP | 2001-500677 | | 1/2001 |
| JP | 2001-103533 | | 4/2001 |
| JP | 2001-292236 | | 10/2001 |
| JP | 2001-517027 | | 10/2001 |
| JP | 2001-517029 | | 10/2001 |
| JP | 2001-517038 | | 10/2001 |
| JP | 2001-518754 | | 10/2001 |
| JP | 2001-522201 | | 11/2001 |
| JP | 2001-523930 | | 11/2001 |
| JP | 3226929 | B2 | 11/2001 |
| JP | 2001-524782 | | 12/2001 |
| JP | 2001-526871 | | 12/2001 |
| JP | 2002-503903 | | 2/2002 |
| JP | 2002-503921 | | 2/2002 |
| JP | 2002-504783 | | 2/2002 |
| JP | 2002-518890 | | 6/2002 |
| JP | 2002-519762 | | 7/2002 |
| JP | 2002-525895 | | 8/2002 |
| JP | 2002-528824 | | 9/2002 |
| JP | 2002-529836 | | 9/2002 |
| JP | 2002-529943 | | 9/2002 |
| JP | 2002-529944 | | 9/2002 |
| JP | 2002-529945 | | 9/2002 |
| JP | 2002-529994 | | 9/2002 |
| JP | 2002-530010 | | 9/2002 |
| JP | 2002-534003 | | 10/2002 |
| JP | 2002-537594 | | 11/2002 |
| JP | 2003-502720 | | 1/2003 |
| JP | 2003-507908 | | 2/2003 |
| JP | 2003-510929 | | 3/2003 |
| JP | 3384792 | B2 | 3/2003 |
| JP | 3393119 | B2 | 4/2003 |
| JP | 2003-516672 | | 5/2003 |
| JP | 3453561 | B2 | 10/2003 |
| JP | 3461488 | B2 | 10/2003 |
| JP | 3516656 | B2 | 4/2004 |
| JP | 3516659 | B2 | 4/2004 |
| JP | 3547142 | B2 | 7/2004 |
| JP | 3547397 | B2 | 7/2004 |
| JP | 2004-312730 | | 11/2004 |
| JP | 2005-504452 | | 2/2005 |
| JP | 3615708 | B2 | 2/2005 |
| JP | 3628962 | B2 | 3/2005 |
| JP | 2005-094780 | | 4/2005 |
| JP | 2005-102234 | | 4/2005 |
| JP | 2005-124184 | | 5/2005 |
| JP | 3681403 | B2 | 8/2005 |
| JP | 3681406 | B2 | 8/2005 |
| JP | 3686087 | B2 | 8/2005 |
| JP | 3686337 | B2 | 8/2005 |
| JP | 3735124 | B2 | 1/2006 |
| JP | 3820151 | | 9/2006 |
| JP | 2006-295947 | | 10/2006 |
| JP | 3877523 | B2 | 2/2007 |
| JP | 4057785 | B2 | 3/2008 |
| JP | 4205310 | B2 | 1/2009 |
| JP | 4234926 | B2 | 3/2009 |
| JP | 4295186 | B2 | 7/2009 |
| JP | 4450515 | B2 | 4/2010 |
| JP | 8-331618 | | 9/2011 |
| JP | 2012-513725 | | 6/2012 |
| KR | 10-2011-0098841 | A | 9/2011 |
| WO | WO9208194 | A1 | 5/1992 |
| WO | 9401959 | A1 | 1/1994 |
| WO | WO9429995 | A1 | 12/1994 |
| WO | WO9508236 | A2 | 3/1995 |
| WO | 9520860 | A1 | 8/1995 |
| WO | 9533325 | A2 | 12/1995 |
| WO | 9614704 | A1 | 5/1996 |
| WO | 9620553 | A2 | 7/1996 |
| WO | WO9623265 | A1 | 8/1996 |
| WO | 9627254 | A1 | 9/1996 |
| WO | 9701917 | A1 | 1/1997 |
| WO | 9713352 | A1 | 4/1997 |
| WO | WO9712472 | A1 | 4/1997 |
| WO | 9718662 | A1 | 5/1997 |
| WO | WO9716014 | A3 | 5/1997 |
| WO | 9722201 | A2 | 6/1997 |
| WO | WO9720424 | A1 | 6/1997 |
| WO | WO9723078 | A1 | 6/1997 |
| WO | 9726749 | A1 | 7/1997 |
| WO | 9729584 | A1 | 8/1997 |
| WO | WO9728635 | A1 | 8/1997 |
| WO | WO9734401 | A1 | 9/1997 |
| WO | 9738389 | A2 | 10/1997 |
| WO | WO9736414 | A1 | 10/1997 |
| WO | WO9737500 | A1 | 10/1997 |
| WO | WO9738519 | A1 | 10/1997 |
| WO | WO9750235 | A1 | 12/1997 |
| WO | WO9801987 | A1 | 1/1998 |
| WO | 9810573 | A2 | 3/1998 |
| WO | WO9813765 | A1 | 4/1998 |
| WO | WO9813974 | A1 | 4/1998 |
| WO | WO9817048 | A1 | 4/1998 |
| WO | 9827479 | A2 | 6/1998 |
| WO | WO9831130 | A1 | 7/1998 |
| WO | 9836551 | A1 | 8/1998 |
| WO | 9837481 | A1 | 8/1998 |
| WO | WO9834390 | A1 | 8/1998 |
| WO | WO9835326 | A1 | 8/1998 |
| WO | WO9835509 | A2 | 8/1998 |
| WO | WO9837677 | A2 | 8/1998 |
| WO | WO9837686 | A1 | 8/1998 |
| WO | WO9837687 | A1 | 8/1998 |
| WO | 9844714 | A1 | 10/1998 |
| WO | WO9844699 | A1 | 10/1998 |
| WO | WO9848577 | A2 | 10/1998 |
| WO | 9856133 | A2 | 12/1998 |
| WO | WO9854877 | A2 | 12/1998 |
| WO | WO9856141 | A1 | 12/1998 |
| WO | WO9857501 | A2 | 12/1998 |
| WO | 9900960 | A1 | 1/1999 |
| WO | WO9900966 | A1 | 1/1999 |
| WO | WO9903247 | A2 | 1/1999 |
| WO | 9914951 | A1 | 3/1999 |
| WO | WO9912367 | A1 | 3/1999 |
| WO | WO9913635 | A1 | 3/1999 |
| WO | WO9914919 | A1 | 3/1999 |
| WO | WO9914920 | A1 | 3/1999 |
| WO | WO9914924 | A1 | 3/1999 |
| WO | WO9917518 | A1 | 4/1999 |
| WO | WO9923806 | A1 | 5/1999 |
| WO | WO9923807 | A1 | 5/1999 |
| WO | WO9926395 | A1 | 5/1999 |
| WO | WO9926424 | A2 | 5/1999 |
| WO | WO9927698 | A1 | 6/1999 |
| WO | WO9941720 | A1 | 8/1999 |
| WO | WO9941890 | A2 | 8/1999 |
| WO | WO9941891 | A1 | 8/1999 |
| WO | WO9941895 | A1 | 8/1999 |
| WO | WO9943137 | A1 | 8/1999 |
| WO | WO9925117 | | 10/1999 |
| WO | WO9956227 | A1 | 11/1999 |
| WO | WO9956229 | A1 | 11/1999 |
| WO | WO9965214 | A1 | 12/1999 |
| WO | WO9965252 | A2 | 12/1999 |
| WO | WO9967718 | A1 | 12/1999 |
| WO | WO0007332 | A2 | 2/2000 |
| WO | 0018094 | A1 | 3/2000 |
| WO | WO0016203 | A1 | 3/2000 |
| WO | WO0016207 | A1 | 3/2000 |
| WO | WO0016523 | A1 | 3/2000 |
| WO | WO0025238 | A1 | 5/2000 |

(56) References Cited

FOREIGN PATENT DOCUMENTS

| | | | |
|---|---|---|---|
| WO | WO0026804 | A1 | 5/2000 |
| WO | WO0026816 | A1 | 5/2000 |
| WO | WO0026817 | A1 | 5/2000 |
| WO | WO0027063 | A2 | 5/2000 |
| WO | WO0028425 | A1 | 5/2000 |
| WO | WO0028702 | A1 | 5/2000 |
| WO | WO0035173 | A1 | 6/2000 |
| WO | WO0038398 | A1 | 6/2000 |
| WO | 0044159 | A1 | 7/2000 |
| WO | WO0049482 | A2 | 8/2000 |
| WO | WO0049778 | A1 | 8/2000 |
| WO | WO0113606 | A1 | 2/2001 |
| WO | WO0124025 | A1 | 4/2001 |
| WO | WO0140997 | A1 | 6/2001 |
| WO | WO0141372 | A1 | 6/2001 |
| WO | WO0143410 | A1 | 6/2001 |
| WO | WO0152513 | A1 | 7/2001 |
| WO | WO0180214 | A1 | 10/2001 |
| WO | WO0180540 | A1 | 10/2001 |
| WO | WO0184360 | A1 | 11/2001 |
| WO | WO02065741 | A2 | 8/2002 |
| WO | WO03010948 | A1 | 2/2003 |
| WO | WO20044063854 | A2 | 7/2004 |
| WO | WO2005036907 | A1 | 4/2005 |
| WO | WO2006055059 | A2 | 5/2006 |
| WO | WO175151 | A1 | 7/2010 |

OTHER PUBLICATIONS

Metz, Christopher, "IP Routers: New Tool for Gigabit Networking," On the Wire, IEEE Internet, Nov./Dec. 1998, 5 pages.

Microsoft Dictionary Pages, Microsoft Press, Redmond, WA, 1991, 2 pages.

Monson-Haefel, Richard, "Enterprise JavaBeans," O'Reilly & Assoc., 2nd Ed., 1999, 7 pages.

Murayama, Hideki, "Integrated Customer Supporting System View Workshop/CS, OA Business Personal Computer," NEC Business System, Denpa Press Co., Ltd., vol. 15, No. 12, Dec. 1997, 6 pages.

Nariani, Sushil, "Internet Telephony," Whatis.com, Oct. 25, 1999, 2 pages.

Newton'S Telecom Dictionary, The Official Dictionary of Telcommunications & the Internet, 16th Edition, Telecom Books, Feb. 2000, 3 pages.

Newton, Harry, "Newton's Telecom Dictionary," Flatiron Publishing, New York, 1994, 7 pages.

Orozco-Barbosa, Luis et al., "Design and Performance Evaluation of Intelligent Multimedia Services," Computer Communications, vol. 20, 1997, 14 pages.

Rangan, P. Venkat, et al., "A Window-Based Editor for Digital Video and Audio," Proceedings of the 25th Hawaii International Conference on System Sciences, IEEE, vol. 2, Jan. 1992, 9 pages.

Recker, Mimi M. et al., "Predicting Document Access in Large, Multimedia Repositories," ACM Transactions on Computer-Human Interaction, vol. 3, 1994, 23 pages.

Rodriguez-Martinez, Manuel et al., "MOCHA: A Self-Extensible Database Middleware System for Distributed Data Sources," International Conference on Management Data—SIGMOD, 2000, 12 pages.

Rosenberg, Arthur M., "Call Center Computer Telephony: Technology Overview," Gartner, Inc., Jan. 1998 (24 pages).

Schmandt, Chris, "Phoneshell: The Telephone as Computer Terminal," Proceedings of ACM Multimedia Conference, 1993, 10 pages.

Sekine, Shoji et al., "Front Office Oriented Solution for Customer Satisfaction and Profit Expansion," Hitachi Hyoron Co, Ltd., Japan, vol. 80, No. 9, Sep. 1998, 11 pages.

Semilof, Margie, "Call Centers Go On-Line," Communications Week, No Date Available, 2 pages.

Sevcik, Peter et al., "The Call Center Revolution," Northeast Consulting Technical Paper, Jan. 1, 1997, 12 pages.

Smith, J.D., An Overview to Computer-Telecommunications Integration (CTI), Telecommunications, Conference Publication No. 404, IEEE, Mar. 26-29, 1995, 5 pages.

Sulkin, Allan, Building the ACD-LAN Connection, Business Communications Review, Jun. 1996, 4 pages.

Supplemental European Search Report for Application No. 98908545.1, dated Sep. 5, 2002, 4 pages.

Szlam, Aleksander et al., "Predictive Dialing Fundamentals," Flatiron Publishing, New York, 1996, 28 pages.

Tadamura, Katsumi et al., "Synchronizing Computer Graphics Animation and Audio," IEEE, 1998, 11 pages.

Taisei, Mori et al., "Call Center: Promotion of Information Use with a Direct Link to Core Business with Eye on the Internet Customer," Ric Telecom Corporation, Japan, vol. 10, No. 8, Aug. 1, 1998, 9 pages.

Tang, Jingrong et al., "Advanced Service Architecture for H.323 Internet Protocol Telephony," Computer Communications, vol. 23, 2000, 14 pages.

Thio, Fu Wang et al., "Distributed Multimedia Database: a Design and Application Study," The Fourth International Conference on High Performance Computing in the Asia-Pacific Region, IEEE, Beijing, China, vol. 2, May 2000, 6 pages.

Toji, Ryutaro et al., "A Study of Customer Contact Operation System and Functions," Proceedings of the IECE General Conference, Comm. 2, Mar. 6, 1997, 3 pages.

Toji, Ryutaro et al., "OCN Multimedia Customer Contact System," NTT Technical Journal, the Telecommunication Association, Japan, vol. 10, No. 1, Jan. 1, 1998, 6 pages.

Tsunemasa, Mizuo., "CTI World 2: World of CTI," Business Communication, vol. 34, No. 2, Feb. 1, 1997, 13 pages.

Van Zijl, Lynette, et al., "A Tool for Graphical Network Modeling and Analysis," IEEE Software, Jan. 1992, 8 pages.

Vazquez, E., et al., Graphical Interface for Communication Network Analysis and Simulation, Department of Telematic Engineering, Technical University of Madrid, IEE, 1991, Spain, 4 pages.

Wagner, Susanne., "Intralingual Speech-to-Text Conversion in Real-Time: Challenges and Opportunities," Challenges of Multidimensional Translation Conference Proceedings, 2005, 10 pages.

Wang, Yong et al., "Real-time scheduling for multi-agent call center automation", Information service agents lab, school of computing science Simon Fraser University, Burnaby, BC Canada, 1999, 13 pages.

Wolter, Roger., "XML Web Services Basics," Microsoft Corporation, Dec. 2001, 4 pages.

Zenel, Bruce et al., Intelligent Communication Filtering for Limited Bandwidth Environments, Computer Science Department, Columnia University, IEEE, 1995, 7 pages.

"Competitive Gateway Product," Nikkei Communications, Japan, No. 257, Nov. 1997, 18 pages.

"Guide for the Use of Micro-Researcher II/SGR (Scroll Graph Section)," NEC Corporation, Third Edition, Chapters 1 & 5, Jul. 1995, 2 pages.

"Kana: Customer Messaging System," Kana Communications Sales Brochure, Palo Alto, CA, 1996, 12 pages.

"Latest Trend in CTI," Nikkei Communications, No. 248, Jun. 16, 1997, 14 pages.

"Method for Automatic Contextual Transposition Upon Receipt of Item of Specified Criteria," IBM Technical Disclosure Bulletin, vol. 37, No. 2B, Feb. 1994, 1 page.

"New Telephone Service Changing Computer Telephone Business," Nikkei Communications, Nov. 11, 1996, 7 pages.

"Single Line Suffices for Internet Telephone," Nikkei Communications, May 19, 1997, 9 pages.

"Solution Drivers/CTI, CTI Solution Strategy of Seven Computer Vendors, Toward Market Development of Mainly Bank, Insurance and Communications Markets," Computopia, Computer Age Co., Ltd., Japan, vol. 33, No. 379, 5 pages, Apr. 1998.

Bachmann, David W. et al., "NetMod: A Design Tool for Large-Scale Heterogeneous Campus Networks," Center for Information Technology Integration (CITI), The University of Michigan, Ann Arbor, MI, Jun. 15, 1990, 34 pages.

(56) References Cited

OTHER PUBLICATIONS

Bangun, H. et al., A Network Architecture for Multiuser Networked Games on Demand, International Conference on Information Communications and Signal Processing, ICICS '97, Sep. 9-12, 1997, 5 pages.
Bernett, Howard et al., "Assessing Web-Enabled Call Center Technologies," IT Pro, May/Jun. 2001, 7 pages.
Bertsekas, Dimitri et al., "Data Networks," Prentice-Hall, New Jersey, 1987, 5 pages.
Bickley, M. et al., Using Servers to Enhance Control System Capability, 1999 Particle Accelerator Conference, New York, NY, Mar. 29-Apr. 2, 1999, 3 pages.
Bradley, Kirk A. et al., "Detecting Disruptive Routers: a Distributed Network Monitoring Approach," Department of Computer Science, University of California, Davis, Sep. 1, 1998, 10 pages.
Canadian Office Action for Application No. 2,259,912, dated Nov. 19, 2011, 2 pages.
Canadian Office Action for Application No. 2,289,198, dated Jun. 28, 2002, 2 pages.
Canadian Office Action for Application No. 2,302,397, dated Apr. 23, 2002, 2 pages.
Canadian Office Action for Application No. 2,302,678, dated Apr. 23, 2002, 2 pages.
Canadian Office Action for Application No. 2308590, dated Jun. 28, 2002, 2 pages.
Canadian Office Action for Application No. 2309183, dated Jul. 23, 2002, 2 pages.
Canadian Office Action for Application No. 2320978, dated Jun. 2, 2003, 2 pages.
Canadian Office Action for Application No. 2320978, dated Sep. 26, 2002, 2 pages.
Canadian Office Action for Application No. 2334513, dated May 30, 2003, 2 pages.
Canadian Office Action for Application No. 2347721, dated Aug. 12, 2004, 3 pages.
Canadian Office Action for Application No. 2352973, dated Apr. 17, 2003, 3 pages.
Chan, Kevin F. et al., "Interactive Network Planning and Analysis on a Personal Computer," Computer Applications in Power, IEEE, vol. 3, No. 1, Jan. 1990, 5 pages.
Chau, Sam et al., "Intelligent Network Routing Using CCS7 and ISDN," Global Telecommunications Conference, vol. 3, 6 pages, 1990.
Chaudhuri, Surajit et al., "Optimizing Queries over Multimedia Repositories," Hewlett-Packard Laboratories, Stanford, Mar. 1996, 12 pages.
Chaum, David, "Untraceable Electronic Mail, Return Addresses, and Digital Pseudonyms," Communications of the ACM, vol. 24, No. 2, Feb. 1981, 8 pages.
Chew, T.-S. et al., "NETPLAN-a Telecommunications Network Planning Support System," TENCON '92, IEEE Region 10 International Conference, vol. 2, 7 pages, 1992.
Chinese Office Action for Application No. 200980151937.6, dated Jul. 1, 2013, 14 pages.
Chinese Office Action for Application No. 98812258.8 dated Jul. 26, 2002, 5 pages.
Chinese Office Action for Application No. 98812259.6, dated Jan. 10, 2003, 9 pages.
Chinese Office Action for Application No. 98812261.8, dated Jun. 20, 2003, 10 pages.
Chinese Office Action for Application No. 99808531.6, dated Mar. 14, 2003, 14 pages.
Chinese Office Action for Application No. 99811995.4, dated Apr. 8, 2005, 6 pages.
Chinese Office Action for Application No. 99811995.4, dated Jul. 6, 2007, 11 pages.
Chinese Office Action for Application No. 99811996.2, dated May 9, 2003, 10 pages.
Chiu, H. et al., "Conferencing Metaphor," IBM Technical Disclosure Bulletin, vol. 36, No. 2, Feb. 1993, 4 pages.
Chou, Sheng-Lin., et al., "Computer Telephony Integration and Its Applications," IEEE Communications Surveys & Tutorials, vol. 3, No. 1, 2000, 10 pages.
Cordom, Christopher et al., "CONVERSANT VIS Listens and Talks to Your Customers," AT&T Technology, vol. 9, No. 2, 4 pages, 1994.
Curbera, Francisco et al., "Unraveling the Web Services Web: An Introduction to SOAP, WSDL, and UDDI," IEEE Internet Computing, 8 pages, Mar./Apr. 2002.
D'Hooge, Herman, "The Communicating PC," IEEE Communications Magazine, 6 pages, Apr. 1996.
Durinovic-Johri, Sanja et al., "Advanced Routing Solutions for Toll-Free Customers: Algorithm Design and Performance," Proceedings of the International Teletraffic Congress, ITC-15, 1997, 12 pages.
Eren, P. Erhan, et al., "Interactive Object-Based Analysis and Manipulation of Digital Video," IEEE Workshop on Multimedia Signal Processing, 1998, 6 pages.
Esesve, D.R., "Wireless Application Protocol (WAP)," Vitam College of Engineering, No Date Available, 12 pages.
European Office action Application No. 03022831.6, dated Nov. 30, 2006, 7 pages.
European Office action Application No. 04011886.1, dated Mar. 9, 2007, 6 pages.
European Office action for Application No. 00115441.8, dated Feb. 11, 2004, 7 pages.
European Office action for Application No. 00115441.8, dated Mar. 15, 2005, 4 pages.
European Office Action for Application No. 00119160.0, dated Jan. 16, 2004, 6 pages.
European Office action for Application No. 00123329.5, dated Jun. 17, 2002, 6 pages.
European Office Action for Application No. 00123331.1, dated Apr. 18, 2006, 5 pages.
European Office Action for Application No. 00305049.9, dated Dec. 29, 2003, 5 pages.
European Office Action for Application No. 00908266.0, dated Aug. 10, 2005, 6 pages.
European Office action for Application No. 02400027.5, dated Jan. 21, 2008, 5 pages.
European Office action for Application No. 02756535.7, dated Aug. 5, 2005, 6 pages.
European Office Action for Application No. 03800376.0, dated Jul. 8, 2008, 6 pages.
European Office Action for Application No. 04009176.1, dated Oct. 12, 2011, 8 pages.
European Office Action for Application No. 97904087.0, dated Jun. 25, 2002, 5 pages.
European Office Action for Application No. 97933327.5, dated Aug. 26, 2002, 4 pages.
European Office Action for Application No. 97933327.5, dated Feb. 7, 2002, 5 pages.
European Office Action for Application No. 98903471.5, dated May 29, 2006, 4 pages.
European Office Action for Application No. 98903471.5, dated Oct. 11, 2004, 6 pages.
European Office Action for Application No. 98908545.1, dated Mar. 15, 2005, 4 pages.
European Office Action for Application No. 98908545.1, dated Nov. 14, 2003, 10 pages.
European Office Action for Application No. 98924821.6, dated Aug. 26, 2003, 4 pages.
European Office Action for Application No. 98926248.0, dated Aug. 5, 2004, 4 pages.
European Office Action for Application No. 98926248.0, dated Dec. 11, 2003, 4 pages.
European Office Action for Application No. 98926248.0, dated Oct. 21, 2002, 6 pages.
European Office Action for Application No. 98944799.0, dated Aug. 18, 2005, 7 pages.
European Office Action for Application No. 98944799.0, dated Mar. 26, 2008, 5 pages.
European Office Action for Application No. 98944830.3, dated Jan. 30, 2006, 9 pages.

(56) References Cited

OTHER PUBLICATIONS

European Office Action for Application No. 98946907.7, dated Jun. 1, 2006, 6 pages.
European Office Action for Application No. 98946926.7, dated Dec. 8, 2005, 4 pages.
European Office Action for Application No. 98953947.3, dated Aug. 22, 2006, 6 pages.
European Office Action for Application No. 98953962.2, dated Oct. 28, 2005, 5 pages.
European Office Action for Application No. 98956309.3, dated Jun. 8, 2005, 5 pages.
European Office Action for Application No. 99905907.4, dated Oct. 31, 2005, 4 pages.
European Office Action for Application No. 99906856.2, dated Sep. 24, 2007, 5 pages.
European Office Action for Application No. 99906958.6, dated Feb. 22, 2006, 7 pages.
European Office Action for Application No. 99927333.7, dated Aug. 21, 2006, 9 pages.
European Office Action for Application No. 99927340.2, dated Aug. 9, 2011, 6 pages.
European Office Action for Application No. 99927340.2, dated Nov. 25, 2013, 5 pages.
European Office Action for Application No. 99945479.6, dated Aug. 9, 2006, 6 pages.
European Office Action for Application No. 99945519.9, dated Aug. 20, 2007, 6 pages.
European Office action for Application No. 99956732.4, dated Aug. 17, 2006, 7 pages.
European Office action for Application No. 99956745.6, dated Mar. 14, 2006, 5 pages.
European Office Action for Application No. 99960267.5, dated May 10, 2007, 6 pages.
European Office Action for Application No. 99960279.0, dated Aug. 16, 2005, 6 pages.
European Office Action for Application No. 99965163.1, dated Jul. 13, 2009, 5 pages.
European Office for Application No. 00115441.8, dated May 18, 2006, 11 pages.
European Search Report and Written Opinion for Application No. 05783002.8, dated Mar. 16, 2009, 8 pages.
European Search Report for 0115441.8 (now EP1075153), dated Nov. 6, 2002, 3 pages.
European Search Report for Application No. 00123329.5, dated Jan. 30, 2002, 2 pages.
European Search Report for Application No. 00123331.1, dated Dec. 5, 2003, 6 pages.
European Search Report for Application No. 00305049.9, dated May 7, 2003, 3 pages.
European Search Report for Application No. 00908266.0, dated May 24, 2005, 3 pages.
European Search Report for Application No. 00913226.7, dated Feb. 14, 2005, 3 pages.
European Search Report for Application No. 0119160.0, dated Apr. 17, 2003, 3 pages.
European Search Report for Application No. 01920248.0, dated May 3, 2004, 3 pages.
European Search Report for Application No. 01927387.9, dated Jun. 2, 2006, 3 pages.
European Search Report for Application No. 02400027.5, dated Feb. 20, 2004, 3 pages.
European Search Report for Application No. 02756535.7, dated May 25, 2005, 4 pages.
European Search Report for Application No. 03002575.3, dated Jun. 4, 2003, 3 pages.
European Search Report for Application No. 03008532.8, dated Dec. 27, 2004, 3 pages.
European Search Report for Application No. 03008534.4, dated Jul. 23, 2003, 3 pages.
European Search Report for Application No. 03022831.6, dated Mar. 22, 2006, 3 pages.
European Search Report for Application No. 03023463.7, dated Jun. 14, 2004, 3 pages.
European Search Report for Application No. 03076826.1, dated Sep. 10, 2003, 3 pages.
European Search Report for Application No. 03077174.5, dated Sep. 4, 2003, 4 pages.
European Search Report for Application No. 03077712.2, dated Mar. 29, 2004, 3 pages.
European Search Report for Application No. 03800376, dated May 7, 2007, 3 pages.
European Search Report for Application No. 04007911.3, dated Aug. 17, 2004, 5 pages.
European Search Report for Application No. 04007913.9, dated Aug. 5, 2004, 4 pages.
European Search Report for Application No. 04011886.1, dated Jun. 22, 2006, 5 pages.
European Search Report for Application No. 07018035.1, dated Apr. 23, 2009, 4 pages.
European Search Report for Application No. 97904087.0, dated Nov. 5, 2001, 3 pages.
European Search Report for Application No. 97933327.5, dated Oct. 11, 2001, 3 pages.
European Search Report for Application No. 98903471.5, dated Jul. 26, 2002, 4 pages.
European Search Report for Application No. 98907371.3, dated Mar. 28, 2002, 3 pages.
European Search Report for Application No. 98924821.6, dated Jun. 13, 2002, 2 pages.
European Search Report for Application No. 98926248, dated Jul. 18, 2002, 3 pages.
European Search Report for Application No. 98944799.0, dated Aug. 5, 2004, 3 pages.
European Search Report for Application No. 98944830.3, dated Aug. 11, 2004, 3 pages.
European Search Report for Application No. 98946907.7, dated Aug. 11, 2004, 3 pages.
European Search Report for Application No. 98946926.7, dated Aug. 11, 2004, 3 pages.
European Search Report for Application No. 98948163.5, dated Aug. 8, 2000, 3 pages.
European Search Report for Application No. 98948164.3, dated Jun. 15, 2004, 3 pages.
European Search Report for Application No. 98953947.3, dated Aug. 20, 2004, 3 pages.
European Search Report for Application No. 98953962.2, dated Sep. 2, 2004, 3 pages.
European Search Report for Application No. 98956187.3, dated Sep. 16, 2005, 3 pages.
European Search Report for Application No. 98956309.3, dated Sep. 10, 2004, 3 pages.
European Search Report for Application No. 99905907.4, dated Jun. 1, 2005, 3 pages.
European Search Report for Application No. 99906856.2, dated Oct. 4, 2006, 3 pages.
European Search Report for Application No. 99906958.6, dated Aug. 19, 2005, 3 pages.
European Search Report for Application No. 99927333.7, dated Mar. 30, 2005, 5 pages.
European Search Report for Application No. 99927340.2, dated Oct. 18, 2004, 3 pages.
European Search Report for Application No. 99945479.6, dated Mar. 24, 2006, 3 pages.
European Search Report for Application No. 99945519.9, dated Oct. 18, 2005, 3 pages.
European Search Report for Application No. 99945556.1, dated Nov. 16, 2004, 3 pages.
European Search Report for Application No. 99956732.4, dated Apr. 19, 2006, 4 pages.
European Search Report for Application No. 99956745.6, dated Jun. 30, 2005, 3 pages.

(56) References Cited

OTHER PUBLICATIONS

European Search Report for Application No. 99960267.5, dated Jul. 14, 2005, 3 pages.
European Search Report for Application No. 99960279.0, dated Apr. 26, 2005, 3 pages.
European Search Report for Application No. 99965163.1, dated Nov. 19, 2004, 4 pages.
European Search Report for Application No. 99971602.0, dated Feb. 6, 2007, 3 pages.
European Search Report for Application No. 98903623.1, dated Apr. 17, 2002, 3 pages.
Festa, Paul, "Vignette Updates StoryServer Platform," CNET News.com, Sep. 16, 1997, 4 pages.
Foster, Robin Harris, "Advanced DEFINITY Call Centers: Working for You and Your Customers," AT&T Technology, vol. 9, No. 2, 1994, 6 pages.
Francis, Paul et al., "Flexible Routing and Addressing for a Next Generation IP," SIGCOMM, 10 pages, 1994.
Gawrys, G.W., et al., "ISDN: Integrated Network/Premises Solutions for Customer Needs," ICC, 6 pages, 1986.
Gechter, J. et al., "ISDN Service Opportunities in the Intelligent Network," Proceedings of the National Communications Forum, Chicago, IL, vol. 43, No. 1, Oct. 1989, 4 pages.
Harvey, Dean E. et al., "Call Center Solutions," AT&T Technical Journal, vol. 70, No. 5, 10 pages, Sep./Oct. 1991.
Held, Gilbert, "Voice Over Data Networks," McGraw Hill, Texas, 1998, 16 pages.
Henderson, Shane G. et al., "Rostering by Interating Integer Programming and Simulation," Proceedings of the 1998 Winter Simulation Conference, Washington D.C., Dec. 13, 1998, 7 pages.
Hofmann, Peter. et al., "@INGate: Integrating Telephony and Internet," IEEE Conference on Protocols for Multimedia Systems, 4 pages, Nov. 1997.
House, Eric, "How to Munge Outgoing From: Field When Using Mail?," Google Discussion Group, Apr. 2, 1997, 1 page.
Hu, Michael Junke et al., "An Object-Relational Database System for the Interactive Multimedia," IEEE International Conference on Intelligent Processing Systems, pp. 1571-1575, Oct. 1997.
International Preliminary Examination Report for PCT/US01/13313, dated Apr. 22, 2002, 4 pages.
International Preliminary Examination Report for PCT/US01/40267, dated Dec. 9, 2002, 4 pages.
International Preliminary Examination Report for PCT/US96/16919, dated Feb. 18, 1998, 18 pages.
International Preliminary Examination Report for PCT/US97/01469, dated Oct. 14, 1998, 8 pages.
International Preliminary Examination Report for PCT/US97/11881, dated Mar. 27, 1998, 3 pages.
International Preliminary Examination Report for PCT/US98/00631, dated Sep. 10, 1999, 7 pages.
International Preliminary Examination Report for PCT/US98/02847, dated Jul. 9, 1999, 5 pages.
International Preliminary Examination Report for PCT/US98/13644, dated Jan. 12, 2000, 6 pages.
International Preliminary Examination Report for PCT/US98/18646, dated Oct. 30, 2000, 5 pages.
International Preliminary Examination Report for PCT/US98/18789, dated Dec. 30, 1999, 6 pages.
International Preliminary Examination Report for PCT/US98/22527, dated Jun. 30, 2000, 5 pages.
International Preliminary Examination Report for PCT/US99/12841, dated Jan. 22, 2001, 5 pages.
International Preliminary Examination Report for PCT/US99/25308, dated Sep. 10, 2000, 3 pages.
International Preliminary Examination Report for PCT/US99/25309, dated May 8, 2001, 4 pages.
International Preliminary Report on Patentability for PCT/US2005/027544, dated May 22, 2007, 7 pages.
International Search Report and Written Opinion for PCT/US2009/068402, dated Mar. 31, 2010, 10 pages.
International Search Report for PCT/US00/00781, dated Apr. 12, 2000, 2 pages.
International Search Report for PCT/US00/00785, dated Oct. 2, 2000, 2 pages.
International Search Report for PCT/US00/023066, dated Oct. 30, 2000, 1 page.
International Search Report for PCT/US00/27982, dated Jan. 31, 2001, 3 pages.
International Search Report for PCT/US00/27983, dated Mar. 19, 2001, 2 pages.
International Search Report for PCT/US00/27984, dated Mar. 22, 2001, 1 page.
International Search Report for PCT/US01/07457, dated Aug. 30, 2001, 1 page.
International Search Report for PCT/US01/13313, dated Jul. 6, 2001, 1 page.
International Search Report for PCT/US01/40267, dated Jul. 17, 2001, 1 page.
International Search Report for PCT/US02/23080, dated Oct. 1, 2002, 1 page.
International Search Report for PCT/US03/41677, dated Apr. 10, 2006, 1 page.
International Search Report for PCT/US05/27544, dated Jun. 14, 2006, 1 page.
International Search Report for PCT/US96/16919, dated Jun. 2, 1997, 3 pages.
International Search Report for PCT/US97/01469, dated Apr. 14, 1997, 1 page.
International Search Report for PCT/US97/05457, dated Jun. 24, 1997, 2 pages.
International Search Report for PCT/US97/11881, dated Oct. 24, 1997, 1 page.
International Search Report for PCT/US98/00631, dated Jun. 18, 1998, 1 page.
International Search Report for PCT/US98/01158, dated Jul. 17, 1998, 1 page.
International Search Report for PCT/US98/02152, dated Jun. 25, 1998, 1 page.
International Search Report for PCT/US98/02847, dated Aug. 6, 1998, 1 page.
International Search Report for PCT/US98/02848, dated Aug. 11, 1998, 1 page.
International Search Report for PCT/US98/02923, dated Aug. 19, 1998, 1 page.
International Search Report for PCT/US98/06334, mailed Sep. 1, 1998, 2 pages.
International Search Report for PCT/US98/10357, dated Jan. 14, 1999, 1 page.
International Search Report for PCT/US98/11442, dated Oct. 21, 1998, 2 pages.
International Search Report for PCT/US98/13644, dated Apr. 21, 1999, 2 pages.
International Search Report for PCT/US98/18646, dated Jan. 29, 1999, 2 pages.
International Search Report for PCT/US98/18789, dated Jan. 29, 1999, 3 pages.
International Search Report for PCT/US98/18833, dated Nov. 19, 1998, 1 page.
International Search Report for PCT/US98/18874, dated Jan. 29, 1999, 1 page.
International Search Report for PCT/US98/18989, dated Jan. 25, 1999, 1 page.
International Search Report for PCT/US98/22527, dated Apr. 2, 1999, 2 pages.
International Search Report for PCT/US98/22555, mailed Mar. 3, 1999, 1 page.
International Search Report for PCT/US98/22600, mailed Jun. 4, 1999, 1 page.
International Search Report for PCT/US98/22935, mailed Apr. 14, 1999, 1 page.
International Search Report for PCT/US99/02812, mailed May 11, 1999, 1 page.

(56) References Cited

OTHER PUBLICATIONS

International Search Report for PCT/US99/02814, mailed Jun. 17, 1999, 1 page.
International Search Report for PCT/US99/02822, mailed Aug. 18, 1999, 1 page.
International Search Report for PCT/US99/03038, mailed Apr. 23, 1999, 1 page.
International Search Report for PCT/US99/03039, mailed May 11, 1999, 1 page.
International Search Report for PCT/US99/12700, mailed Nov. 30, 1999, 1 page.
International Search Report for PCT/US99/12781, mailed Sep. 9, 1999, 2 pages.
International Search Report for PCT/US99/12841, mailed Sep. 10, 1999, 2 pages.
International Search Report for PCT/US99/20259, dated Feb. 15, 2000, 1 page.
International Search Report for PCT/US99/20387, dated Dec. 7, 1999, 2 pages.
International Search Report for PCT/US99/20461, dated Dec. 23, 1999, 2 pages.
International Search Report for PCT/US99/25117, dated Nov. 1, 2000, 2 pages.
International Search Report for PCT/US99/25265, dated Feb. 18, 2000, 1 page.
International Search Report for PCT/US99/25308, dated Feb. 3, 2000, 1 page.
International Search Report for PCT/US99/25309, dated Feb. 10, 2000, 1 page.
International Search Report for PCT/US99/25310, dated Feb. 10, 2000, 1 page.
International Search Report for PCT/US99/26619, dated Mar. 17, 2000, 1 page.
International Search Report for PCT/US99/26659, dated Feb. 4, 2000, 1 page.
International Search Report for PCT/US99/29043, dated Mar. 20, 2000, 1 page.
International Search Report for PCT/US99/29044, dated May 11, 2000, 1 page.
International Written Opinion for PCT/US98/22527, mailed Dec. 27, 1999, 5 pages.
Japanese Interrogation and Re-Examination Report for Application No. 1999-502827, mailed Oct. 26, 2004, 7 pages.
Japanese Office Action for Application No. 1997-527811, mailed Oct. 10, 2000, 6 pages.
Japanese Office Action for Application No. 1998-505335, mailed Mar. 5, 2002, 7 pages.
Japanese Office Action for Application No. 1998-531244, mailed Jan. 6, 2004, 4 pages.
Japanese Office Action for Application No. 1998-531244, mailed Sep. 10, 2002, 5 pages.
Japanese Office Action for Application No. 1998-536740, mailed Feb. 24, 2004, 5 pages.
Japanese Office Action for Application No. 1998-536740, mailed Sep. 3, 2002, 14 pages.
Japanese Office Action for Application No. 1999-500765, mailed Feb. 10, 2004, 6 pages.
Japanese Office Action for Application No. 1999-500765, mailed Sep. 3, 2002, 11 pages.
Japanese Office Action for Application No. 1999-502827, mailed Dec. 3, 2002, 4 pages.
Japanese Office Action for Application No. 1999-502827, mailed May 28, 2002, 3 pages.
Japanese Office Action for Application No. 1999-502827, mailed Nov. 1, 2005, 8 pages.
Japanese Office action for Application No. 2000-220082, mailed on Apr. 1, 2003, 3 pages.
Japanese Office Action for Application No. 2000-511299, mailed Feb. 3, 2004, 4 pages.
Japanese Office Action for Application No. 2000-511299, mailed May 16, 2006, 7 pages.
Japanese Office Action for Application No. 2000-512333, mailed Sep. 3, 2002, 6 pages.
Japanese Office Action for Application No. 2000-512334, mailed Sep. 10, 2002, 9 pages.
Japanese Office Action for Application No. 2000-512336, mailed Jul. 23, 2002, 8 pages.
Japanese Office Action for Application No. 2000-512336, mailed Jun. 24, 2003, 4 pages.
Japanese Office Action for Application No. 2000-514448, mailed Sep. 3, 2002, 10 pages.
Japanese Office Action for Application No. 2000-519541, dated May 16, 2005, 4 pages.
Japanese Office Action for Application No. 2000-519541, mailed Aug. 20, 2002, 10 pages.
Japanese Office Action for Application No. 2000-519541, mailed Dec. 2, 2003, 7 pages.
Japanese Office Action for Application No. 2000-519541, mailed Mar. 14, 2006, 6 pages.
Japanese Office Action for Application No. 2000-522718, mailed Sep. 10, 2002, 9 pages.
Japanese Office Action for Application No. 2000-531822, mailed Sep. 24, 2002, 6 pages.
Japanese Office Action for Application No. 2000-531940, mailed Dec. 3, 2002, 4 pages.
Japanese Office Action for Application No. 2000-532958, mailed Aug. 20, 2002, 7 pages.
Japanese Office Action for Application No. 2000-554115, dated Apr. 27, 2005, 5 pages.
Japanese Office Action for Application No. 2000-554115, mailed Jan. 6, 2004, 4 pages.
Japanese Office Action for Application No. 2000-554115, mailed Oct. 1, 2002, 5 pages.
Japanese Office Action for Application No. 2000-556311, mailed Oct. 21, 2003, 6 pages.
Japanese Office Action for Application No. 2000-570673, dated Oct. 4, 2005, 4 pages.
Japanese Office Action for Application No. 2000-570673, mailed Mar. 8, 2005, 6 pages.
Japanese Office Action for Application No. 2000-570673, mailed Oct. 14, 2003, 6 pages.
Japanese Office Action for Application No. 2000-570677, mailed May 11, 2004, 8 pages.
Japanese Office Action for Application No. 2000-570677, mailed Nov. 30, 2004, 10 pages.
Japanese Office Action for Application No. 2000-570941, mailed Oct. 7, 2003, 6 pages.
Japanese Office Action for Application No. 2000-578753, mailed May 11, 2004, 11 pages.
Japanese Office Action for Application No. 2000-580124, mailed Apr. 12, 2005, 6 pages.
Japanese Office Action for Application No. 2000-580124, mailed Oct. 7, 2003, 5 pages.
Japanese Office Action for Application No. 2000-580329, mailed Feb. 15, 2005, 8 pages.
Japanese Office Action for Application No. 2000-580329, mailed May 13, 2008, 8 pages.
Japanese Office Action for Application No. 2000-580329, mailed Oct. 4, 2005, 5 pages.
Japanese Office Action for Application No. 2000-581781, mailed Feb. 3, 2004, 4 pages.
Japanese Office Action for Application No. 2000-581781, mailed Oct. 8, 2002, 4 pages.
Japanese Office Action for Application No. 2000-590363, mailed Apr. 1, 2003, 6 pages.
Japanese Office Action for Application No. 2001-526724, mailed Aug. 1, 2006, 5 pages.
Japanese Office Action for Application No. 2001-526724, mailed Dec. 13, 2005, 5 pages.
Japanese Office Action for Application No. 2001-526724, mailed May 17, 2005, 4 pages.

(56) References Cited

OTHER PUBLICATIONS

Japanese Office Action for Application No. 2006-127262, mailed Jun. 1, 2010 (5 pages).
Japanese Office Action for Application No. 2006-127262, mailed Nov. 18, 2008 (7 pages).
Japanese Office Action for Application No. 2011-543586, mailed Jan. 24, 2013, 5 pages.
Japanese Office Action for Application No. 532950, dated Dec. 17, 2002, 6 pages.
Katz, Michael, "When CTI Meets the Internet," Telecommunications, vol. 31, No. 7, Jul. 1997, 6 pages.
Kaufman, Harvey, "Call Centers in Cyberspace," Communications News, vol. 34, Issue 7, Jul. 1997, 4 pages.
Kaukonen, S., et al., "Agent-Based Conferencing Using Mobile IP-Telephony," Proceedings of Multimedia Signal Processing, 1999, 6 pages.
Korean Office Action for Application No. 10-2011-7016735, dated Jun. 13, 2013, 3 pages.
Korean Office Action for Application No. 10-2011-7017067, dated Aug. 21, 2012, 9 pages.
Kramer, Brian, "How to Send a File to the Sender of a Message?," Google Discussion Group, May 27, 1994, 5 pages.
Lee, Chien-I, et al., "A New Storage and Retrieval Method to Support Editing Operations in a Multi-Disk-based Video Server," Fourth International Conference on Parallel and Distributed Information Systems, IEEE, Miami Beach, FL, Dec. 1996, 10 pages.
Lin, Yi-Bing et al., "A Flexible Graphical User Interface for Performance Modeling," Software—Practice and Experience, vol. 25(2), Feb. 1995, 24 pages.
Low, Colin, "The Internet Telephony Red Herring," Global Telecommunications Conference, Nov. 1996, 15 pages.
Mackay, Wendy E., et al., "Virtual Video Editing in Interactive Multimedia Applications," Communications of the ACM, vol. 32, No. 7, Jul. 1989, 9 pages.
Malabocchia, Fabio, et al., "Mining Telecommunications Data Bases: An Approach to Support the Business Management," Network Operations and Management Symposium, IEEE, vol. 1, Feb. 1998, 9 pages.
Masashi, Tsuboi et al., "Computer Telephony Integration System," CTSTAGE, Oki Electric Research and Development, 174, vol. 64, No. 2, Apr. 1, 1997, 10 pages.
Matsumoto, Akihiko, "Bank CTI/Call Center Using Up Customer Information, Analysis of Six Major Manufacturers' Solutions," Network Computing, Ric Telecom Corporation, Japan, vol. 10, No. 10, Oct. 1, 1998, 13 pages.
Matsuo, Yasunori, "Microsoft Project for Windows 95," Nikkei Personal Computing, Nikkei Business Publications, Inc., No. 255, Dec. 18, 1995, 2 pages.
Beck, C. et al., Interactive process of operating system for multimedia communication center, Genesys Telecom Lab, Inc. 2014, 3 pages.
Chinese Office action with English Translation for Application No. 200980151937.6 dated May 23, 2014, 7 pages.
U.S. Appl. No. 10/234,691, Neyman et al.
U.S. Appl. No. 08/928,861, Neyman et al.

* cited by examiner

Sample User Interface Screen

CALL AND DATA CORRESPONDENCE IN A CALL-IN CENTER EMPLOYING VIRTUAL RESTRUCTURING FOR COMPUTER TELEPHONY INTEGRATED FUNCTIONALITY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED DOCUMENTS

The present application is *a reissue patent application of U.S. Pat. No. 7,903,807 filed on May 11, 2004 as patent application Ser. No. 10/843,802, which is* a continuation application of patent application Ser. No. 10/234,691, filed Sep. 3, 2002, now U.S. Pat. No. 6,735,298, which is a continuation application of patent application Ser. No. 08/949,566, filed Oct. 14, 1997, now U.S. Pat. No. 6,480,600, which is a divisional application of patent application Ser. No. 08/928,861, filed Sep. 12, 1997, now U.S. Pat. No. 7,031,442. *U.S. Pat. No. 7,903,807 filed on May 11, 2004 as patent application Ser. No. 10/843,802 is also a continuation application of patent application Ser. No. 08/928,861, filed Sep. 12, 1997, now U.S. Pat. No. 7,031,442*, which is a Continuation-In-Part (CIP) of prior patent application Ser. No. 08/869,815, filed Jun. 4, 1997, now U.S. Pat. No. 6,148,074, which is a CIP of patent application Ser. No. 08/802,667, filed Feb. 19, 1997, now U.S. Pat. No. 6,201,863, which is a CIP of patent application Ser. No. 08/797,420, filed Feb. 10, 1997, now U.S. Pat. No. 6,185,291. [The present application] *Application Ser. No. 08/928,861, filed Sep. 12, 1997, now U.S. Pat. No. 7,031,442,* is also a CIP of application Ser. No. 08/833,340, filed Apr. 3, 1997, now U.S. Pat. No. 6,560,328 and *a CIP of* application Ser. No. 08/891,675, filed Jul. 9, 1997, now U.S. Pat. No. 6,205,412.

FIELD OF THE INVENTION

The present invention is in the area of telephone call processing and switching, and pertains more particularly to intelligent call-routing systems, and equipment and methods for customizing and personalizing Routing Rules and Protocol.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994. This document is incorporated herein by reference.

At the time of filing the present patent application there continues to be remarkable growth in telephone routing systems, with routing done both at or near point-of origin of incoming calls, and at call destinations. For example, systems are known to the present inventor that perform initial call processing before routing an incoming call to a destination switch, and further routing is done at the call destination in computerized telephony equipment, often termed customer premises equipment (CPE). The present invention pertains most particularly to routing at customer premises.

There are, at the time of the present patent application a considerable range of CPE systems available for use from various manufacturers, and, as state-of-the-art routing systems are typically computerized, there is a broad variety of software available for such systems as well. It is the software in general wherein routing rules are set, and the routing rules determine the decision-making paths a system follows in routing calls.

In current art, although there are widely varying systems in the art relative to routing rules, all such systems exhibit a common drawback. Typically such systems, once set up (programmed) to follow certain routing rules and practices, cannot easily vary, and individual users or groups of users, cannot change the rules arbitrarily. To tinker with the routing rules in CPE typically requires a highly-trained maintenance technician (system administrator).

What is clearly needed is method and apparatus which allows an individual user of a routing system, or a group of users, to alter and customize the routing rules of the system for particular purposes, which may change from time to time, depending on the users.

SUMMARY OF THE INVENTION

In a preferred embodiment of the present invention a telephony call-in center is provided, comprising a plurality of agent stations, individual ones of the agent stations having a telephone and a computer platform including a video display unit (VDU), the telephone and computer platform connected by a Telephone Application Programming Interface (TAPI)-compliant data link; a local area network (LAN) connecting at least some of the computer platforms at the agent stations; and a first computer processor connected on the LAN, having a wide area network connection (WAN) adapted to receive computer-simulated telephone calls, and having access to a database. The computer platform is adapted to retrieve origination data for incoming calls to the telephone, and to use the origination data to correlate the caller with further data retrieved from the database for display on the VDU. In some embodiments the the first computer processor is adapted to service calls from specific Service Control Points (SCPs) and to block display of data at agent station VDUs for any call not identified as originating at one of the specific SCPs.

In preferred embodiments the computer platforms are adapted to report the origination data to the first processor, and the first processor is adapted to correlate the caller with further data retrieved from the database for display on the VDU.

In an alternative embodiment a telephone call-routing system is provided, comprising a call-in center comprising a plurality of agent stations, individual ones of the agent stations having a telephone and a computer platform including a video display unit (VDU), the telephone and the computer platform connected by a Telephone Application Programming Interface (TAPI)-compliant bridge, with a plurality of the computer workstations connected to one another, to a first processor, and to a database on a local area network (LAN); and a call-routing center comprising a telephony switch adapted to switch telephone calls to the telephones at the call-in center and a processor adapted to route computer-simulated telephone calls to the computer platforms at the agent stations. In this embodiment the computer workstation is adapted to retrieve origination data for incoming calls, both conventional telephony and computer-simulated, and to report the origination data to the first processor, and wherein the first processor is adapted to use the origination data to correlate the caller with further data retrieved from the database for display on the VDU. IN some instances the first processor is adapted to service calls from specific Service Control Points (SCPs) and to block display of data at agent station VDUs for any call not identified as originating at one of the specific SCPs.

In yet another embodiment an agent station for a call-in center is provided, comprising a computer platform having a local area network (LAN) adapter, the computer platform adapted for receiving and processing computer-simulated telephone calls; a telephone having a telephone line port; and a Telephone Application Programming Interface (TAPI)-compliant bridge connecting the computer workstation and the telephone. The computer workstation is adapted to retrieve origination data for calls, both calls to the telephone and computer-simulated calls to the computer platform, and to report the origination data on a LAN via the LAN adapter to a processor connected to the LAN.

In still another embodiment a method for correlating displayed data with incoming conventional telephone and computer-simulated telephone calls at a call-in center is provided, comprising steps of (a) connecting individual telephones at the call-in center by a Telephone Application Programming Interace (TAPI)-compliant bridge to individual computer platforms; (b) connecting each telephone-connected computer workstation on a local area network (LAN) to a processor connected on the LAN, the processor having access to a database storing data to be displayed; (c) monitoring origination information of incoming calls by the computer workstations; (d) providing the origination information over the LAN to the LAN-connected processor; and (e) using the origination information via the processor to correlate data to be displayed with the incoming calls.

In the various embodiments of the invention described in enabling detail below, call centers without call-switching apparatus and capable of also processing computer-simulated calls are enabled, while also providing means of correlating stored data pertaining to callers with calls to agent stations, displaying the data on VDUs at the agent stations while calls are in progress.

BRIEF DESCRIPTION OF THE DRAWING FIGURES

DESCRIPTION OF THE PREFERRED EMBODIMENTS

Figure 1:
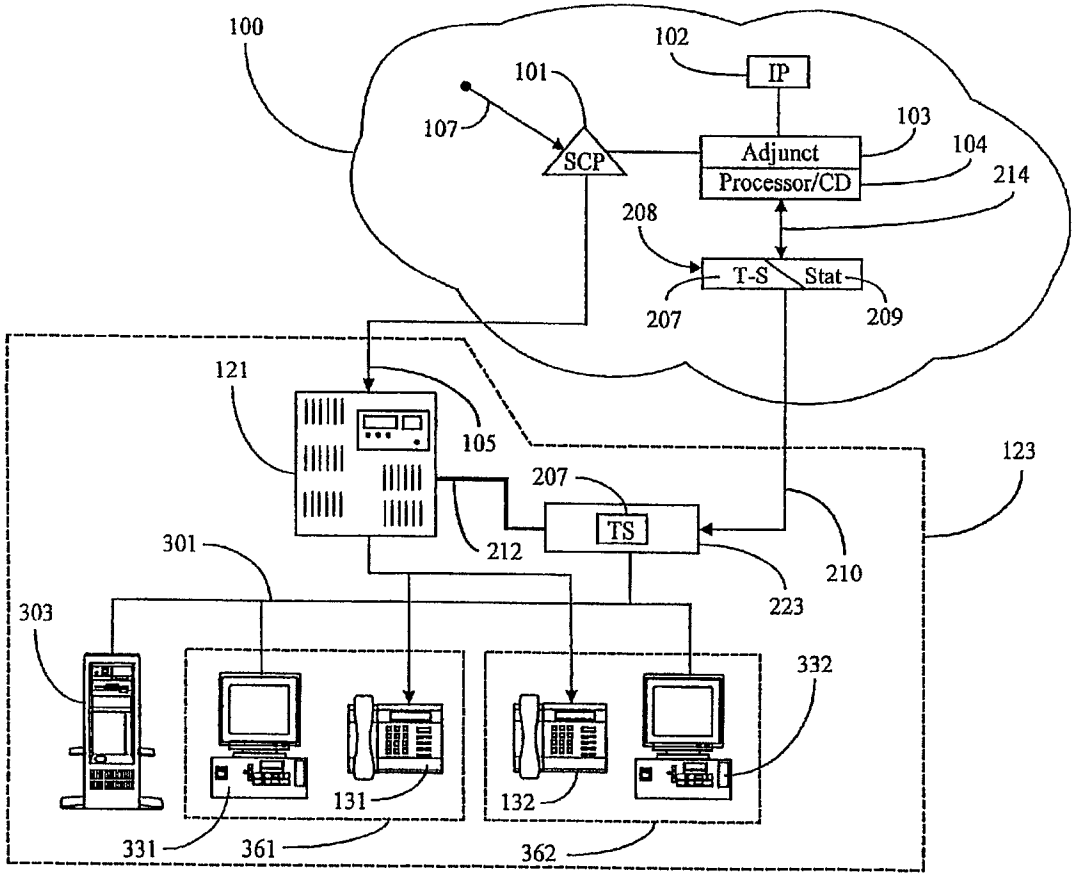
FIG. 1 is a system diagram of a call-routing system in an embodiment of the present invention.

FIG. 1 is a system diagram of a call-routing system according to a preferred embodiment of the present invention. Dotted lines 123 enclose elements of the system native to a customer's premises (CPE). This equipment in a preferred embodiment comprises a computerized telephony central switch 121 connected by a data link 212 to a processor 223 running an instance of a unique telephony server (T-Server) T-S 207. Switch 121 in conventional art distributes incoming calls (on line 105) to connected telephones, such as telephone 131 at a workstation 361 and telephone 132 at a second workstation 362. In various embodiments of the present invention T-Server 207 running on processor 223 exerts controlling influence on routing of incoming calls, as is described in further detail below.

In various embodiments of the present invention each workstation (361, 362) has a PC with a video display, such as PC/VDU 331 at workstation 361 and PC/VDU 332 at workstation 362. There will be in most architectures many more than the two telephone workstations shown, each with an associated PC, but two are considered adequate by the inventors to illustrate embodiments of the present invention.

PC/VDUs 331 and 332 in various embodiments are connected on a local area network (LAN) 301 which also connects to a data file server 303 and to processor 223 running an instance of T-Server 207. The arrangement of PC/VDU plus telephone at each workstation is a common arrangement for many company facilities, and has become more common as more and more people become computer literate. Moreover, many companies are actively training employees in use of computers, and providing PC-type computer equipment, usually interconnected by company LAN, for employees to use.

In the exemplary system shown, calls may originate at any remote call-in point, which is represented in FIG. 1 by region 100, referred to herein as the network cloud. Network cloud 100 may be a small regional portion of the world-wide network of connected telephony equipment, or may represent the entire world-wide network. An incoming call at any point in network cloud 100 is represented by vector 107 to service control point (SCP) 101 (typically a telephony central switch), which in this example is connected to an adjunct processor 103 and coupled thereby to an intelligent peripheral (I-P) 102, a distribution processor 104 and a processor 208 running a second instance of unique T-Server 207 as well as a statistical server (stat-server) 209. In this system calls are forwarded to switch 121 at the customer premises equipment over telephone line 105, and associated data is forwarded in parallel to processor 223 over a digital network link 210. Such systems, wherein data associated with a call is forwarded on a separate link from the call itself, are, to the inventor's knowledge at the time of the present patent application, not known in the art, but are known to the inventor. This feature, however, is not required in practice of the present invention, but preferred in some embodiments.

In embodiments of the present invention a call originating in the network cloud and routed to switch 121, destined for one of telephones 131 or 132 or to another destination at the customer's premises, typically carries a destination number, which may include a direct inward dialing (DID) feature, whereby a limited number of lines may be used to carry calls to a larger number of final destinations, accomplished principally by software techniques. Destination may also be to a virtual number, of which many may be programmed, and T-Server 207 may be adapted to further route calls forwarded to such virtual numbers. The phone call may also have caller ID attached (originating caller's phone number), and in those cases wherein a separate network digital data link is accomplished between processors at the origination end (208) and the customer's premises (223) cases a data packet associated with the call may be forwarded over link 210. Also, T-S 207, which interacts continuously with switch 121 in this embodiment, is capable of transacting with data file server 303, given caller ID and/or other data associated with a call, to retrieve further information about the caller from data file server 303.

It will be apparent to those with skill in the art that incoming calls are not limited to two telephones as shown in FIG. 1. There may be many more than two telephones connected to switch 121, other telephony equipment, such as facsimile equipment and data lines may also be connected and involved in routing decisions and transactions according to embodiments of the present invention. Moreover, existing techniques, such as virtual expansion for routing calls with a certain number to multiple destinations on some pre-programmed protocol may also be involved. The simple diagram of a switch with two telephones connected is meant to be illustrative for description of embodiments of the present invention.

It will be apparent to those with skill in the art as well, that a separate processor shown as processor 223 in FIG. 1, is not strictly required in embodiments of the invention, depending on the level of machine intelligence and sophistication of switch 121. Switches for customer premises continue to be developed with new levels of intelligent capability, and some may be capable of interacting with other elements of the present invention without a separate processor between the switch and a LAN such as LAN 301. Processor 223 will be required to practice various embodiments of the invention with many existing telephony switches which may be used as element 121. In virtually all cases in practicing the present invention, an instance of unique T-Server 207 executing on a computerized platform will be required.

In a preferred embodiment of the present invention routing intelligence is no longer confined to a central location such as telephony switch 121 or T-Server 207 running on a connected processor, but distributed in a manner that individual users of the system may customize routing at their own workstations, using individual PCs. This is accomplished in large part by control code executable at a user's computer workstation. It is not required that the actual code be always at the user's workstation, as it may be shared code resident at, for example a file server on LAN 301, such as file server 303. The unique code may be accessed from such a server and executed at any one of several workstations such as workstations 361 and 362 by PC/VDU 331 and PC/VDU 332 respectively. The location of stored code, and access to such code is not, however germane to the invention. In embodiments of the invention, an individual PC executes unique code to provide call-routing control for an individual.

In embodiments of the present invention, T-Server 207 is adapted to cooperate with code executed at individual PCs to route incoming calls. In this unique routing process there are at least two different mechanisms that may be used. In one mechanism, all calls are routed to a single routing point, and each individual routing application registers with that routing point. In this case a record of each call is broadcast on LAN 301, as will be described more fully below, and filtering occurs at each PC router. In a second mechanism there may be a virtual routing point for each PC using a personal router on the LAN. In this second case there is no need to broadcast call particulars on the LAN. This second alternative is typically more expensive than the first, and there are currently rather severe limitations on how many automatic call distribution (ACD) queues or routing points may be allocated on a typical central switch.

Figure 2:
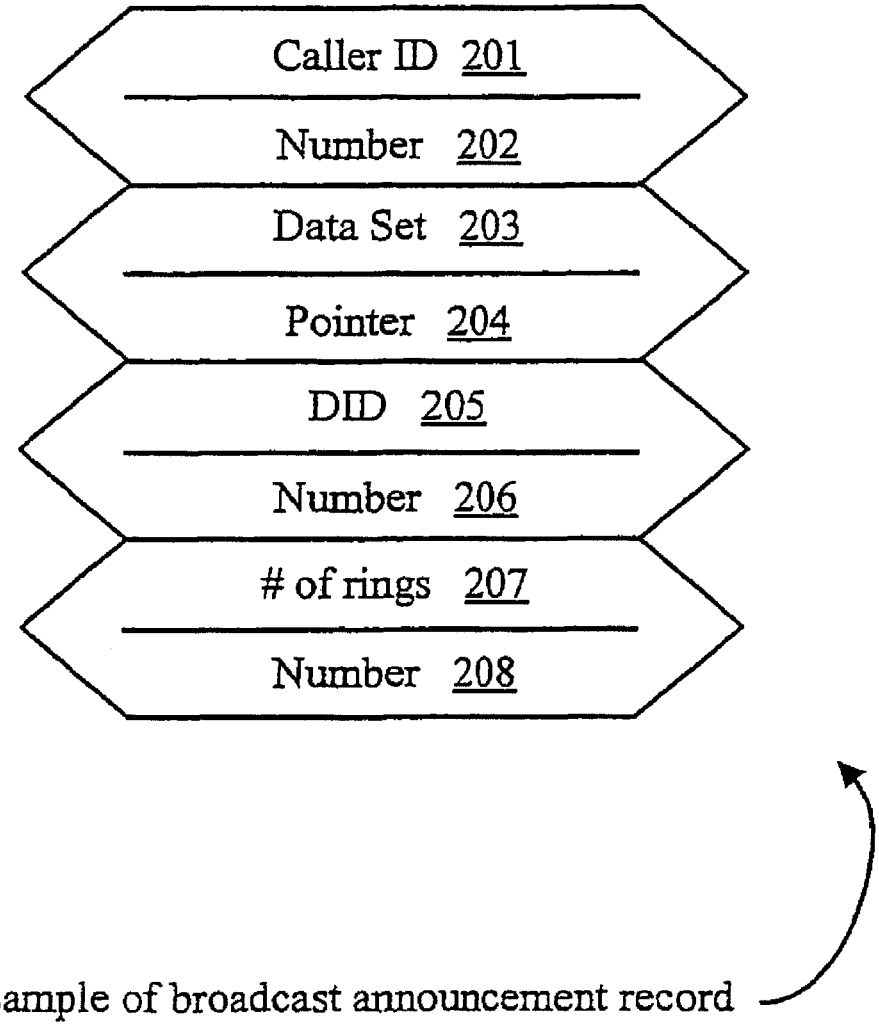
FIG. 2 is a sample of a broadcast announcement record in an embodiment of the present invention.

Referring now to FIG. 2, and presuming the first of the two mechanisms described immediately above, with each incoming call, an overall record of the call, prior to routing, is broadcast on LAN 301. This overall record can take a number of different forms, of which the example in FIG. 2 is just one exemplary form. In this example the overall record consists of four data portions. One data portion consists of elements 201 and 202. Data element 201 identifies this portion as the caller ID associated with the incoming call, and element 202 is the caller ID number. A second data portion consists of data elements 203 and 204. This portion is a data set which may be transmitted via link 210 to processor 223 in parallel with the incoming call, or may be composed partly of data retrieved from server 303, using other call data as a pointer. Element 203 identifies the data as a data set, and element 204 is the pointer. Similarly elements 205 and 206 constitute a direct inward dialing (DID) number, and elements 207 and 208 fix number of rings.

A central element in the present invention is that a user at an individual PC rims an instance of a personal router application, providing that user with instant and complete control over routing of calls meant for that user (or, in some cases, associated users). The user's PC, such as PC/VDU 331 is connected typically by LAN to a processor such as processor 223, in turn connected to the central switch, such as switch 121.

At the computer portion of an individual workstation, such as PC/VDU 331 at workstation 361, the user has access to the local application which is interactive with code executed at T-Server 207 at processor 223, to control and customize routing for incoming calls, depending on certain data elements in the broadcast announcement record (FIG. 2). As a part of this unique capability to program routing responses, the individual user may in some embodiments load to his/her VDU a unique user interface, an example of which is shown in FIG. 3.

Figure 3:
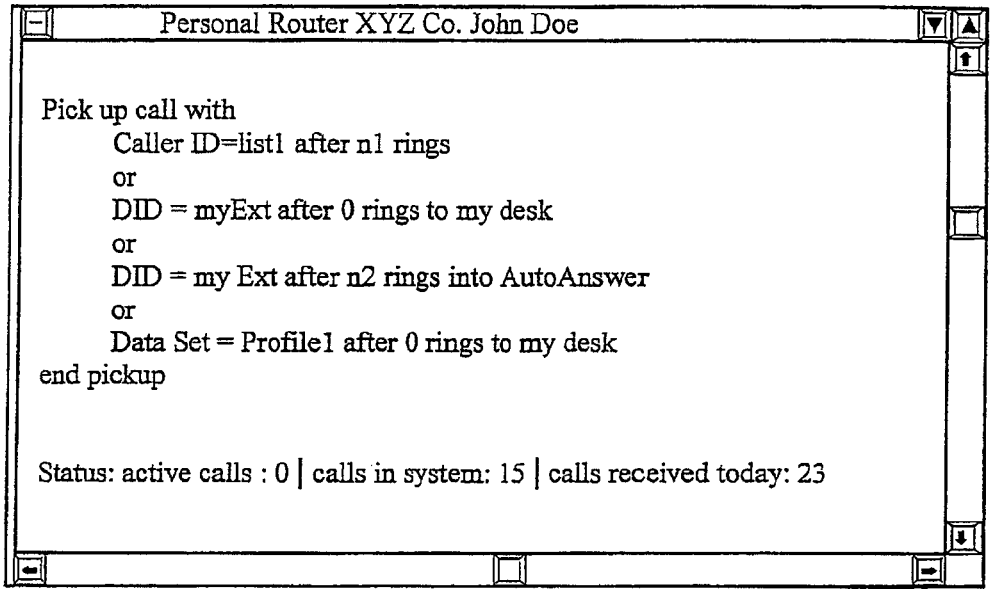
FIG. 3 is a sample user interface screen in an embodiment of the present invention.

FIG. 3 illustrates a window presentable to a user at an individual workstation, compatible, for example, with Windows operating systems. This is an input and display interface for a personal router, a variation of which may be assigned to each of selected employees to provide these individuals with an ability in conjunction with the premises telephone equipment to customize and periodically adjust the routing of certain incoming calls. In this example, the interface is for company XYZ and limited to employee John Doe.

Through the individual interface, John Doe in this instance, may program in a relatively high-level language, routing preferences for certain incoming calls, according to data broadcast for such calls on LAN 301. In the case where each user has a dedicated routing point, an incoming call is directed to the individual's computer, and the broadcast is not necessary.

In this example John Doe has programmed his interface to pick up all calls having Caller ID matched with a list "list1" after n1 rings. List1 is resident in John Doe's database associated with his own Personal Router, and John Doe may call up this list and amend, delete, and expand it as he wishes. The number of rings n1 may be any convenient number to accomplish John's purpose.

John Doe may program negative lists as well. Although not specifically recommended, a negative list could be used to hang up on all calls that have an ID associated with a company or individual that has been making harassing calls to an employee, or to shunt such calls to a special tracking program or the like.

John Doe in this instance has also programmed his personal router to send all calls bearing his assigned DID number to the telephone at his desk after 0 rings, and to an answering machine after n2 rings. Associations with data sets may also be made, comparing such data sets to stored profiles and the like. At the bottom of the display in this example a status summary of calls may be provided. A user may choose to have this window resident on his computer screen as a pix-on-pix, or to hide it and call it as needed. Also, it will be apparent to those with skill in the art that it is not strictly required that each selected person having an associated routing interface assigned have a computer at his/her elbow. For those persons not, for one reason or another, inclined to program their own routing, the interface may be called up and done by another, with appropriate access security applied. A secretary or system administrator may perform such functions, using any workstation connected to company LAN 301.

The user interface at the user's workstation can take any of a variety of forms, and have a variety of functionality. Typically, when the user logs on, his system will be configured to execute the unique application to run in the background, and to monitor for incoming calls at all times the user is present and active. It will be apparent to those with skill in the art that this can be done in a variety of ways. The interface, for example, may be a Graphic User Interface (GUI) wherein icons may be used to represent calls, callers, and other users, and the individual user at one workstation may select to display icons as desired. In this alternative embodiment an incoming call may appear on a user's PC VDU as a small telephone in an announcement bar. Such announcement bars are familiar to those with skill in the art, such as seen on Operating System Desktops, where an e-mail arrival may be indicated by a letter icon and a sound.

In such an embodiment, by moving the screen cursor to the telephone icon, which may be programmed to "ring" or to vibrate as though it is ringing, the user may activate a text balloon announcing the caller ID or other call data, or such data may be displayed directly in the icon. The system can be configured in such an embodiment to allow the user to route the call to his own phone with a click, to hang up with a double click, to drag the call to a holding queue (represented by a basket, for example,) to send the call to an answering machine, which may be done by dragging and dropping the telephone icon to an answering machine icon, to transfer the call to another person by dragging and dropping the telephone icon to an icon representing another user (such as the instant user's secretary or supervisor for example). Those with skill in the art will recognize that the functionality through the use of click and drag-and-drop procedures is very broad indeed.

Actions taken at the personal router interface at an individual PC on LAN 301 in embodiments of the present invention are codified as instructions on the LAN to T-Server 207 (in most cases) running on a processor such as processor 223, connected to central switch 121. If an individual user at a workstation, for example, has received an indicator of a waiting call, and has dragged the ringing telephone to his secretary's desk icon in his interface, his personal router interacts with T-Server 207 to instruct switch 121 to reroute the call to the secretary's telephone. In a similar manner, most actions at a personal router become instructions to switch 121, and in general each user having access to such a personal router can program responses to calls and respond to incoming calls in real time with a broad set of available responses.

In embodiments of the invention, not necessarily all calls are routed by personal routers executed on PCs on LAN 301. There may also be over-riding routing rules programmed into switch 121, such that certain calls or types of calls are always handled in a certain way. Rules in switch 121 may also determine the fate of calls that are not eventually routed by personal routers. For example, all calls alive after seven rings may be switched to a recorded announcement, and the like. In this manner a very broad freedom of routing may be accomplished, with security and flexibility to adapt for changes in the organization.

It will be apparent to those with skill in the art that the division of code and functionality between server 303, T-Server 207 running on processor 223, and individual workstations on the LAN is somewhat arbitrary, with the requirement that individuals at the workstations have interface access to customize and update personal routing rules.

In another aspect of the present invention a Personal Desktop Router is implemented in a Client-Server architecture. This embodiment is illustrated with the aid of FIG. 4. In this embodiment a router 401 is provided and executes on processor 223 which also executes an instance of T-Server 207. Router 401 in this instance is a central router having routing rules divided in sections dedicated to each assigned user or DN on LAN 301. Unique Client Interface Packages represented by elements 401a and 401b are provided at individual workstations such as workstation 361 and workstation 362 connected to LAN 301. Client Interface Packages 401a and 401b are for the purpose of allowing users at the workstations to edit their own personal routing rules, much as has been described above for personal routers according to embodiments of the present invention, wherein the routers execute at the workstations.

In this Client-Server embodiment of the present invention, the actual router software exists and executes as one router 401. Client Packages 410a and 410b may be implemented as a Graphical User Interface (GUI) with iconic drag and drop features as described above with reference to FIG. 1, or may be of another suitable type designed to allow interaction with router 401.

It will be apparent to one with skill in the art that router 401, in this embodiment, is not required to reside in processor 223, but may reside in any other machine capable of executing the router and connected or coupled to LAN 301, such as switch 121. The router could be executed, for example, on a server on the Internet, and accessed by a WEB browser by a client connected to LAN 301. It will also be apparent to one with skill in the art that while router function does not occur at individual workstations 361 and 362 in this particular embodiment, editing capabilities provided to the user via client packages 401a and 401b can remain essentially the same as described in previous embodiments taught herein.

In typical embodiments, router 401 is configured to allow a group manager or system agent to perform higher level configurations to routing rules, such as type of calls available, call parameters, user function or location changes, etc., while individual users may, through their interfaces, configure routing rules for their own calls, within the boundaries set by the supervisor.

It will be apparent to one with skill in the art that any configurational division of editing capabilities may be employed with reference to routing rules as they may exist in any given application without departing from the spirit and scope of the present invention. A server-based router such as router 401 in this embodiment, wherein a unique client package is provided for editing purposes at a user's workstation, such as workstation 361, is heretofore unknown to the inventor.

Figure 4:
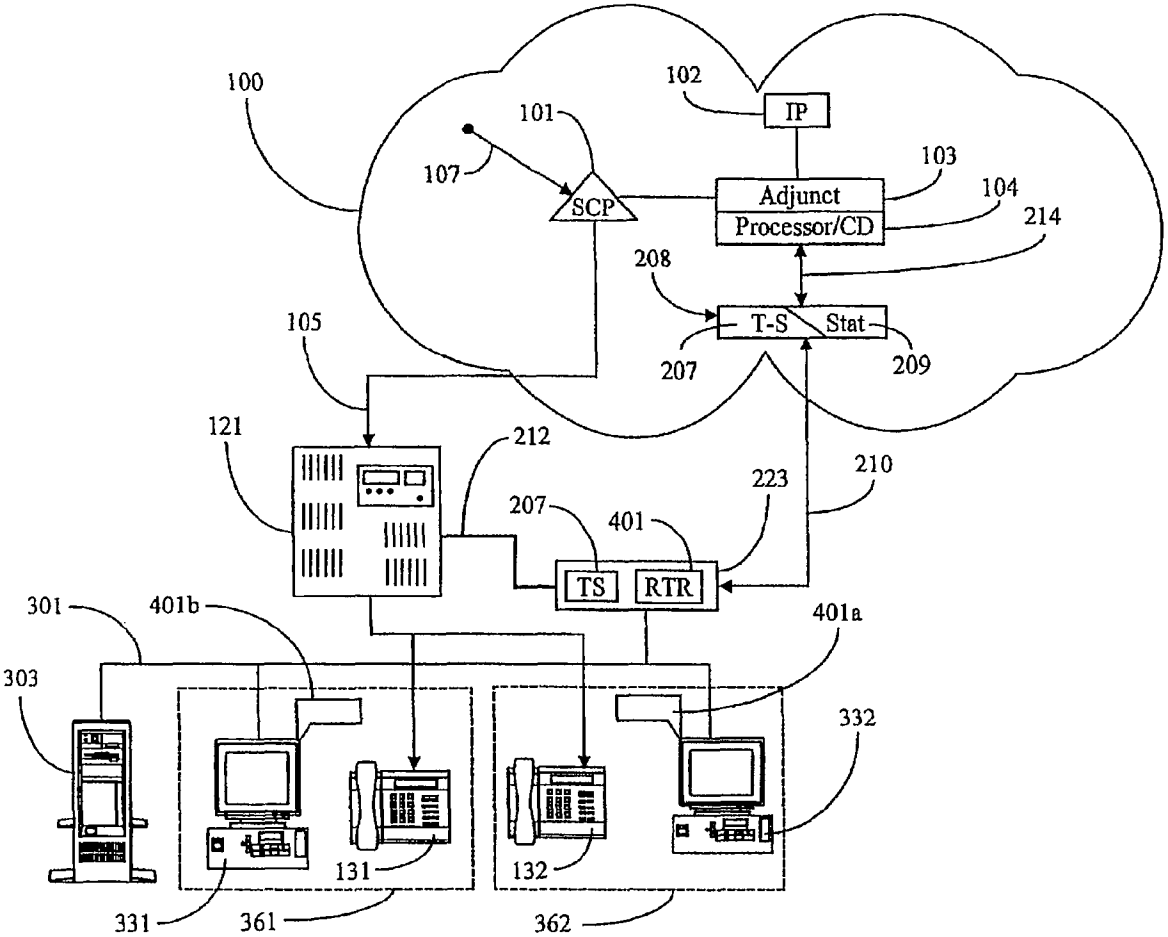
FIG. 4 is a system diagram of a call-routing system implemented in client-server mode in an embodiment of the present invention.

In the embodiment illustrated by FIG. 4 communication over analog lines 105 and data link 210, and other functions of the system, is essentially the same in method as is illustrated in FIG. 1 and described above with reference to FIG. 1. Also, network cloud 100 and the components therein are essentially the same as in the embodiment in FIG. 1. For this reason much detail as to the dynamics of and paths of communication in an embodiment of the present invention with respect to FIG. 4 are not repeated here.

Virtualized Computer-Telephony Integrated Link (3211-3213)

Figure 5:
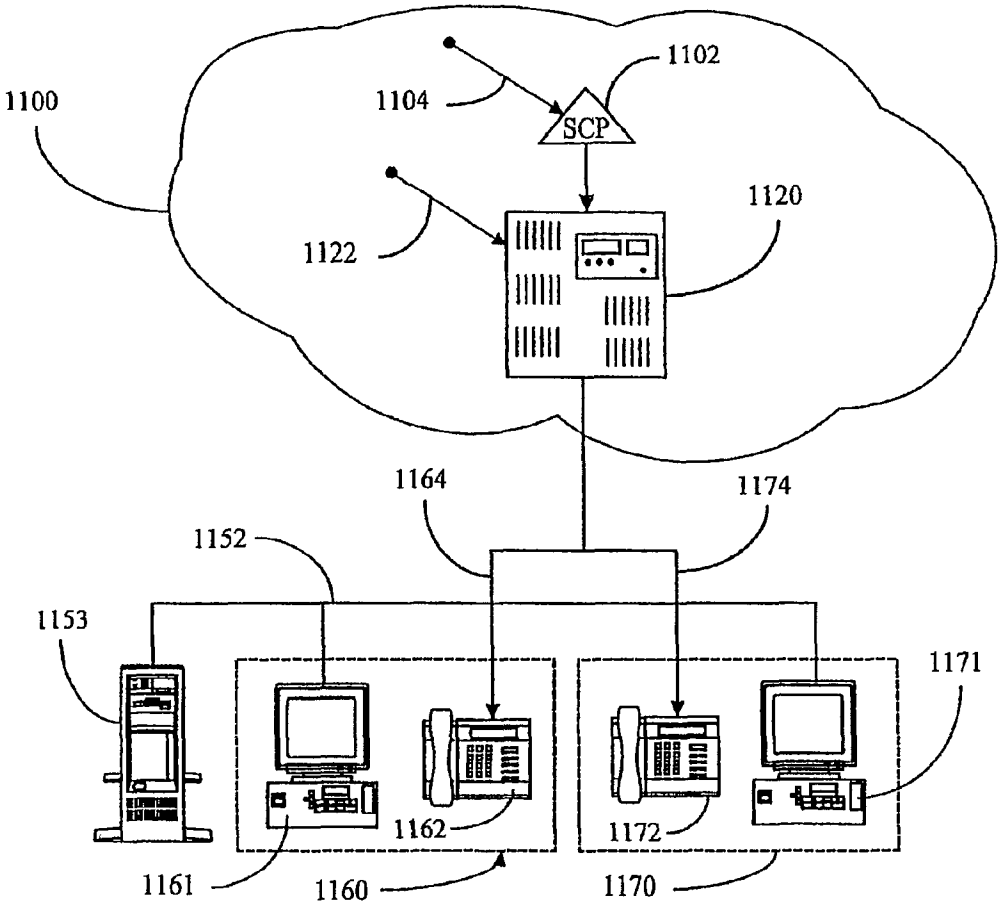
Fig. 5 ( Prior Art )
FIG. 5 is a block diagram of a call-routing system in the prior art.

To help create a context for a detailed description of preferred embodiments of the present invention which follow, attention is first directed to FIG. 5, which is a block diagram of a call-routing system in the prior art. In the system of FIG. 5 a call-in center 1150 is illustrated having two telephones 1162 and 1172. As was described above in the background section, the present invention is particularly adaptable to such call-in centers wherein a telephony switch is not a part of the equipment at the call-in center, thus no telephony switch is shown in FIG. 5 at call-in center 1150.

It will be apparent to those with skill in the art that there may be just one phone in call-in center, or there may be several more than the two shown. Two telephones is an arbitrary choice for purposes of illustration and description.

It is common and desirable at call-in centers for agents who man the phones to have at hand a personal computer (PC) or a data terminal of some description including a video display and processor. Access to such a computerized system allows the agent to recall and display data pertaining to a caller, and also other information of use in dealing with and helping caller, such as technical information about products and product use. Although several types of such data terminals are known, PCs are assumed here for purposes of description and illustration. A PC 1161 with a display is shown at hand for an agent using telephone 1162 and a PC 1171 is shown proximate telephone 1172 for use by an agent at telephone 1172.

In a very simple system there may be just one telephone and one PC proximate the telephone, therefore just a single equipped agent constituting the call-in center. In the system of FIG. 5 having two telephones, there are also two PCs. Each PC and associated telephone is considered here to constitute an agent station. Agent station 1160 comprises telephone 1162 and PC 1161, and agent-station 1170 comprises telephone 1172 and PC 1171.

In systems of the sort depicted by FIG. 5, having two or more agent stations, it is desirable that the PCs be connected in a Local Area Network (LAN), and this connectivity is shown in FIG. 5 with PCs 1161 and 1171 connected on a LAN 1152 wherein a data file server 1153 is also connected. Data file server 1153 in this system is the repository of customer data and the like accessible to agents manning the phones. Though not shown in FIG. 5 it will be apparent to those with skill in the art that there may be other servers on the LAN or elsewhere in the network as known in the art.

Telephone calls in the system of FIG. 5 are provided to telephone 1162 on line 1164 and to telephone 1172 on line 1174 from essentially anywhere represented by network cloud 1100. Cloud 1100 could represent a relatively small local calling area, a regional area, a single phone company or even the phone system of the entire planet. Calls are forwarded by telephony switches represented by telephony switch 1120.

Calls 1104 intended specifically for call-in center 1150 typically are received at Service Control Points (SCP) represented by SCP 1102, which are organized typically with one or more 800 numbers or the like. Calls received and processed at SCP 1102 are forwarded to switch 1120 which routes the calls to whatever area code and number is assigned to telephones 1162 and 1172. Other calls 1122 may also come into telephony switch 1120 and be routed to call-in center 1150. As is known in the art, SCP 1102 is also a telephony switch.

Also as is known in the art, there may be equipment associated with SCP 1102 to provided some additional functionality, such as an adjunct processor and an intelligent peripheral. For simplicity's sake these are not shown in FIG. 5, but FIG. 5 may be considered as typical of many prior art systems. In the rather simple system of the prior art represented by FIG. 5 some data (such as caller ID for example, and Dialed Number Information Service {DNIS}), may be associated with calls forwarded to call-in center 1150. Such data to be useful in the system of FIG. 5 must be received by specialized equipment, such as familiar caller-ID boxes or telephone sets adapted to use the information being sold to people for home and business use.

Figure 6:
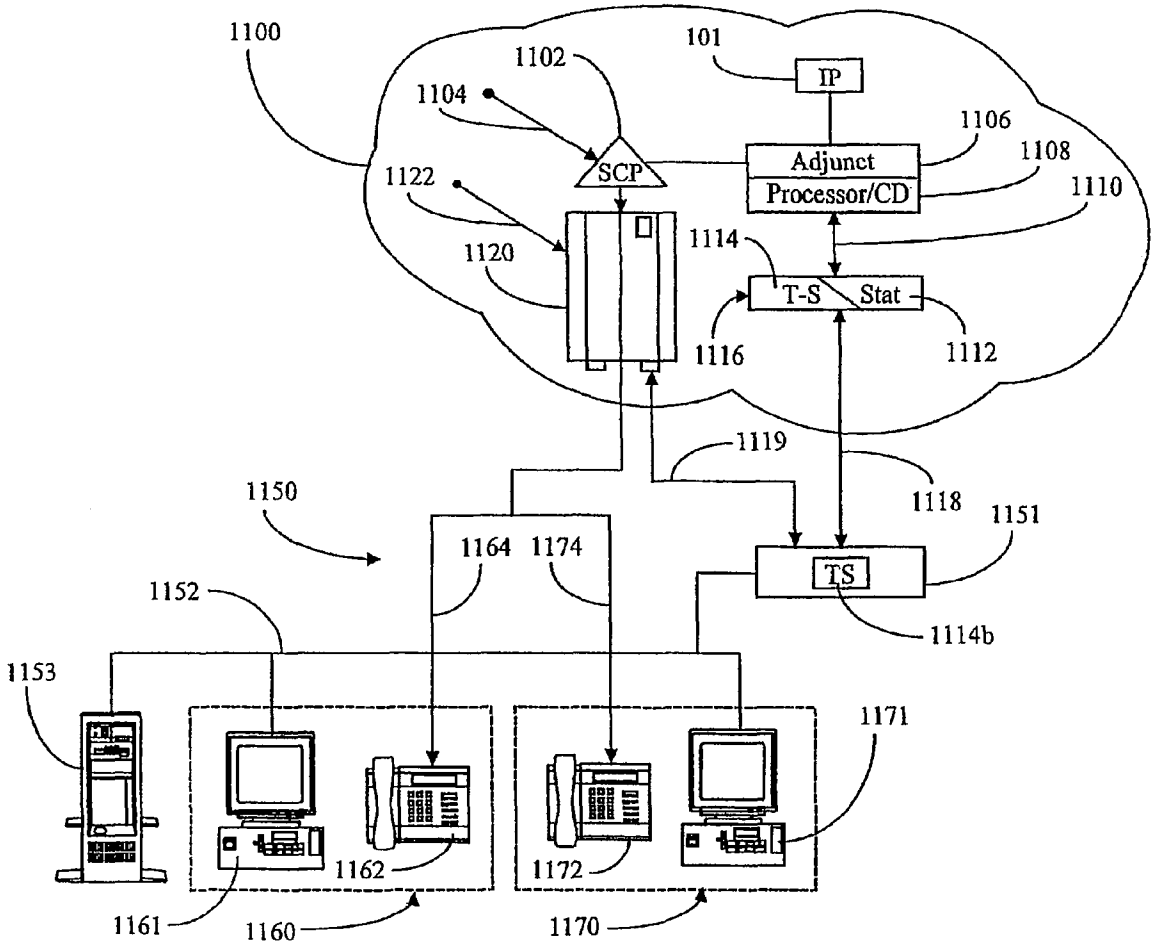
FIG. 6 is a block diagram of a call-routing and call-in system according to embodiments of inventions known to the present inventors.

Attention is now directed to FIG. 6, wherein a call-in system known to the present inventors is illustrated. In this system SCP 1102 receiving calls 1104 intended for call-in center 1150 has a connection to an adjunct processor 1106 in communication with both an intelligent peripheral 1101 and a call-distribution processor 1108. There is further a processor 1116 connected by a two-way communication link to call-distribution processor 1110. Processor 1116 comprises an instance of a unique application termed by the inventors a Telephony Server 1114, or T-Server, and a Statistical Server (Stat-Server) 1112. T-Server 1114 and functions provided by the T-Server are described in detail in the related patent applications listed above and incorporated herein by reference.

In the system of FIG. 6 a processor 1151 is provided at call-in center 1150, running a second instance of T-Server application 1114. Processor 1151 is coupled to processor 1116 in network cloud 1100 by a network link 1118, and to LAN 1152 by a network adapter. There is in addition a CTI connection 1119 between telephony switch 1120 in network cloud 1100 and processor 1151 at call-in center 1150. CTI connection 1119 may be an ISDN link or other data-type connection allowing transfer of CTI data and commands.

In the system of FIG. 6 information garnered in initial processing with use of IP 1101 may be provided by T-Server 1114 at processor 1116 to T-Server 1114 running on processor 1151 at the call-in center. This data can be used, then, ahead of a routed call, to, for example, to extract further data regarding a caller from a customer data base in file server 1153, and to provide the transferred and retrieved data at the PC display, such as PC 1161, proximate the telephone to which a call has been routed, for use by the agent manning that telephone.

Further, CTI transactional data retrieved from switch 1120 (line busy, line available, and the like), may be provided to T-Server 1114 at processor 1116, and in some cases in raw or processed form to Stat-Server 1112 to be used in routing by CD processor 1108. Many other functions described in the related applications listed above may now also be accomplished. Still further, Stat-Server 1114 running on processor 1151 can issue CTI commands to switch 1120 in the network cloud via CTI link 1119.

Although the system of FIG. 6 may be used to provide many CTI 10 functions, there is a great dependence on telephony switch 1120. Some older switches are not capable of CTI functions and data sharing, and some others are very limited in their functions. Moreover, the organization that provides a call-in center under these circumstances has no control over the switches in the network cloud, and it may not be practical for such an organization to purchase and install an expensive CTI-capable switch on the premises of the call-in center. What is needed is an apparatus and methods that will provide CTI functionality in the absence of a workable CTI link, such as link 1119 in FIG. 2.

Virtual CTI link

Figure 7:
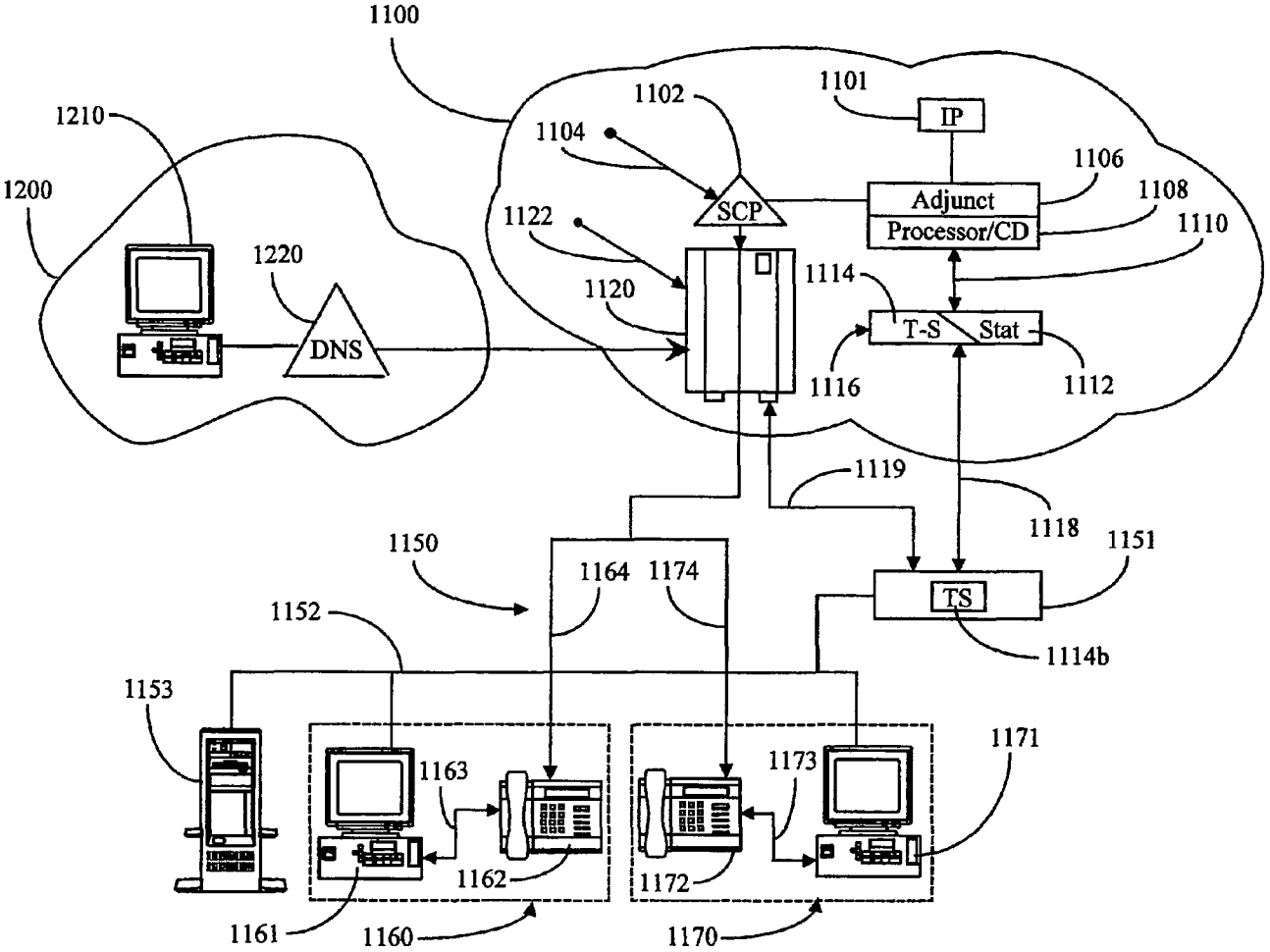
FIG. 7 is a block diagram of a call and information routing and call-center system according to an embodiment of the present invention.

FIG. 7 is a block diagram of a call and information routing and call-center system according to an embodiment of the present invention. The system of FIG. 7 has all of the connectivity and functionality of the system of FIG. 6, plus a data connection between each telephone in the call-in center and the associated PC. For example, in FIG. 7, PC 1161 is connected to telephone 1162 by link 1163, and PC 1171 is connected to telephone 1172 by data link 1173. Moreover, as previously described, each PC is connected on LAN 1152, which also connects to file server 1153 and to processor 1151 running an instance of T-Server 1114.

There are a number of different ways a telephone and PC may be connected, such as by a serial port and circuitry in the telephone and operating code in the PC such that the PC may monitor transactions of the telephone, including on-hook, off-hook, incoming caller-ID, ringing instance, and so forth. The PC via the data link may also exercise control over telephone functions. With this unique connectivity and adaptation, assuming all of the telephones in a call-in center are thus connected and adapted, T-Server 1114 running on processor 1151 may acquire in aggregate all of the information otherwise available from switch 1120 via CTI connection 1119. T-Server 1114 on processor 1151 may then perform as though a fully workable CTI connection 1119 to switch 1120 is established.

Call and Data Correspondence

One of the important functions performed is identification of callers, retrieval of data relating to callers, and transmittal of such data to be displayed at the PC associated with each telephone at each agent station. The advantage to all is readily apparent. The agent fielding a call is thus more prepared to deal with the caller, and will have information readily at hand.

To provide the call and data display functionality desired it is, of course, necessary that a caller's identity be established and the caller's correct data be retrieved for display. There are some instances in the system depicted in FIG. 7 and described herein, wherein such correspondence may be a problem. Consider, for example, the circumstance wherein an original call has been routed to telephone 1162. The origination of the call and caller ID are not available in the system of FIG. 7 (with a non-functioning link 1119) until the call is connected to telephone 1162. At that point the necessary information is transferred to T-Server 1114 at processor 1151, and data specific to the caller may be retrieved and displayed at PC 1161.

Consider now the further circumstance that after the agent answers and the data retrieval begins, the original caller hangs up or is otherwise disconnected, and a second call 1122, a random call, entering the system not through SCP 1102 but directly into switch 1120, goes to telephone 1162. This circumstance could occur in a number of different ways, including a misdialed or misrouted call. There are also other sequences of events that could result in the same mismatch between call and data. Unless some action is taken, the data will be retrieved and displayed, although there will no correspondence between the data and the caller.

In this circumstance the origination information, which may be such as caller ID information or DNIS information, for the second (random) call will not indicate the call originates at SCP 1102. In an embodiment of the present invention, origination data transmitted to T-Server 1114 at processor 1151 indicating the call last received was not through a valid SCP will cause any data being prepared for display at the agent station to be halted. In some embodiments, depending on the capability of switch 1120, T-Server 1114 on processor 1151 may cause such non-SCP calls to be disconnected and/or rerouted, by command over link 1119.

Voice Extensions Through Integrated Agent Workstations

The direct connection of a telephone to a PC connected on a LAN to a processor with an operating T-Server provides a platform for a number of voice extensions useful in the overall process of customer service through call-in centers. Several such voice extensions in embodiments of the present invention are described herein below.

Call recording is a major need in customer service operations of the sort described herein, especially in operations dealing with financial markets and utilities. Such recording operations in current art are typically quite expensive to implement and difficult to manage. In an embodiment of the present invention an improved call recording facility is provided by virtue of the connection of the telephone to the PC by data link, and the functionality afforded through LAN 1152 and code as a part of T-Server 1114. In this embodiment a digital voice rendition of both parties to a call is transmitted on link 163 (for example) to PC 1161.

In one embodiment of the present invention all calls are recorded, subject of course to local laws governing such matters, and provision is made for selective archiving of recorded conversations. The recording is all digital, and may be accomplished in a number of ways, utilizing a number of commercially available hardware and software entities, such as those marketed under the name SoundBlaster™. The LAN connection and availability of data servers such as server 1153 provide for the rather large amount of digital data needed for such a recording operation. In this embodiment organization of the recorded database can be done in a variety of ways, categorized by agent, by subject, by product, and so on, and relational cross-referencing may be done as well, providing a well of information not before available in such call-in centers. In addition interactive search and retrieve functionality, and interactive report generation is provided. In another embodiment of the invention digital voice recording is provided on demand, under control of the resident agent and/or the agent's supervisor. It will be apparent to those with skill in the art that there are many different schemes that may be employed for digital voice recording, using the uniquely connected and managed apparatus of the present invention.

In other embodiments of the present invention voice playback is provided, with pre-recorded massages played to a caller under agent or Host control. Such pre-recorded messages may be recorded by an agent or other person, and stored either locally in the PC or more remotely, such as on a server connected to LAN 152. Such messages can include greetings, mandatory messages required under law in some cases, disclaimers, and all kinds of messages that may be very repetitive for an agent.

In other embodiments of the present invention voice recognition routines are used allowing an agent to invoke displays with spoken initiators on the telephone, recognized in the PC and acted upon either in the PC or through the PC by means of LAN 1152 by other servers on the LAN or by T-Server 1114. Voice recognition may also be used to detect upselling opportunities in the course of calls at PC connected telephones. Other voice recognition routines are used in embodiments of the invention to detect abusive or threatening speech, and to automatically save calls or portions of calls that match patterns for such speech.

Methods in Computer Simulation of Telephony Systems (3226)

The present invention in embodiments described below pertains to computer simulation of telephony call centers and activity and functionality of such centers, and to computer telephony integration (CTI) as applied to such centers. It is well-known in the art that call center architecture and functionality is a rich and varied subject, and it is beyond the scope of the present specification to describe all of the rich variation in call center technology. There are, however, commonalties. Every call center, for example, is centered on a telephony switch, either at a customer's premises or provided by a telephone company. The telephony switch involved in a call center typically has one or more incoming trunks of telephone channels for receiving telephone calls, and typically one or more outgoing trunks as well, for placing calls back into the network.

Also common to call centers is the fact of connections to telephones at agent stations, which are typically assigned directory numbers. There may be just a few, dozens or even thousands of agent stations controlled by a single call center. In some call centers, only telephones are provided at agent stations. In others there may be computer terminals with display monitors, and the computer terminals may be interconnected on a local area network (LAN) along with network servers of various sorts. Call centers have recently been developed for providing video conferencing with agents. It may be seen that the architecture can be quite varied.

Telephone switches at call centers, depending on the model and manufacture, are capable of certain functions in switching, such as Automatic Call Distribution (ACD), queuing, playing recorded announcements to callers, and much more, and typically the functions available, and the manner in which the functions operate is specific to the make and model of the telephony switch.

In addition to all of the above, the systems of interest for the present invention are systems having a CTI link capability, enabling connection of a processor executing one or more usually customer-specific applications. According to the reference incorporated above, CTI involves three areas: (1) Call Control, which includes an ability to control and observe telephony calls, switching features and status, automatic call distribution (ACD) systems and ACD agents, and to use switching resources including tone generators and detectors; (2) Telephone Control, which is an ability to control and observe telephone devices; and (3) Media Access, which includes binding telephone calls to other media services.

In accomplishing the observation and control functions of CTI as listed above, applications executed on a CTI processor can be quite varied in function, really limited only to the imagination of application developers, and presently include such functions as agent-level routing, which will be familiar to those with skill in the art.

Figure 8:
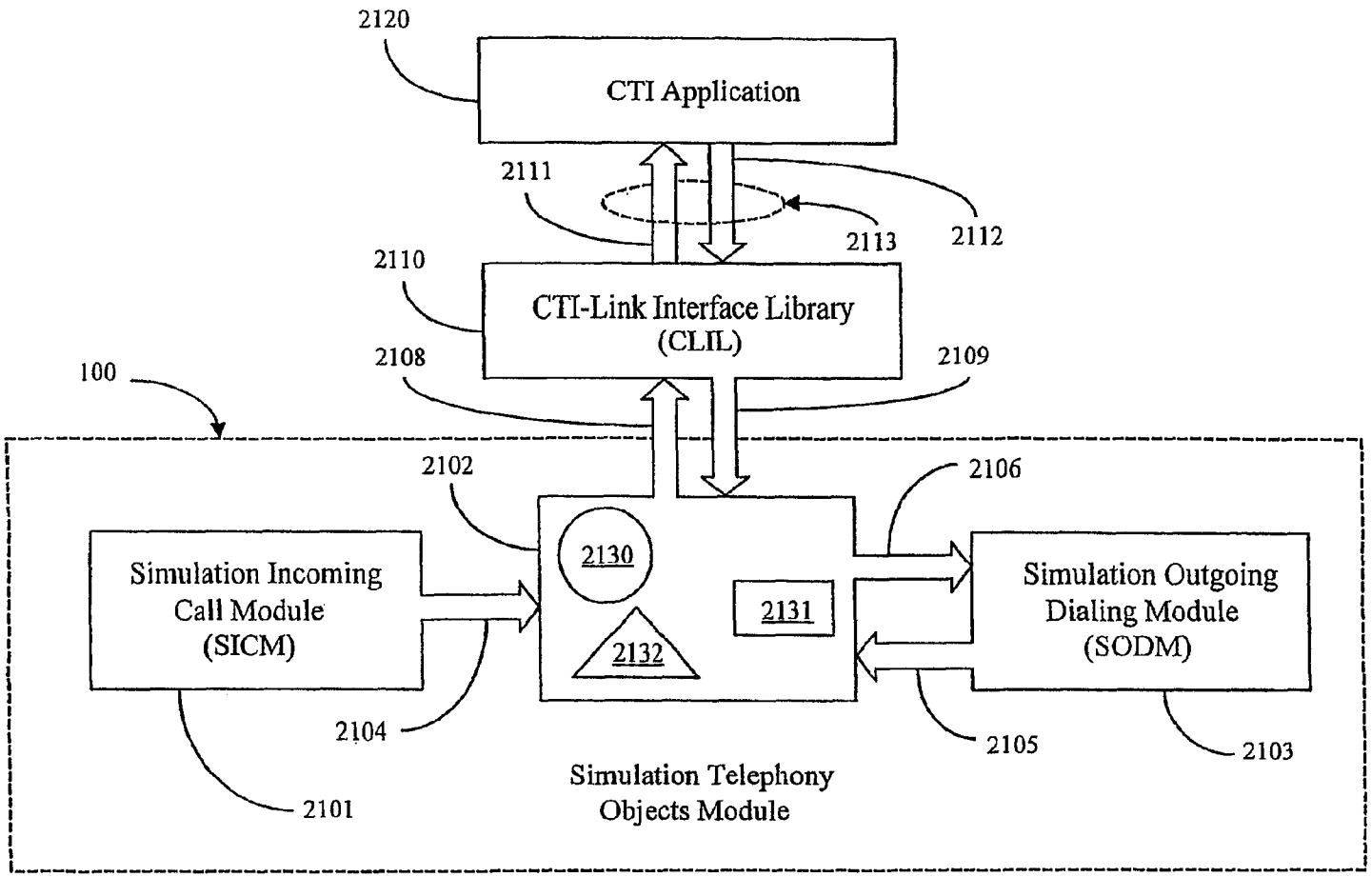
FIG. 8 is a block diagram depicting a simulated system according to a preferred embodiment of the present invention.

FIG. 8 is a block diagram depicting a simulated system according to a preferred embodiment of the present invention. In FIG. 8, boundary 2100 encloses software modules that emulate a call center and associated objects; boundary 2110 represents a unique CTI Link Interface Library (CLIL); and boundary 2120 represents a CTI application. Each of the three broad elements introduced here is described in further detail below.

In simulating a call center and associated elements as represented in FIG. 8 by group 2100, it is necessary to simulate both physical and logical elements. These include, but are not necessarily limited to (a) agents telephones and stations, (b) ACD, (c) ACD groups, (d) ACD queues, (c) incoming trunks, (f) outgoing trunks, (g) abstractions of communication relationship between one or more devices, and (h) communication with user applications.

In the example of FIG. 8, call center group 2100 comprises a software module 2101, termed a Simulated Incoming Call Module (SICM), which emulates incoming calls via one or more trunks 2104 to a switch 2102. The SICM operates with an ACD list, and simulates calls to ACD groups.

Switch 2102 is termed in embodiments of the invention a Simulated Telephony Objects Module (STOM), and comprises a variety of micro-emulated objects represented here by elements 2130-2132, which represent such as agents, ACD queues, and the like, as listed above.

Agent's telephones and agent stations as micro-emulated objects in a call center simulation will have attributes and statuses including, but not necessarily limited to two-line connections; perhaps a group relationship; and an equipment configuration mode (status when call offered, and status when call released).

Other entities that may become micro-emulated objects in a call center module, as represented by elements 2130-2132 include such as an Interactive Voice Response (IVR) system, remote access agents, media services that may appear in a call center switch, and generally, any feature that a call center switch can perform. Outgoing trunks have parameters including but not limited to a list of the outgoing trunks and a probability of answer result, such as answer, not answer, busy, answering machine, fax/modem, SIT tones, and so forth.

Calls in the simulation procedure have attributes and parameters including but not limited to origination party; destination party; PBX call identifier, DNIS number, ANI, and call status, such as connecting, waiting, alerting, or conferencing.

Elements 2130-2132, represented here as icons, may be, as indicated above, any function or behavior associated with STOM 2102, and it will be apparent to those with skill in the art that the three elements shown are not enough to depict all physical and logical elements that would have to be provided for STOM 2102 to make a realistic simulation. The elements shown, however, will be sufficient to teach to practice of the invention to those with skill in the art.

Software module 2103 represents an outgoing and return module, termed a Simulated Outgoing Dialing Module (SODM), wherein calls placed by STOM 2102 over path 2106 are modeled, and calls returned as a function of the outgoing calls over path 2105 are also modeled. STOM 2102 communicates with Interface Library 2110 via paths 2108 and 2109. Link 2113 represents a CTI link from application 2120 to switch 2102 via CLIL 2110.

The STOM notifies an application 2120 through CLIL 2110 of arriving calls, and data associated with arriving calls, as well changing status of telephony objects and statuses. STOM 2102 receives requests from application 2120 via CLIL 2110 to change status of agents phones and stations, such as login, logout, ready, not ready, or and busy. Requests are also received to change call status, such as answer, reconnect, disconnect, produce new call, transfer call, and include a call to a conference. If requested changes are available the STOM produces the changes and sends notification o the changes to application 2120 through CLIL 2110. If requested changes are out available, negative notification is sent.

In the embodiment of the invention illustrated by FIG. 8, although several computer functions are represented that may in a real system, rather than an emulated system, be executed on separate but connected and intercommunicating processors, all of the system represented by FIG. 8 will be typically executed on a single, relatively powerful computer. The various elements represented are software modules written to intercommunicate, and to simulate the behavior of real telephony systems.

FIG. 8 is more than a block diagram representing a system of the invention. FIG. 8 also represents a user interface wherein the elements are objects represented on a graphical user interface (GUI) as icons. The system of the invention is adapted such that object elements may be selected from a library and interchanged into an interconnected system.

As an example of the object-oriented nature of the GUI of FIG. 8, attention is directed to SICM 2101. This software module is a micro-application that, when initiated and operating may simulate calls to STOM 2102. A master SICM is developed that includes all of the characteristics of incoming calls. The master module has input parameters that allow a user to configure the module for certain behavior of interest. As an example, it may be of interest to test an application running as element 2120 against a rush of Christmas shoppers placing calls within a certain time frame at a certain rate, with the calls statistically distributed for a range of products for which agents at the emulated call center are adapted to enter orders and schedule deliveries.

The matter of importance in describing this invention is not the particular nature or statistical distribution of the calls, but the fact that the module has alterable parameters, also known as properties, which a user may manipulate to represent behavior of interest, and that the module is adapted to the system as an object, which may be removed and replaced by another object having a different parameter set. One may then quickly and conveniently alter the incoming conditions for a simulation, and new modules with different parameter sets may be developed off line and switched into the system.

Attention is now directed to STOM 2102. Iconic elements 2130-2132 are shown as three different shapes in FIG. 1. Each of these elements is a micro emulated object having alterable parameters. Description of an agent object should be adequate to illustrate the nature of the invention in this aspect.

Consider that element 2130 is a micro emulated agent module. This module may be selected from a library in the fashion described above for the SICM module, and dragged and dropped into switch 2132. Either before or after addition to the switch, parameters for the module may be accessed and set. It will be apparent to those with skill in the art that there may be a large number of agents assigned to a single call center, and that all of the agents may not have the same assignments or characteristics.

As an example of the versatility of the unique system, there may be, for example, agents for English speakers who call, and agents who speak Spanish for handling calls from Spanish-speaking customers. Certain agents may be trained for certain functions: to sell certain products, for example, or to provide technical assistance in certain situations. There may be, however, multiple instances of a micro-emulated agent. For example, of a Spanish-speaking agent assigned to first shift duty and trained to sell three specific related products. An icon represented agent, then, will have a multiplicity parameter. In setting up a simulation a user may select an agent, set certain parameters, then set the multiplicity parameter so that the call center will behave as though there were, say, twenty such agents.

It will be apparent to those with skill in the art that there are several ways parameters may be accessed and set for a micro-emulated object, such as element 2130, which may, for example, represent an agent having particular attributes. In one embodiment, for example, a selected icon representing a micro-emulated object may be caused to display an associated window in the GUI, and the window will have programming fields wherein a user may access and alter (edit) parameters. If the object is an agent, there may be, for example, a parameter field for language, for product knowledge, for shift assignment, and so forth; and, as indicated above, there may also be a parameter for multiplicity. If a simulated agent having a complete set of behavior parameters is to be represented multiple times in a call center simulation, the multiplicity parameter may be set for "n" instances, then the object will behave in operation of the simulation as "n" objects. The behavior of such objects can be in preferred embodiments, randomized, so the behavior, where there is a range, is not always the statistical average.

For example, even though there may be multiple instances of an agent with a certain characterization, it will never be true that every such agent will behave in exactly the same way. Some of the agents may habitually come late or leave early, and others may take longer than others for processing after calls are released. In an aspect of the invention such variations are accounted for by access to a statistical database and random generator. Typically the statistical average behavior of all such agents will be known, and may be stored in a manner to be accessible to the system. Multiple agents, otherwise identical in behavior, are caused to randomly alter their behavior in a way that the statistical average behavior is met.

It will be apparent to those with skill in the art that the above description of agent functionality and variation, and the method of applying parameters, multiplicity, and statistical behavior is not necessarily limiting in the invention. Many variations are possible, even including programming an individual module for each an every agent in a setup of interest.

Attention is now directed to CLIL 2110 and communication between STOM 2102 and CLIL 2110. CLIL is an interface library whose function it is to translate between STOM 2102 and application 2120 in a particular manner. STOM 2102 is configured in a manner that will be common to any of the several makes and models of available telephony switches currently available. Different makes and models of telephony switches communicate with CTI applications in different ways, however, and provide significantly different behavior specific to a particular make and model of switch. Communication may also be characterized by latency considerations. For example, in some real world situations one might wish to test, the telephony switch will be on the customer's premises, and in others, the telephony switch might be in the network, remote from the customer's premises. Latency issues in communication will differ by the different switch location, even with the same physical switch.

CLIL is a switch-dependent layer that controls communication of commands and status over data paths 2108/2109 and CTI link 2113. The function of CLIL 2110 is to add switch dependent characteristics to the communication, so one simulated generic call center can be made to appear to a CTI application as a particular make and model of a switch connected in a specific manner. The particular value of CLIL 2110 is that an application may be tested against one make and model of a switch, and, by selecting a different layer of software from CLIL 22110, one may then test the same CTI application against a different make and model of switch and/or location and connectivity of a switch user may quickly and conveniently substitute one CLIL setup for another for communication with a switch of interest.

Internet Protocol Network Telephony (IPNT)

In all of the embodiments and aspects of the invention described above specific examples have been drawn from the technological area of conventional intelligent telephony networks, other than what is now known as Internet protocol network telephony, wherein computers simulate telephones through software, microphones, and speakers, and telephony data between such equipped computers is transmitted over Internet connections and directed by servers, such as destination number servers (DNS) in the Internet. In the IPNT world IP addresses are used instead of telephone numbers, and there are differences in the way data packets are formulated and transmitted. Moreover, what may be termed routing is done by such as IP switches and hubs, wherein destination addresses may be changed. These differences, however, are not limiting in embodiments of the present invention.

FIG. 7 shows such an embodiment wherein Internet calls originating in Internet network 1200 from computer 1210 are received by the DNS in the Internet and forwarded to switch 1120, which in this embodiment also functions as an IP switch. From this point the Internet call is treated like a telephony call wherein the call may also have caller ID attached (originating caller's Internet address), and in those cases, wherein a separate network digital data link is accomplished between processors at the origination end (1114) and the customer's premises (1151) a data packet associated with the call may be forwarded over link 1118. Also, T-S 1116, which interacts continuously with switch 1120 in this embodiment, is capable of transacting with data file server 1153, given caller ID and/or other data associated with a call, to retrieve further information about the caller from data file server 1153.

In many embodiments of the invention described, the inventions are involved with new and unique ways to use machine intelligence for telephony functions, particularly, but not exclusively, as these functions relate to call centers and intelligent routing of calls. In instances of the invention described, the principles of the invention may also be applied to IPNT without undue experimentation.

As examples of IPNT application, in those embodiments dealing with personal routing and personal routers, the methods and apparatus described may also be adapted to IPNT so personal routing rules, negotiation, and the like may be provided for IPNT calls as well. In the aspects of the invention dealing with simulation of CTI applications and testing, the applications may apply to IPNT telephony as well as to more conventional telephony systems. Other examples will be apparent to those with skill in the telephony arts.

It will be apparent to those with skill in the art that there are many alterations that may be made in the embodiments of the invention herein described without departing from the spirit and scope of the invention. Some of these have been described above, such as the use of a telephony server like T-Server 1207 running on processor 1223. In some cases such a server is not needed to practice the invention, as was described above.

Many of the functional units of the system in embodiments of the invention may be implemented as code routines in computerized telephony equipment, computer servers, and individual workstations. It is well-known that programmers are highly individualistic, and may implement similar functionality by considerably different routines. Also, the invention may be applied to widely varying hardware systems. Further, hardware used to practice the invention may vary in many ways. There are similarly many other alterations in the embodiments described herein which will fall within the spirit and scope of the present invention in it's several aspects described. The invention is limited only by the breadth of the claims below.

What is claimed is:

1. A call center, comprising:

a plurality of agent stations having a telephone connected to computerized equipment enabling a user agent to interact with Internet Protocol (IP) calls over the telephone;

a local area network (LAN) connecting at least some of the agent stations;

a server having an Internet connection adapted to receive IP calls from the Internet;

an IP switch connected to the LAN having access to a data repository;

wherein the server attaches data initially received with an IP call and forwards the IP call to the IP switch which uses the attached data to retrieve further data associated with the IP call or caller from the data repository, and to provide the further data to an agent to which the call is routed.

2. The call center of claim 1 wherein the IP switch is adapted to service IP calls from specific servers in the Internet and to block display of data at agent stations for any call not identified as originating at one of the specific servers.

3. The call center of claim 1 wherein the computerized equipment comprises personal computers (PCs).

4. A call-routing system, comprising:

a server connected to the Internet, the server adapted to receive IP telephone calls originating from the Internet and attach data initially received with the IP call;

an IP switch for queuing the calls for agents at agent stations in a communication center; and a call router executing in the IP switch, the call router adapted to route the IP calls to the agent stations;

wherein the IP switch uses data initially received with an IP call to retrieve further data associated with a caller from the data repository, and to provide the further data to an agent to which the call is routed.

5. The system of claim 4 wherein the IP switch is adapted to service calls from specific servers in the IP network and to block display of data at agent stations for any call not identified as originating at one of the specific servers.

6. The call-routing system of claim 4 wherein one or more of the agent stations comprise personal computers (PCs).

* * * * *